US011079764B2

(12) United States Patent
Nister et al.

(10) Patent No.: US 11,079,764 B2
(45) Date of Patent: Aug. 3, 2021

(54) SAFETY PROCEDURE ANALYSIS FOR OBSTACLE AVOIDANCE IN AUTONOMOUS VEHICLES

(71) Applicant: NVIDIA Corporation, San Jose, CA (US)

(72) Inventors: David Nister, Bellevue, WA (US); Hon-Leung Lee, Bellevue, WA (US); Julia Ng, San Jose, CA (US); Yizhou Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 169 days.

(21) Appl. No.: 16/265,780

(22) Filed: Feb. 1, 2019

(65) Prior Publication Data

US 2019/0243371 A1    Aug. 8, 2019

Related U.S. Application Data

(60) Provisional application No. 62/768,064, filed on Nov. 15, 2018, provisional application No. 62/760,916, (Continued)

(51) Int. Cl.
*G05D 1/02* (2020.01)
*B60W 30/09* (2012.01)
(Continued)

(52) U.S. Cl.
CPC ........... *G05D 1/0214* (2013.01); *B60W 30/09* (2013.01); *B60W 30/095* (2013.01); *G05D 1/027* (2013.01);
(Continued)

(58) Field of Classification Search
CPC .................................................. G05D 1/0214
See application file for complete search history.

(56) References Cited

U.S. PATENT DOCUMENTS 7,409,295 B2 *  8/2008  Paradie ..................... G06T 7/70
                                                        701/301
8,204,642 B2 *  6/2012  Tanaka ............... B60G 17/0165
                                                         701/28
(Continued)

FOREIGN PATENT DOCUMENTS

DE      10 2015 221 920 A1    5/2017
DE      10 2015 226 762 A1    6/2017
WO         2018/002910 A1     1/2018

OTHER PUBLICATIONS

Bokarski et al: "End to End Learning for Self-Driving Cars", Apr. 25, 2016 (Apr. 25, 2016), XP055570062, Retrieved from the Internet on Mar. 18, 2019: URL:https://nvidia.com/content/tegra/automotive/images/2016/solutions/pdf/end-to-end-dl-using-px.pdf.
(Continued)

*Primary Examiner* — Michael A Berns
(74) *Attorney, Agent, or Firm* — Shook, Hardy & Bacon, L.L.P.

(57) ABSTRACT

In various examples, a current claimed set of points representative of a volume in an environment occupied by a vehicle at a time may be determined. A vehicle-occupied trajectory and at least one object-occupied trajectory may be generated at the time. An intersection between the vehicle-occupied trajectory and an object-occupied trajectory may be determined based at least in part on comparing the vehicle-occupied trajectory to the object-occupied trajectory. Based on the intersection, the vehicle may then execute the first safety procedure or an alternative procedure that, when implemented by the vehicle when the object implements the second safety procedure, is determined to have a lesser likelihood of incurring a collision between the vehicle and the object than the first safety procedure.

20 Claims, 22 Drawing Sheets

Related U.S. Application Data filed on Nov. 13, 2018, provisional application No. 62/625,351, filed on Feb. 2, 2018.

(51) Int. Cl.
*G05D 1/08* (2006.01)
*B60W 30/095* (2012.01)

(52) U.S. Cl.
CPC ......... *G05D 1/0221* (2013.01); *G05D 1/0223* (2013.01); *G05D 1/0231* (2013.01); *G05D 1/0242* (2013.01); *G05D 1/0255* (2013.01); *G05D 1/0257* (2013.01); *G05D 1/0278* (2013.01); *G05D 1/0289* (2013.01); *G05D 1/0891* (2013.01); *B60W 2520/06* (2013.01); *B60W 2520/10* (2013.01); *B60W 2520/14* (2013.01); *B60W 2520/16* (2013.01); *B60W 2520/18* (2013.01); *B60W 2554/00* (2020.02); *G05D 2201/0213* (2013.01)

(56) References Cited

U.S. PATENT DOCUMENTS

| | | | |
|---|---|---|---|
| 9,701,307 B1* | 7/2017 | Newman | B60W 10/184 |
| 10,007,269 B1 | 6/2018 | Gray | |
| 10,133,274 B2* | 11/2018 | Shashua | G05D 1/0253 |
| 10,134,278 B1 | 11/2018 | Konrardy et al. | |
| 10,289,469 B2* | 5/2019 | Fortino | G06F 9/3863 |
| 10,372,136 B2* | 8/2019 | Yang | B60W 30/12 |
| 10,489,972 B2* | 11/2019 | Atsmon | G05D 1/0088 |
| 10,625,748 B1* | 4/2020 | Dong | B60W 50/0097 |
| 10,635,110 B2* | 4/2020 | Shashua | G01C 21/3476 |
| 10,730,517 B2* | 8/2020 | Park | G08G 1/166 |
| 10,942,030 B2* | 3/2021 | Haque | G05D 1/0088 |
| 2009/0125177 A1 | 5/2009 | Tanaka et al. | |
| 2016/0321074 A1 | 11/2016 | Hung et al. | |
| 2017/0010108 A1 | 1/2017 | Shashua | |
| 2017/0090478 A1 | 3/2017 | Blayvas et al. | |
| 2017/0259801 A1 | 9/2017 | Abou-Nasr et al. | |
| 2017/0364083 A1 | 12/2017 | Yang et al. | |
| 2018/0121273 A1 | 5/2018 | Fortino et al. | |
| 2018/0253103 A1 | 9/2018 | Winkler et al. | |
| 2019/0016285 A1 | 1/2019 | Freienstein et al. | |
| 2019/0071101 A1 | 3/2019 | Emura et al. | |
| 2019/0212749 A1* | 7/2019 | Chen | B62D 15/0255 |
| 2019/0250622 A1* | 8/2019 | Nister | B60W 60/0015 |
| 2019/0258251 A1* | 8/2019 | Ditty | G05D 1/0274 |

OTHER PUBLICATIONS

International Search Report and Written Opinion dated Oct. 17, 2019 in International Patent Application No. PCT/US2019/012535, 24 pages.

Ching Y. Hung et al. "Programmable Vision Accelerator", U.S. Appl. No. 62/156,167, filed May 1, 2015.

Mohammed Abdulla Yousuf et al."Methodology of Using a Single Controller (ECU) for a Fault-Tolerant/Fail-Operational Self-Driving System", U.S. Appl. No. 62/524,283, filed Jun. 23, 2017.

"Systems and Methods for Safe and Reliable Autonomous Vehicles" U.S. Appl. No. 62/584,549, filed Nov. 10, 2017.

"System and Method for Controlling Autonomous Vehicles" U.S. Appl. No. 62/614,466, filed Jan. 7, 2018.

International Search Report and Written Opinion dated Apr. 10, 2019 in International Patent Application No. PCT/US2019/016418, 13 pages.

International Preliminary Report on Patentabilty International Patent Application No. PCT/US2019/012535 dated Jul. 1, 2020.

Jayaraman, A., et al., "Creating 3D Virtual Driving Environments for Simulation-Aided Development of Autonomous Driving and Active Safety," SAE Technical Paper 2017-01-0107, Mar. 28, 2017, pp. 3. (See English Abstract).

Non-Final Office Action dated Aug. 7, 2020, in U.S. Appl. No. 16/241,005, 22 pages.

International Preliminary Report on Patentability received for PCT Application No. PCT/US2019/016418, dated Aug. 13, 2020, 8 pages.

International Preliminary Report on Patentability received for PCT Application No. PCT/US2019/024400, dated Oct. 8, 2020, 10 pages.

Notice of Allowance dated Feb. 17, 2021 in U.S. Appl. No. 16/241,005, 7 pages.

* cited by examiner

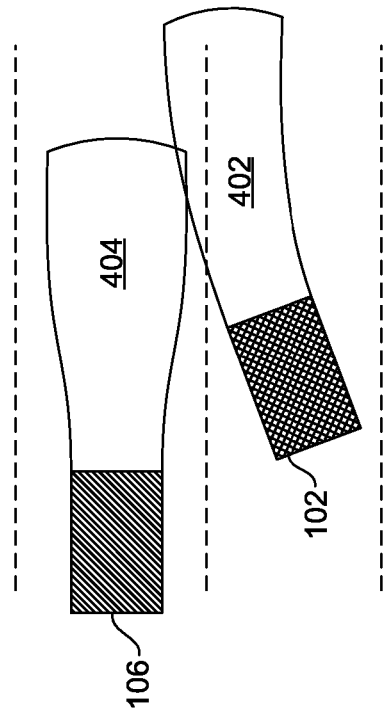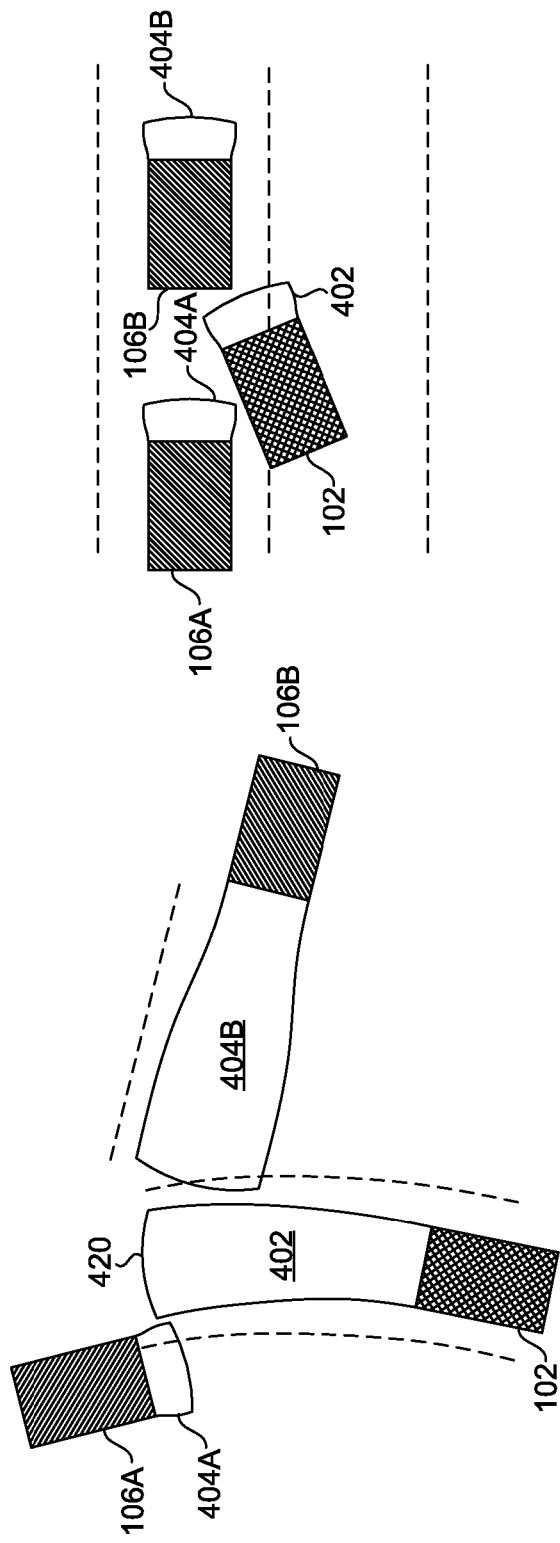

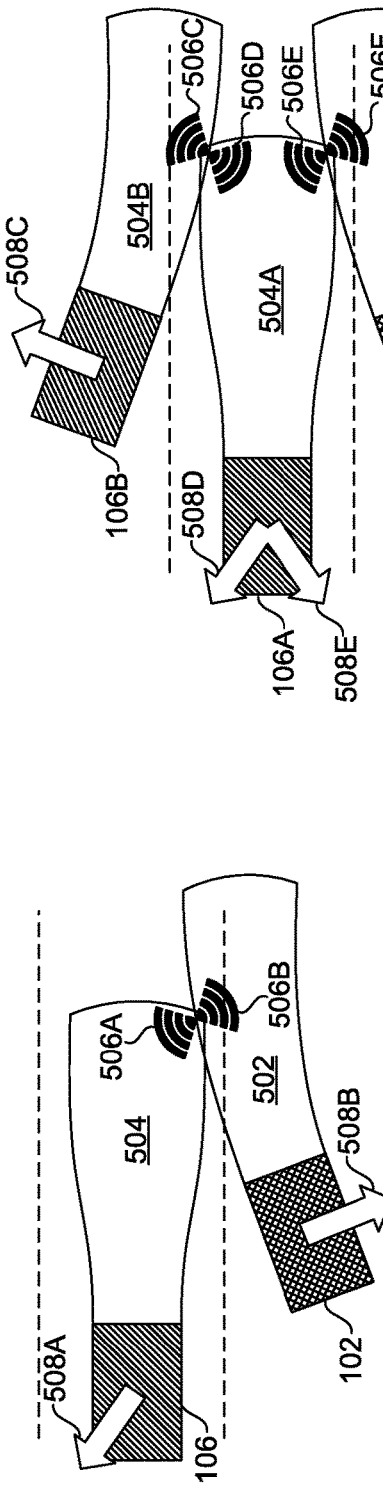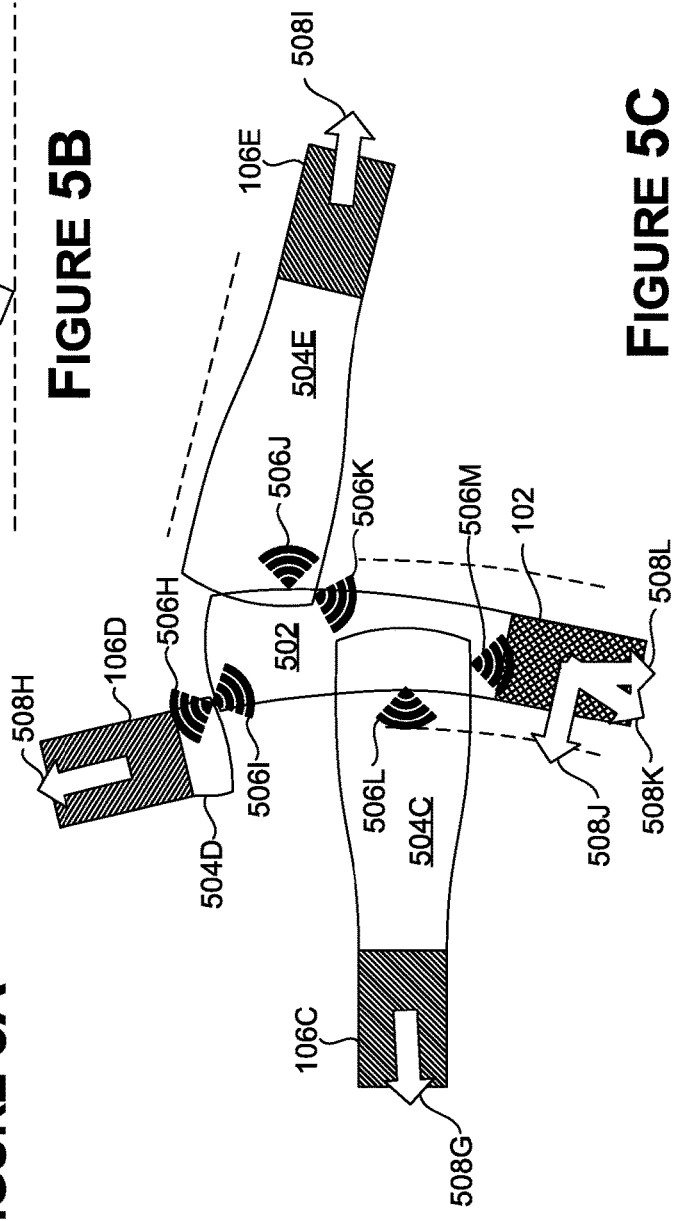

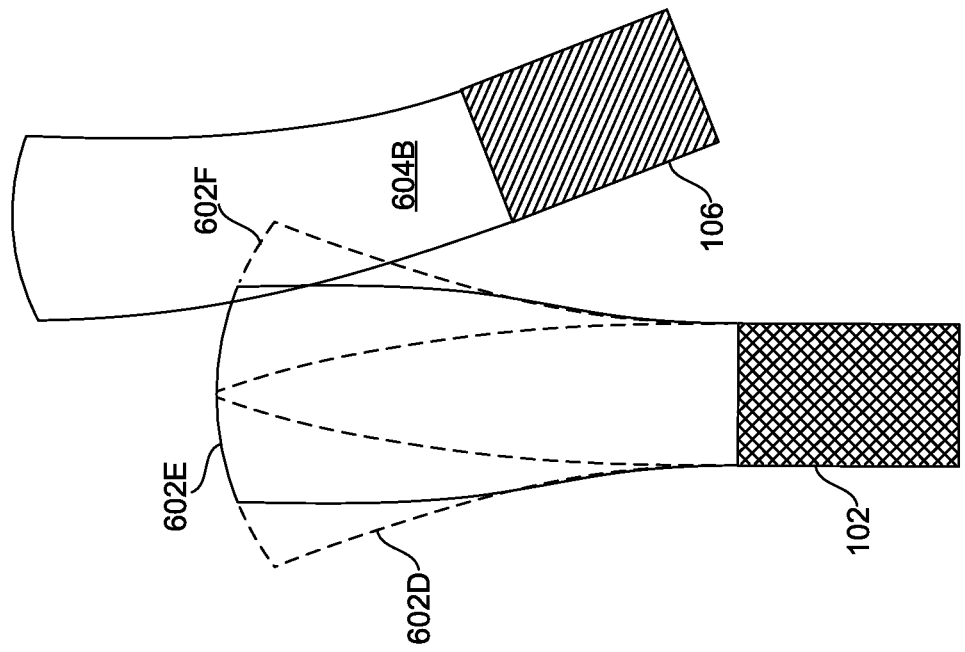
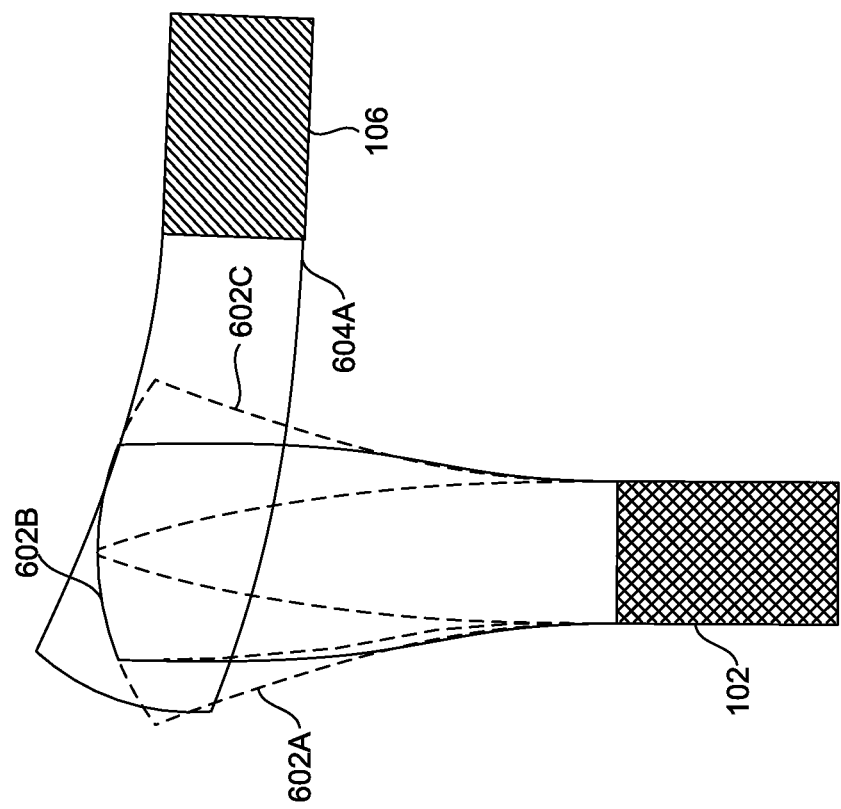

SAFETY PROCEDURE ANALYSIS FOR OBSTACLE AVOIDANCE IN AUTONOMOUS VEHICLES

CROSS-REFERENCE TO RELATED APPLICATIONS

This application claims the benefit of U.S. Provisional Application No. 62/768,064, filed on Nov. 15, 2018, U.S. Provisional Application No. 62/760,916, filed on Nov. 13, 2018, and U.S. Provisional Application No. 62/625,351, filed on Feb. 2, 2018, each of which is hereby incorporated by reference in its entirety.

This application is related to U.S. Non-Provisional application Ser. No. 16/241,005, filed on Jan. 7, 2019, and U.S. Non-Provisional application Ser. No. 16/186,473, filed on Nov. 9, 2018, each of which is hereby incorporated by reference in its entirety.

BACKGROUND

For autonomous vehicles to achieve autonomous driving levels 3-5 (e.g., conditional automation (Level 3), high automation (Level 4), and full automation (Level 5), as defined by the Society of Automotive Engineers standard J3016), the autonomous vehicles must be capable of operating safely in all environments, and without the requirement for human intervention when potentially unsafe situations present themselves. In order to meet this standard, obstacle and collision avoidance systems need to be implemented in the autonomous vehicles that do not contribute to or increase the likelihood or imminence of a collision (e.g., with another human operated vehicle, outside of the control of the autonomous vehicle). In addition, the obstacle and collision avoidance systems should be implemented in a way that feels natural to occupants of the autonomous vehicles, such that the autonomous vehicle does not execute harsh, abrupt, or erratic safety procedures unless needed to ensure the safety of the occupants.

However, conventional systems have yet to satisfy these standards. For example, conventional systems, such as systems implementing automatic emergency braking (AEB), analyze sensor information corresponding to what is in front of, or behind, the vehicle (e.g., along a longitudinal axis of the vehicle) when determining whether to activate the brakes. Other conventional systems, such as systems implementing blind spot monitoring (BSM), analyze sensor information corresponding to what is to the sides of the vehicle (e.g., along a lateral axis of the vehicle) when determining whether a lane change is safe. As a result, these conventional systems analyze the longitudinal and lateral axes of the vehicle separately. This may place unnecessary constraints on controlling the vehicle and, when used by autonomous vehicles, may restrict the autonomous vehicles from performing natural and/or required vehicle maneuvers (e.g., maneuvering into an adjacent lane in slow traffic when another vehicle is to the side of the autonomous vehicle). In addition, these conventional systems, when analyzing a current path of the vehicle in a current lane, may only rely on information about objects in the current lane and, as a result, may be more restricted with respect to handling unforeseen circumstances outside of the current lane (e.g., in adjacent lanes, on the side of the road, and/or the like, such as fallen trees, occluded objects, etc.).

Moreover, conventional systems may also require that a safety procedure (e.g., emergency braking) be used even in situations where it is not beneficial, or where more beneficial options exist than to use the safety procedure (e.g., when executing a safety procedure, such as braking, increases a likelihood or imminence of a collision). In some of these conventional systems, there may be exceptions to account for this issue, which may be specified by rules and moderated by input information, such as lane structure, path structures based on map information, and/or the like. Even in these conventional systems that account for exceptions to implementing a safety procedure, a reliance may still exist on a predetermined exception for navigating the specific scenario in order for the autonomous vehicle to implement a vehicle maneuver other than the safety procedure. However, an exception may not be built for every situation and, as a result, when an exception is not available, the safety procedure may be implemented even though it presents a less safe outcome. To this effect, these conventional systems may not be able to determine whether the safety procedure or one of the exceptions is actually the safest action to take. As a result, these conventional systems may identify a situation, determine if an exception exists for the situation and execute a procedure associated with the exception if the exception exists—thereby failing to take into account the relative overall safety of the different options when navigating the environment.

SUMMARY

Embodiments of the present disclosure relate to analyzing safety procedures of a vehicle and objects in an environment for obstacle avoidance. Systems and methods are disclosed for obstacle avoidance using trajectories representative of safety procedures projected forward in time to ensure that an autonomous vehicle is capable of implementing the safety procedure at all times to avoid collisions with objects in the environment.

In contrast to conventional systems, such as those described above, the system of the present disclosure may calculate a safety potential (e.g., a measure of the likelihood or imminence of a collision occurring) for a safety procedure, use the safety potential as a baseline, and then determine whether another action or set of actions can be implemented to adjust the safety potential to decrease the likelihood of a collision occurring. As a result, exceptions and rules are not required for every situation, because the system is evaluating each situation, determining the safety potential for the safety procedure, and then determining whether to implement a set of controls representative of the safety procedure or another action that surpasses the safety potential associated with the safety procedure.

In order to accomplish this, the system may determine a state (e.g., location, velocity, orientation, yaw rate, etc.) of a vehicle and a safety procedure associated with the vehicle. The system may further generate a virtual representation of points in space-time (e.g., two dimensions for space, and one dimension for time) that the vehicle will occupy (e.g., a vehicle-occupied trajectory(ies)) when executing the safety procedure. The system may then determine states and safety procedures for each object (perceived and unperceived, static and moving) in the environment, and generate a virtual representation of the points in space-time the objects will occupy (e.g., for each object, an object-occupied trajectory(ies)) when executing their respective safety procedures. The system may then monitor the vehicle-occupied trajectory(ies) in view of the object-occupied trajectories to determine if an intersection or overlap occurs. Once it is determined that an intersection or overlap occurs, the system may implement a pre-emptive object avoidance procedure that acts like a "safety force field" that operates by proactively "repels" the vehicle from the projected intersection of object(s) by implementing an action that decreases the overall likelihood or imminence of an actual collision between the vehicle and the object(s).

During implementation of the safety procedure or another action, when it is determined that there is no longer an overlap between the vehicle-occupied trajectory(ies) and the object-occupied trajectories (e.g., the imminence and/or likelihood of a collision is reduced), the system may cease implementing the safety procedure or the other action, and give control back to a higher layer of the system (e.g., a planning and/or control layer of an autonomous driving software stack) associated with controlling the car according to normal driving protocols (e.g., obeying rules of the road, following the current directions, etc.).

BRIEF DESCRIPTION OF THE DRAWINGS

The present systems and methods for safety procedure analysis for obstacle avoidance in autonomous vehicles is described in detail below with reference to the attached drawing figures, wherein:

FIG. 4A is an example of two-dimensional projections of safety procedures for a plurality of vehicles, in accordance with some embodiments of the present disclosure;

FIG. 4B is another example of two-dimensional projections of safety procedures for a plurality of vehicles, in accordance with some embodiments of the present disclosure;

FIG. 4C is another example of two-dimensional projections of safety procedures for a plurality of vehicles, in accordance with some embodiments of the present disclosure;

FIG. 4D is another example of two-dimensional projections of safety procedures for a plurality of vehicles, in accordance with some embodiments of the present disclosure;

FIG. 5A is an example of intersections of two-dimensional projections of safety procedures and corresponding actions for a plurality of vehicles, in accordance with some embodiments of the present disclosure;

FIG. 5B is another example of intersections of two-dimensional projections of safety procedures and corresponding actions for a plurality of vehicles, in accordance with some embodiments of the present disclosure;

FIG. 5C is another example of intersections of two-dimensional projections of safety procedures and corresponding actions for a plurality of vehicles, in accordance with some embodiments of the present disclosure;

FIG. 6A is an example illustration of a perturbation analysis for a vehicle, in accordance with some embodiments of the present disclosure;

FIG. 6B is another example illustration of a perturbation analysis for a vehicle, in accordance with some embodiments of the present disclosure;

DETAILED DESCRIPTION

Figure 1:
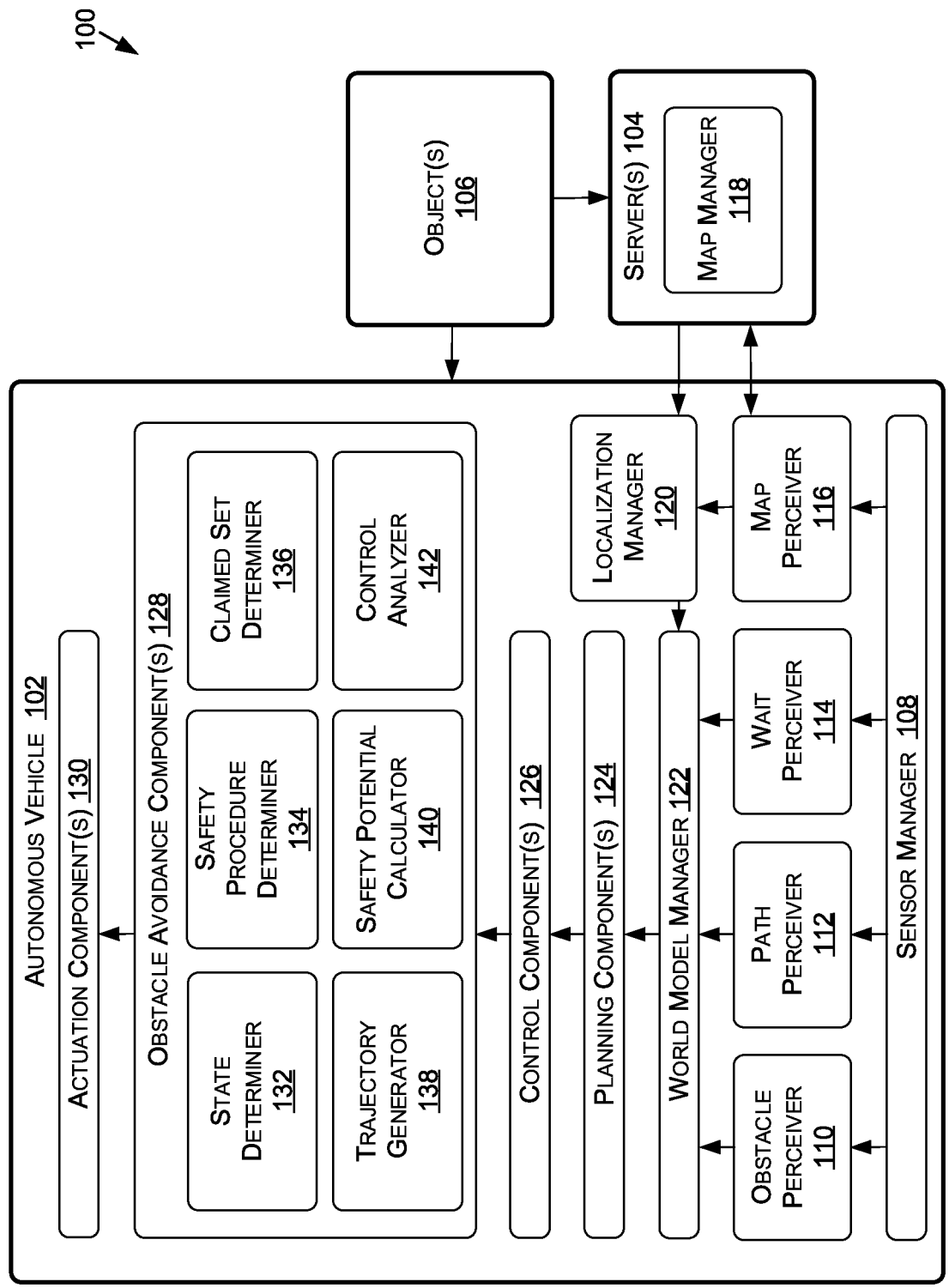
FIG. 1 is a block diagram of an example autonomous vehicle system, in accordance with some embodiments of the present disclosure.

Systems and methods are disclosed related to analyzing safety procedures of a vehicle and objects in an environment for obstacle avoidance. The present disclosure may be described with respect to an example autonomous vehicle 102 (alternatively referred to herein as "vehicle 102" or "autonomous vehicle 102"), an example of which is described in more detail herein with respect to FIGS. 11A-11D. In addition, although the present disclosure may be described with respect to an autonomous vehicle system 100, this is not intended to be limiting, and the methods and processes described herein may be implemented on systems including additional or alternative structures, components, and/or architectures without departing from the scope of the present disclosure.

Safety Force Field

The present disclosure relates to at least a portion of a system for controlling an autonomous vehicle safely, without the requirement of human supervision. More specifically, the current disclosure relates to methods and processes for an obstacle avoidance level of an autonomous driving software stack (e.g., in some implementations, the last or lowest level of the autonomous driving software stack prior to an actuation layer) that is used help guarantee that a collision between a vehicle and objects in the environment does not occur. In some examples, the obstacle avoidance mechanisms described herein are executed even if their execution involves disobeying traffic laws or other rules of the road generally obeyed by a higher level of the autonomous driving software stack (e.g., a planning layer or a control layer).

As described herein, conventional systems generally analyze sensor information corresponding to what is in front of, or behind, the vehicle (e.g., along a longitudinal axis of the vehicle) separate and distinct from analyzing sensor information corresponding to what is to the side of the autonomous vehicle (e.g., along a lateral axis of the vehicle). As a result of separately analyzing the environment of the vehicle longitudinally and laterally, unnecessary constraints on controlling the vehicle may be created and, especially when used by autonomous vehicles, may restrict the autonomous vehicles from performing natural and/or required vehicle maneuvers (e.g., maneuvering into an adjacent lane in slow traffic when another vehicle is to the side of the autonomous vehicle). In addition, when analyzing a current path of the vehicle in a current lane, conventional systems may only rely on information about objects in the current lane and, as a result, may be more restricted with respect to handling unforeseen circumstances outside of the current lane (e.g., in adjacent lanes, on the side of the road, and/or the like, such as fallen trees, occluded objects, etc.).

In addition, in some conventional systems, a safety procedure may be executed when certain scenarios are perceived regardless of whether safer options, other than the safety procedure, exist. In other conventional systems, there may be exceptions to executing the safety procedure that may be specified by rules and moderated by input information, such as lane structure, path structures based on map information, and/or the like. However, even in these conventional systems that account for exceptions, a reliance may still exist on an exception being available for the scenario perceived by the vehicle in order for the vehicle to abort the safety procedure and to execute another action(s). That said, it may be highly improbable that there is an exception built for every scenario and, as a result, when an exception is not available, the safety procedure may be implemented even though it presents a more unsafe outcome. Thus, by not separately analyzing the safety of each scenario in the environment to find a known safe action (e.g., where a collision is unlikely), these conventional systems may implement the safety procedure or one of the exceptions thereof even though other, safer actions, are available.

The present disclosure, in contrast to conventional systems, includes a system that may calculate a safety potential (e.g., a measure of a likelihood or imminence of a collision occurring) for a safety procedure, use the safety potential as a baseline, and then determine whether another action or set of actions can be implemented to adjust the safety potential to decrease the likelihood and/or imminence (and as a result, the likelihood, in some scenarios) of a collision occurring. As a result, exceptions and rules, such as those used in conventional systems, are not required, because the system is evaluating at each situation, determining the safety potential for the safety procedure, and then determining whether to implement the safety procedure or an action(s) that surpasses the safety potential associated with the safety procedure.

In order to accomplish this, the current system may determine a state (e.g., location, velocity, orientation, yaw rate, etc.) of a vehicle, vehicle information (e.g., width, length, etc.) and use the state and the vehicle information to determine points in space-time that the vehicle occupies. The system may then determine a safety procedure for the vehicle (e.g., at high speeds, lining up with a current lane and braking until completely stopped, at low speeds, pulling to the side of road then braking, etc.) based on the scenario (e.g., type of road, such as highway or surface street, the velocity of the vehicle, the other objects in the environment, etc.), and may generate a virtual representation of points in space-time (e.g., in three-dimensions, two dimensions for space, and one dimension for time) that the vehicle will occupy (e.g., a vehicle-occupied trajectory(ies)) when executing the safety procedure. In some examples, the vehicle-occupied trajectory(ies) may include a range of possible implementations of the safety procedure (e.g., the trajectory when implementing the hardest braking and avoiding a collision, the trajectory when implementing the slowest braking while still avoiding a collision, and any trajectories in-between where braking is neither the hardest nor slowest). As such, reference to a trajectory herein, may include more than one trajectory (e.g., trajectories), that may include each of the trajectories associated with different implementations (e.g., profiles) of the safety procedure. In some examples, a union of two or more vehicle-occupied trajectories (e.g., based on two or more of the implementations of the safety procedure) may be determined, such as by using a convex hull of an image of the object or vehicle at each time slice. Each of the points within the vehicle-occupied trajectory(ies) may be referred to as a claimed set of points.

The current system may determine states and safety procedures for each object (perceived and unperceived, static and moving) in the environment. The system may then generate virtual representations of the points in space-time the objects will occupy (e.g., object-occupied trajectories) when executing their respective safety procedures. To determine unperceived objects in the environment, the system may use rules that are based on reasonable expectations. For example, when an intersection is occluded in some way, the system may generate an unperceived object as a car traveling at a reasonable speed approaching the intersection from the occluded direction. As another example, if two cars are parked on the side of the street, the system may generate an unperceived object as a person between the two cars. The unperceived objects may be included in the analysis by the system in addition to the perceived objects (e.g., objects identified based on sensor data from sensors of the vehicle).

The system may then monitor the vehicle-occupied trajectory(ies) in view of the object-occupied trajectories to determine if an intersection or overlap occurs (in some examples, with a safety margin built in). Once it is determined that an intersection occurs, the system may implement a "safety force field" and seek to "repel" the vehicle from the object(s) by implementing the safety procedure or by implementing another set of controls that has been determined to have an equal or lesser associated likelihood and/or imminence of causing an actual collision between the vehicle and any of the objects.

When determining whether to implement the safety procedure or another set of controls, the system may calculate a safety potential associated with the safety procedure (in some examples, the safety potential is a representation of the degree of overlap between the vehicle-occupied trajectory(ies) and the object-occupied trajectory(ies)—e.g., the area or volume of overlap between the two), and may use the safety potential as a baseline (e.g., no action taken should increase the likelihood or imminence of a collision when compared to the safety procedure). In some examples, the safety potential may be determined using a function where, when no overlap is detected, the function is zero, and is high or maximum at the time of first collision. In such examples, the safety potential may be referred to as measuring imminence of a collision in addition to, or alternatively from, measuring a likelihood of a collision. The system may then perform a perturbation analysis on an original state of the vehicle (e.g., using the chain rule), to determine whether another set of controls (e.g., another action, such as speeding up instead of braking, turning left instead of right, etc.) results in a safety potential that is indicative of an equal or lower likelihood of collision between the vehicle and any of the objects as compared to the safety potential when implementing the safety procedure.

During implementation of the safety procedure or the other action(s), when it is determined that there is no longer an overlap or intersection between the vehicle-occupied trajectory(ies) and the object-occupied trajectories (e.g., the imminence and/or likelihood of a collision is reduced), the system may cease implementing the safety procedure or the other action(s), and give control back to a higher layer of the autonomous driving software stack (e.g., a planning layer and/or control layer) associated with controlling the vehicle according to normal driving protocols (e.g., obeying rules of the road, following the current directions, etc.). In some examples, the action(s) selected may depend on what the higher layer of the stack originally planned to implement (e.g., proposed controls representative of a planned trajectory), and the system may select the closest safe controls and/or safe trajectories to the original planned action(s) (e.g., using one or more metrics).

Now referring to FIG. 1, FIG. 1 is a block diagram of an example autonomous vehicle system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The autonomous vehicle system 100 may include an example autonomous vehicle 102, a server(s) 104, and/or one or more objects 106. In some examples, one or more of the autonomous vehicle 102, the server(s) 104, and/or the one or more objects 106 may include similar components, features, and/or functionality as computing device 1200 of FIG. 12, described in more detail herein. The components, features, and/or functionality of the autonomous vehicle 102 described with respect to FIG. 1 may be implemented using the features, components, and/or functionality described in more detail herein with respect to FIGS. 11A-11D. In addition, the components, features, and/or functionality of the server(s) 104 described with respect to FIG. 1 may be implemented using the features, components, and/or functionality described in more detail herein with respect to FIG. 11D.

The autonomous vehicle 102 may include a sensor manager 108. The sensor manager 108 may manage and/or abstract sensor data from sensors of the vehicle 102. For example, and with reference to FIG. 11C, the sensor data may be generated (e.g., perpetually, at intervals, based on certain conditions) by global navigation satellite system (GNSS) sensor(s) 1158, RADAR sensor(s) 1160, ultrasonic sensor(s) 1162, LIDAR sensor(s) 1164, inertial measurement unit (IMU) sensor(s) 1166, microphone(s) 1196, stereo camera(s) 1168, wide-view camera(s) 1170, infrared camera(s) 1172, surround camera(s) 1174, long range and/or mid-range camera(s) 1198, and/or other sensor types.

The sensor manager 108 may receive the sensor data from the sensors in different formats (e.g., sensors of the same type, such as LIDAR sensors, may output sensor data in different formats), and may be configured to convert the different formats to a uniform format (e.g., for each sensor of the same type). As a result, other components, features, and/or functionality of the autonomous vehicle 102 may uses the uniform format, thereby simplifying processing of the sensor data. In some examples, the sensor manager 108 may use a uniform format to apply control back to the sensors of the vehicle 102, such as to set frame rates or to perform gain control. The sensor manager 108 may also update sensor packets corresponding to the sensor data with timestamps to help inform processing of the sensor data by various components, features, and functionality of the autonomous vehicle system 100.

A world model manager 122 may be used to generate, update, and/or define a world model. The world model manager 122 may use information generated by and received from an obstacle perceiver 110, a path perceiver 112, a wait perceiver 114, and/or a map perceiver 116. For example, the world model may be defined, at least in part, based on affordances for obstacles, paths, and wait conditions that can be perceived in real-time or near real-time by the obstacle perceiver 110, the path perceiver 112, the wait perceiver 114, and/or the map perceiver 116. The world model manager 122 may continually update the world model based on newly generated and/or received inputs (e.g., data) from the obstacle perceiver 110, the path perceiver 112, the wait perceiver 114, the map perceiver 116, and/or other components of the autonomous vehicle system 100.

The world model may be used to help inform planning component(s) 124 (e.g., associated with a planning layer of an autonomous driving software stack or architecture), control component(s) 126 (e.g., associated with a control layer of the autonomous driving software stack), obstacle avoidance component(s) 128 (e.g., associated with an obstacle or collision avoidance layer of the autonomous driving software stack, and/or actuation component(s) 130 (e.g., associated with an actuation layer of the autonomous driving software stack).

The obstacle perceiver 110 may perform obstacle perception that may be based on where the vehicle 102 is allowed to drive or is capable of driving, and how fast the vehicle 102 can drive without colliding with an obstacle (e.g., an object 106, such as a structure, entity, vehicle, etc.) that is sensed by the sensors of the vehicle 102. In some examples, the object(s) 106 may include other vehicles (e.g., cars, trucks, motorcycles, busses, etc.) that may be capable of communicating with the vehicle 102 directly and/or indirectly. For example, the object(s) 106 may communicate directly with the vehicle 102 via vehicle-to-vehicle communication, such as over one or more network types (e.g., local area wireless networks). In other examples, the object(s) 106 may communicate indirectly with the vehicle 102, such as via the server(s) 104 and one or more network(s) (e.g., over a cellular network). In such examples, the object(s) 106 may communicate with the server(s) 104 and the server(s) 104 may communicate with the vehicle 102, and vice versa. The information received from and/or about the object(s) 106 may also be used by the path perceiver 112, the map perceiver 116, and/or other component, features, and/or functionality of the vehicle 102.

The path perceiver 112 may perform path perception, such as by perceiving nominal paths that are available in a particular situation. In some examples, the path perceiver 112 further takes into account lane changes for path perception. A lane graph may represent the path or paths available to the vehicle 102, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver 114 may be responsible to determining constraints on the vehicle 102 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver 114 may be responsible for determining longitudinal constraints on the vehicle 102 that require the vehicle to wait or slow down until some condition is true. In some examples, wait conditions arise from potential obstacles, such as crossing traffic in an intersection, that may not be perceivable by direct sensing by the obstacle perceiver 110, for example (e.g., by using sensor data from the sensors, because the obstacles may be occluded from field of views of the sensors). As a result, the wait perceiver may provide situational awareness by resolving the danger of obstacles that are not always immediately perceivable through rules and conventions that can be perceived and/or learned. Thus, the wait perceiver 114 may be leveraged to identify potential obstacles and implement one or more controls (e.g., slowing down, coming to a stop, etc.) that may not have been possible relying solely on the obstacle perceiver 110.

The map perceiver 116 may include a mechanism by which behaviors are discerned, and in some examples, to determine specific examples of what conventions are applied at a particular locale. For example, the map perceiver 116 may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver 116 may inform the vehicle 102 of static or stationary infrastructure objects and obstacles. The map perceiver 116 may also generate information for the wait perceiver 114 and/or the path perceiver 112, for example, such as to determine which light at an intersection has to be green for the vehicle 102 to take a particular path.

In some examples, information from the map perceiver 116 may be sent, transmitted, and/or provided to the server(s) 104 (e.g., to a map manager 118 of the server(s) 104), and information from the server(s) 104 may be sent, transmitted, and/or provided to the map perceiver 116 and/or a localization manager 120 of the vehicle 102. The map manager 118 may include a cloud mapping application that is remotely located from the vehicle 102 and accessible by the vehicle 102 over a network(s) (e.g., the network(s) 1190 of FIG. 11D). For example, the map perceiver 116 and/or the localization manager 120 of the vehicle 102 may communicate with the map manager 118 and/or one or more other components or features of the server(s) 104 to inform the map perceiver 116 and/or the localization manager 120 of past and present drives or trips of the vehicle 102, as well as past and present drives or trips of other vehicles. The map manager 118 may provide mapping outputs (e.g., map data) that may be localized by the localization manager 120 based on a particular location of the vehicle 102, and the localized mapping outputs may be used by the world model manager 122 to generate and/or update the world model.

The planning component(s) 124, which may be part of a planning layer of the autonomous driving software stack or architecture, may include a route planner, a lane planner, a behavior planner, and a behavior selector, among other components, features, and/or functionality. The route planner may use the information from the map perceiver 116, the map manager 118, and/or the localization manger 120, among other information, to generate a planned path that may consist of GNSS waypoints (e.g., GPS waypoints). The waypoints may be representative of a specific distance into the future for the vehicle 102, such as a number of city blocks, a number of kilometers, a number of feet, a number of miles, etc., that may be used as a target for the lane planner.

The lane planner may use the lane graph (e.g., the lane graph from the path perceiver 112), object poses within the lane graph (e.g., according to the localization manager 120), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 102, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

In some examples, the behavior planner may consider more free-form trajectories by taking into account a dynamic occupancy grid (e.g., a grid indicative of objects, stationary and moving, in the vicinity of the vehicle 102, as determined by sensors of the vehicle 102 and/or map information), in addition to the other inputs of the planning component(s) 124 described herein. The behavior planner, in such examples, may generate a number of different paths (e.g., fanning out from a nominal or desired path for the behavior in question), such as paths that are slightly laterally offset with varying amounts of turning. The paths may then be compared against the dynamic occupancy grid to check for safety and desirability, including checking for comfort (e.g., to the passenger(s)) and agreement with the nominal path.

The behavior selector may perform logic based on the output of the behavior planner and the request from the lane planner to determine which behavior to execute. For example, if the lane planner requests that the vehicle 102 stay in the lane, the behavior selector may maintain the vehicle 102 in the current lane. If a lane change is requested by the lane planner, the lane change may be checked against the lane graph, and executed if the behavior planner determines that the lane change is safe and doesn't require heavy braking (e.g., that may cause discomfort to the passenger(s)). The path through a lane change may be the path produced by the behavior planner, when the behavior selector has confirmed the lane change is appropriate.

The control component(s) 126 may follow a trajectory or path (lateral and longitudinal) that has been received from the behavior selector of the planning component(s) 124 as closely as possible and within the capabilities of the vehicle 102. The control component(s) 126 may use tight feedback to handle unplanned events or behaviors that are not modeled and/or anything that causes discrepancies from the ideal (e.g., unexpected delay). In some examples, the control component(s) 126 may use a forward prediction model that takes control as an input variable, and produces predictions that may be compared with the desired state (e.g., compared with the desired lateral and longitudinal path requested by the planning component(s) 124). The control(s) that minimize discrepancy may be determined. In some examples, temporal filtering may be used to reduce oscillations experienced from delays that are not modeled (e.g., when no temporal element is used). Some examples may use model predictive control, such as Euler forward integration (or another form of forward integration) of the differential equations that model the motion of the vehicle 102. In such examples, discrepancies may be measured at multiple points in the future and balanced by a goal function. In some examples, for longitudinal control, a Proportional Integral Derivative (PID) controller may be used with lookup tables based on the relative distance, relative velocity, and velocity of the vehicle 102. Comfort limits may be put on acceleration (e.g., 5 m/s$^2$) and jerk, and/or speed dependent limits may be put on steering angle and steering angle rate.

Although the planning component(s) 124 and the control component(s) 126 are illustrated separately, this is not intended to be limiting. For example, in some embodiments, the delineation between the planning component(s) 124 and the control component(s) 126 may not be precisely defined. As such, at least some of the components, features, and/or functionality attributed to the planning component(s) 124 may be associated with the control component(s) 126, and vice versa.

The obstacle avoidance component(s) 128 may aid the autonomous vehicle 102 in avoiding collisions with objects (e.g., moving and stationary objects). The obstacle avoidance component(s) 128 may include a computational mechanism at a "primal level" of obstacle avoidance, and may act as a "survival brain" or "reptile brain" for the vehicle 102. In some examples, the obstacle avoidance component(s) 128 may be used independently of components, features, and/or functionality of the vehicle 102 that is required to obey traffic rules and drive courteously. In such examples, the obstacle avoidance component(s) may ignore traffic laws, rules of the road, and courteous driving norms in order to ensure that collisions do not occur between the vehicle 102 and any objects. As such, the obstacle avoidance layer may be a separate layer from the rules of the road layer, and the obstacle avoidance layer may ensure that the vehicle 102 is only performing safe actions from an obstacle avoidance standpoint. The rules of the road layer, on the other hand, may ensure that vehicle obeys traffic laws and conventions, and observes lawful and conventional right of way (as described herein).

Both the obstacle avoidance layer and the rules of the road layer may include perception component(s) and planning and control component(s). Core obstacle avoidance perception reliability may be ensured by multi-way redundancy, such as cameras, RADAR sensors, LIDAR sensors, etc. By separating out the obstacle avoidance layer, as is done in some examples, independent validation to high levels of reliability may be allowed, providing a foundation for safety. The rules of the road layer may be validated similarly, with ground truth measurements for the perception and right-of-way determination, and mathematical correctness validation of yield planning.

With respect to the autonomous vehicle system 100, for obstacle avoidance, the vehicle 102 may include at least one safety procedure and each of the objects 106 may include at least one safety procedure. The obstacle avoidance component(s) 128 may then operate under the assumption that the vehicle 102 and the objects 106 in the environment each include a respective safety procedure. The safety procedures for the vehicle 102 and/or the objects 106 may include procedures for straightening or fixing the steering wheel and coming to a complete stop, pulling to the side of the road and then coming to a complete stop, and/or another safety procedure. Obstacle avoidance according to the present disclosure may be based on an assumption that all actors (e.g., the vehicle 102 and the objects 106) should perform their safety procedures before the trajectory(ies) resulting from their safety procedures intersects with that of another actor. With this approach, a collision should not occur unless one of the actors did not do what was required. When a collision occurs, fault may be clearly determined because at least one of the actors likely did not follow their safety procedure. For example, the actor that did not perform its safety procedure before or during the time that the safety procedures intersect may be at fault, unless one of the actors that did perform its safety procedure was not traveling at a reasonable speed (e.g., as a function of the speed limit) at the time of its performance, in which case the fault may be attributed to the actor that was not traveling a reasonable speed.

A trajectory(ies) resulting from a safety procedure, as described herein, may be referred to as a safety force field, and when the trajectories (or safety force fields) of two or more actors intersect, the safety force fields may repel one another, and each actor may be required to implement their respective safety procedure, or another (alternative) procedure determined to have a lower likelihood or imminence of collision than the safety procedure. For example, an actor should not engage in its safety procedure when the safety procedure may not help minimize risk of a collision, such as to not brake when being tailgated. In such examples, the autonomous vehicle system 100 may determine whether the safety procedure is helpful (e.g., minimizes risk), and if it is not (at least as helpful in minimizing risk as another procedure), then another (alternative) procedure may be undertaken. For example, if the safety procedure for the vehicle 102 were to fix steering and come to a complete stop, but the vehicle 102 is being tailgated, the vehicle 102 may instead turn toward a side of the road and come to a complete stop, thereby avoiding the tailgating actor.

In some examples, such as the example in FIG. 1, the obstacle avoidance component(s) 128 may be located after the control component(s) 126 in an autonomous driving software stack (e.g., in order to receive desired controls from the control component(s) 126, and test the controls for obstacle avoidance). However, even though the obstacle avoidance component(s) 128 are shown stacked on top of (e.g., with respect to an autonomous driving software stack) the planning component(s) 124 and the control component(s) 126, this is not intended to be limiting. For example, the obstacle avoidance component(s) 128 may be additionally or alternatively implemented prior to either of the planning component(s) 124 or the control component(s) 126, prior to the control component(s) 126 but after the planning component(s) 124, as part of or integral to the planning component(s) 124 and/or the control component(s) 126, as part of the obstacle perceiver 110, and/or at a different part of an autonomous driving software stack or architecture depending on the embodiment. As such, the obstacle avoidance component(s) 128 may be implemented in one or more locations within an autonomous vehicle driving stack or architecture without departing from the scope of the present disclosure.

In some examples, as described herein, the obstacle avoidance component(s) 128 may be implemented as a separate, discrete feature of the vehicle 102. For example, the obstacle avoidance component(s) 128 may operate separately (e.g., in parallel with, prior to, and/or after) the planning layer, the control layer, the actuation layer, and/or other layers of the autonomous driving software stack.

The obstacle avoidance component(s) 128 may include a state determiner 132, a safety procedure determiner 134, a claimed set determiner 136, a trajectory generator 138, a safety potential calculator 140, a control analyzer 142, and/or one or more additional or alternative components. The state determiner 132 may determine a state of the actors (e.g., the vehicle 102 and the objects 106, static or dynamic) in the environment. The state of each actor may generally include a location, a speed, a direction (e.g., direction of travel), a velocity, an acceleration(s) (e.g., scalar, rotational, etc.), and/or other information about the state of the actors. The state may encode or represent the position of the actor in two-dimensional space (e.g., (x, y) coordinates), a unit direction of the actor, and/or a scalar velocity of the actor at a point in time. In some examples, the state may encode or represent additional or alternative information, such as rotational velocity (e.g., yaw) and/or scalar acceleration in any direction. For example, a state, $x_A$, for each actor, may be parameterized as an m-dimensional state vector, represented as follows, in equation (1):

$$x_A(t) \in \mathbb{R}^m \qquad (1)$$

As an example, such as where the state, $x_A$, is a five-dimensional vector (e.g., m=5), the state vector may be represented as follows, in equation (2):

$$x_A = [y^T d^T v]^T \qquad (2)$$

where y is the position of the actor in two-dimensional space, d is a unit direction vector, and v is a scalar velocity.

For each actor, when the state of the actor is viewed as a function of time, a vector may represent a state trajectory, $X_A$, of the actor (e.g., the state trajectory, $X_A$, may represent or encode each state, $x_A$, of the actor at each time within a period of time). The state trajectories may be determined for each of the actors by the state determiner 132, and the collection of the states (e.g., at any one time) and/or the collection of the state trajectories (e.g., as a function of time) may include a set of state spaces or state trajectories for all actors in the environment.

The state determiner 132 may determine the state of the vehicle 102 using any combination of sensors, such as the GNSS sensors 1158, the IMU sensor(s) 1166, the speed sensor(s) 1144, the steering sensor(s) 1140, etc. The state determiner 132 may determine and/or infer the state of the objects 106 in the environment using any combination of the stereo camera(s) 1168, the wide-view camera(s) 1170, the infrared camera(s) 1172, the surround camera(s) 1174, the long range and/or mid-range camera(s) 1198, the LIDAR sensor(s) 1164, the RADAR sensor(s) 1160, the microphone(s) 1196, the ultrasonic sensor(s) 1162, and/or other sensors of the vehicle 102. In some examples, the state of the objects 106 (e.g., when one or more of the objects 106 is another vehicle, or a person using a client device capable of wireless communication) may be determined using wireless communications, such as vehicle-to-vehicle communication, or device-to-vehicle communication, over one or more networks, such as, but not limited to, the network(s) described herein.

In some examples, machine learning models, such as neural networks (e.g., convolutional neural networks), may be used to determine the states of the actors. For example, sensor data from the sensors of the vehicle 102 may be applied to one or more machine learning models in order to aid the vehicle 102 in determining the state of the objects 106 in the environment. For example, the autonomous vehicle 102 may be configured to quickly and efficiently execute neural networks, on processed and/or unprocessed data for a variety of functions. For example, and without limitation, a convolutional neural network may be used for object detection and identification (e.g., using sensor data from camera(s) of the vehicle 102), a convolutional neural network may be used for distance estimation (e.g., using the sensor data from the camera(s) of the vehicle 102), a convolutional neural network may be used for emergency vehicle detection and identification (e.g., using sensor data from the microphone(s) of the vehicle 102), a convolutional neural network may be used for facial recognition and vehicle owner identification (e.g., using the sensor data from the camera(s) of the vehicle 102), a convolutional neural network may be used for identifying and processing security and/or safety related events, and/or other machine learning models may be used. In examples using convolutional neural networks, any type of convolutional neural networks may be used, including region-based convolutional neural networks (R-CNNs), Fast R-CNNs, and/or other types.

Once the state of the actors is determined, a control model may be determined for the actors (e.g., by the safety procedure determiner 134). For example, a control model may be represented as follows, in equation (3):

$$\frac{dx_A}{dt} = f(x_A, t, c) \quad (3)$$

As such, the control model for an actor may represent a derivative of the state of the actor, $x_A$, with respect to time, t, and control parameter(s), c. The control model may be formulated locally as an explicit differential equation with control parameter(s), c, that may model user input, such as steering, braking, and acceleration. For example, in some examples, the control model for an actor may be expressed according to equation (4), below:

$$\frac{dx_A}{dt} = [vd^T \quad vbd_\perp^T \quad a]^T \quad (4)$$

where v is a scalar velocity, d is unit direction vector, a is a scalar acceleration amount, b is a scalar steering parameter, and $d_\perp$ is the perpendicular to d, generated by flipping the coordinates of d and negating the first coordinate. In the example of equation (4), the control parameters may be a, the scalar acceleration amount, and b, the scalar steering parameter.

Once the control model is determined, a control policy may be determined (e.g., by the safety procedure determiner 134). For example, the control parameters may be a function of the world state, $x_w$ (or a perception of the world state based on the sensor data generated by the sensors of the vehicle 102), and time, t. As such, a control policy may be a function of the joint state space of the world and time into $\mathbb{R}^m$ (where m is the dimension of the state space of the actor) that is smooth and bounded. For example, a control policy may be represented as follows, in equation (5):

$$\frac{dx_A}{dt} = f(x_w, t) \quad (5)$$

Once the control policy is determined, a safety procedure may be determined for each actor (e.g., by the safety procedure determiner). For example, as described herein, each actor may be assumed to have a safety procedure, $S_A$. The safety procedure may have an associated trajectory(ies) derived from any starting state, X, of the actor. The safety procedure may represent the trajectory(ies) of the actor as the actor transitions form the state, X, to an actor state objective (e.g., a final location, where the actor may come to a stop). The actor state objective may be determined, in some examples, by analyzing sensor data received from one or more sensors (e.g., of the vehicle 102) to determine locations, orientations, and velocities of objects 106 (or other actors) in the environment. Control parameters (e.g., for steering, braking, accelerating, etc.), as described herein, may then be determined for the actors (e.g., the vehicle 102 and/or the objects 106), and a set of functions to guide the actor to the actor state objective may be determined.

The safety procedure may result in a trajectory(ies) that changes smoothly with its starting state (e.g., because the safety procedure may be a continuous deceleration to a stop). In some examples, a safety procedure, $S_A$, may be represented as follows, in equation (6):

$$S_A = \left\{ \frac{dx_A}{dt} = f(W, t) \right\} \quad (6)$$

where W represents properties of the world (or environment). The safety procedure for an actor may or may not depend on fixed properties of the world, depending on the embodiment. For example, the safety procedure may not depend on the fixed properties of the world, such as road shape or a map. In such an example, the safety procedure may include freezing a direction vector (e.g., by setting a scalar steering parameter, b, to zero), and coming to a complete stop by slowing down by a range of acceleration values $[a_{min}, a']$ (where $a_{min}$ is minimum acceleration amount or the negative of a maximum braking amount, and a' is a negative value larger than $a_{min}$), to a complete stop. This type of safety procedure, $S_A$, may be represented by equation (7), below:

$$S_A = \left\{ \frac{dx_A}{dt} = [vd^T \quad 0 \quad a]^T : a_{min} \leq a \leq a' \right\} \quad (7)$$

In any example, the safety procedure may include braking until reaching a complete stop. At high speeds, without limitation, the safety procedure may include lining up with a current lane (or with the direction of the road, such as when the vehicle 102 is in the middle of a lane change), and then coming to a complete stop (and thus may depend on fixed properties of the world, such as lane markings). For example and without limitation, at low speeds, the safety procedure may include the vehicle 102 steering itself to a side of the road as it decelerates to a stop (and thus may depend on the fixed properties of the world). For example, one or more neural networks (e.g., convolutional neural networks) may be used to identify the side of the road and/or to aid in maneuvering the vehicle 102 to the side of the road. As another example, an HD map 1122 may be used (e.g., using the map perceiver 116, the map manager 118, and/or the localization manager 120). In such an example, the HD map 1122 may be received over a network(s) 1190 and/or may be embedded in the vehicle 102.

In yet another example, the safety procedure may be modified to provide for a certain level of comfort (e.g., maximum comfort) for the passengers of the vehicle (e.g., minimum deceleration or directional change) while still guaranteeing avoidance of a collision. In such an example, a course, trajectory, and/or control sequence may be determined for the vehicle 102, as the safety procedure, that maximizes comfort and/or minimizes force exerted on passengers while still ensuring that a collision with other objects 106 (e.g., vehicles, entities, structures, etc.) is avoided. In some examples, such as where a collision is unavoidable or a likelihood of collision is above a threshold risk level, the safety procedure may be modified to minimize the risk of harm to the passengers in the vehicle and other entities should a collision occur.

Figure 2C:
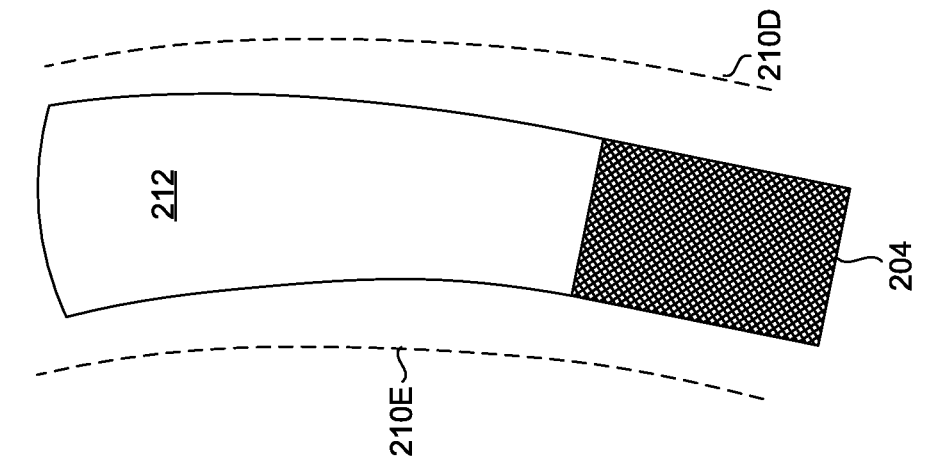
FIG. 2C is another example of a two-dimensional projection of a safety procedure for a vehicle, in accordance with some embodiments of the present disclosure.
Figure 2B:
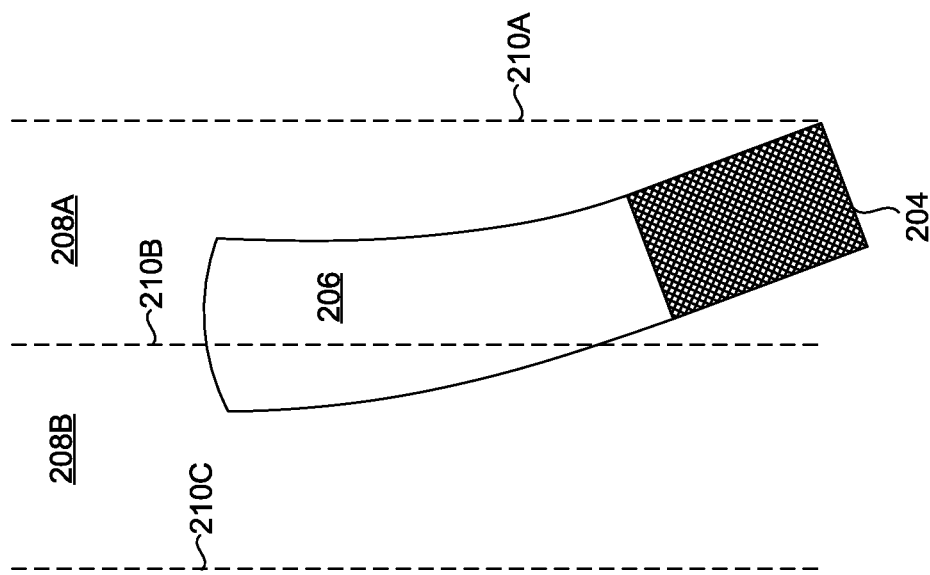
FIG. 2B is another example of a two-dimensional projection of a safety procedure for a vehicle, in accordance with some embodiments of the present disclosure.
Figure 2A:
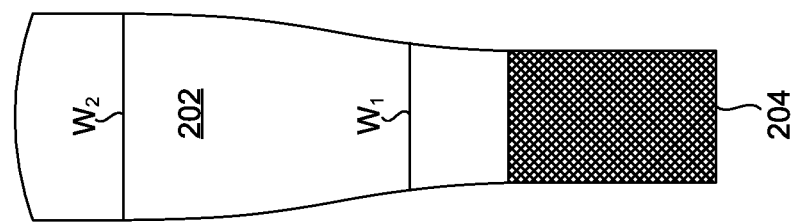
FIG. 2A is an example of a two-dimensional projection of a safety procedure for a vehicle, in accordance with some embodiments of the present disclosure.

Examples of safety procedures are illustrated with respect to FIGS. 2A-2C. For example, with respect to FIG. 2A, a safety procedure 202 may include an actor 204 (or a shape representing the actor 204) coming to a complete stop while maintaining a low or zero lateral rate of change. For example, in an unstructured environment, or when ignoring fixed properties of the world, the safety procedure 202 may include driving straight ahead and/or continuing along the current steering circle (which may or may not include a lateral rate of change) until the actor 204 comes to a complete stop. For example, if the actor is currently steering at a steering angle to the right, the safety procedure 202 may include continuing at the steering angle until a complete stop is reached. If the actor is currently steering straight, the safety procedure 202 may include continuing straight until a complete stop is reached (e.g., as illustrated in FIG. 2A).

In any example, the safety procedures for any actor may include a safety margin (e.g., in addition to, or alternatively from, the safety margin described herein with respect to a size of the actor). For example, with respect to the safety procedure 202, as time increases in space-time from the time associated with a current state of the actor, the safety margin for the safety procedure may increase. For example, with respect to the safety procedure 202, a width, $W_1$, of the claimed set of the safety procedure 202 may be less than a width, $W_2$, of the claimed set of the safety procedure 202. In such an example, because the width, $W_1$, may correspond to an earlier time, there may be less margin for error as compared to the time associated with the width, $W_2$. As a result, the safety margin may increase over space-time to account for this error.

As another example, a safety procedure 206 may include the actor 204 (or the shape representing the actor 204), during a lane change from a first lane 208A to a second lane 208B, aligning itself with the road (e.g., aborting the lane change and lining up with the direction of the road, such as parallel with lane markings 210A, 210B, and/or 210C), and coming to a complete stop. In such an example, the safety procedure may account for the fixed properties of the world (e.g., the lane markings, the direction of the road, etc.). The safety procedure 206 may be determined in order to minimize the lateral rate of change (e.g., with respect to the road shape) while still aborting the lane change and realigning the actor 204 with the road.

As a further example, a safety procedure 212 may include the actor 204 (or the shape representing the actor 204), following the road shape to accommodate for curves in the road and coming to a complete stop. For example, if the actor 204 is already following the road shape, and thus accounting for the fixed properties of the world, the safety procedure 212 may include continuing to follow the road shape (e.g., as defined by the lane markings 210D and 210E). Similar to the safety procedure 206, the safety procedure 212 may be determined in order to minimize the lateral rate of change while continuing to follow the road shape.

Once the safety procedure is determined, the claimed set determiner 136 may determine a claimed set of the vehicle 102 and the objects 106 in the environment. The claimed set for an actor may include an occupied trajectory (e.g., each of the points in space that the actor occupied when following a trajectory) of an actor when the actor applies its safety procedure, $S_A$, starting from state, $x_A$.

In order to determine the claimed set, the claimed set determiner 136 may determine an area and/or volume in space occupied by the actor given its state. For example, the autonomous vehicle system 100 may assume that actors move around in and occupy n-dimensional real space, $\mathbb{R}$. In some examples, for simplicity, the autonomous vehicle system 100 may use two-dimensional space modeling a top-down view of the real world. In other examples, the autonomous vehicle system 100 may use three-dimensional space. In any example, in order to determine the claimed set, the autonomous vehicle system 100 may first determine occupied sets of each actor, representing a set of points in space that the actor occupies as a function of its state. The occupied set, $o_A$, for an actor may be determined as follows, in equation (8), below:

$$o_A(x_A) \subseteq \mathbb{R}^n \qquad (8)$$

If a point in space is in the occupied set of the actor, the actor may be determined to occupy the point.

In order to determine each of the points in the occupied set, a size (e.g., an actual size of the actor) or representative size (e.g., a shape around and/or including the actor) of the actor may be determined. In some examples, the size or representative size may include an optional safety margin. With respect to the vehicle 102, the size of the vehicle 102 may be known (e.g., based on calibration information, vehicle information, vehicle make and model, and/or other parameters). With respect to the objects 106 in the environment, the size of the objects 106 may be determined using the sensors and sensor data therefrom (e.g., from the sensor manager 108), and/or one or more machine learning models (e.g., convolutional neural networks). In some examples, for determining the size of the actors (e.g., the vehicle 102 and the objects 106), a shape (e.g., a predefined shape, such as a square, polygon, bounding box, cube, circle, oval, ellipse, etc.) may be fit around the actor (e.g., to at least include the actor) and the size of the actor may be determined to be the size of the predefined shape (e.g., including a safety margin, in some examples, as described herein). For example, the shape may be a two-dimensional shape (e.g., a rectangle or circle), that serves as a bounding box that encircles the actor at least partially. In other examples, the shape may be a three-dimensional shape (e.g., a cube) that serves as a bounding cube that encircles the actor at least partially. In any example, the size of the vehicle may be used by the claimed set determiner 136 to determine the points (e.g., (x, y) coordinates) in space that the actor occupies as part of the occupied set, $o_A$.

In some examples, the size of the actor, and thus the representative shape corresponding to the size of the actor, may be determined such that the size and/or shape fully include the actor, at least in two-dimensions (e.g., laterally and longitudinally). By fully including the actor (with an additional safety margin, in examples), it may be more likely that the occupied set, the occupied trajectory, and thus the claimed set more accurately represent the actual points in space that the actor would occupy when executing the safety procedure.

Once the occupied set is determined, the claimed set determiner 136 may determine the occupied trajectory(ies), $O_A$, of each actor. The occupied trajectory(ies) may include the set of points in space-time that the actor will occupy over time as a function of its trajectory(ies). For example, the occupied trajectory(ies), $O_A$, may be determined as follows, in equation (9), below:

$$O_A(X_A) = \{(y,t) : y \in o_A(x_A(t)), t \in T\} \subseteq \mathbb{R}^n \times T \qquad (9)$$

The occupied trajectory(ies), when applying the safety procedure, $S_A$, of the actor may include the claimed set, $C_A$. Any points determined to be within the claimed set of an actor are points in space-time that the actor may require to maintain the integrity of its safety procedure. Thus, when looking at multiple actors in the environment, the vehicle 102 may analyze each of the claimed sets of the actors to determine if any intersection occurs between them. When an intersection occurs, one or more actions may be taken to account for the intersection (e.g., the safety procedure may be implemented, another action may be implemented, etc., as described herein). The claimed set, $C_A$, may be determined as follows, in equation (10), below:

$$C_A(x_A) \subseteq \mathbb{R}^n \times T \qquad (10)$$

where equation (10) may represent the occupied trajectory(ies) of the actor that results if the actor applies its safety procedure starting from state, $x_A$. In some examples, as described herein, the claimed set may represent a combination or aggregation of each of the occupied trajectories that result from applying the actor's safety procedure with different parameters. For example, the safety procedure may be applied with a maximum braking profile, a minimum braking profile, a braking profile in between the maximum and minimum, a maximum steering profile, a minimum steering profile, a steering profile in between the maximum and minimum, and/or in other ways. In such examples, the claimed set may include the occupied trajectories for any number of different applications (e.g., for each different application) of the safety procedure, combined or aggregated.

As a first example, the claimed set may represent the safety procedure with a first braking profile for coming to a complete stop more quickly than a second braking profile, and may represent the safety procedure with the second braking profile for coming to a complete stop more slowly (e.g., than the first braking profile) while still avoiding a collision. In such an example, thresholds or bounds may be set and/or determined to define the first braking profile (e.g., a defined maximum or upper bounded braking profile) and the second braking profile (e.g., a defined minimum or lower bounded braking profile). In such an example, the claimed set may represent each of the points in space-time occupied by the actor by the safety procedure applied with the first braking profile, the second braking profile, and the points in space-time occupied by the actor that fall between first and second braking profiles (e.g., as illustrated in and described with respect to FIGS. 3C-3E). Depending on the specific embodiment, the thresholds or bounds for generating the claimed set may be different.

The thresholds or bounds may be defined, without limitation, based on percentages (e.g., braking intensity percentages) and/or time (e.g., time to come to a complete stop, such as based on a current speed or velocity). For example, the first braking profile may include a 95% braking intensity and the second braking profile may include an 85% braking intensity. As another example, if the vehicle 102 is traveling sixty miles per hour (mph), the first braking profile may include coming to a stop within three seconds (e.g., slowing down by an average of twenty mph per second), while the second braking profile may include coming to a stop within four seconds (e.g., slowing down by an average of fifteen mph per second). To determine the time, a factor of speed may be used in some examples. In such examples, the first braking profile may include one second for every ten mph the vehicle 102 is traveling based on a current state, $x_A$, of the vehicle 102, and the second braking profile may include one second for every fifteen mph the vehicle 102 is traveling based on a current state, $X_A$, of the vehicle 102. Continuing with the preceding example of the vehicle 102 traveling at sixty mph, the first braking profile may include coming to a stop within three seconds, and the second braking profile may include coming to a stop within four seconds.

As another example, the claimed set may represent the safety procedure with a first steering profile (e.g., a defined maximum steering profile) for reaching a lateral location (e.g., the side of the road, lining up with the road, etc.) more quickly than a second steering profile, and may represent the safety procedure with the second steering profile for reaching the lateral location more slowly than the first steering profile. In such an example, thresholds or bounds may be set and/or determined to define the first steering profile (e.g., a defined maximum or upper bounded steering profile) and the second braking profile (e.g., a defined minimum or lower bounded steering profile). In such an example, the claimed set may represent each of the points in space-time occupied by the actor by the safety procedure applied with the first steering profile, the second steering profile, and the points in space-time occupied by the actor that fall between the first and second steering profiles. Depending on the embodiment, the thresholds or bounds for generating the claimed set may be different.

Similar to the thresholds or bounds for the braking profiles, the steering profiles may also be based on percentages (e.g., percentages of steering angle intensity) and/or time (e.g., amount of time to reach the lateral position).

Figure 3A:
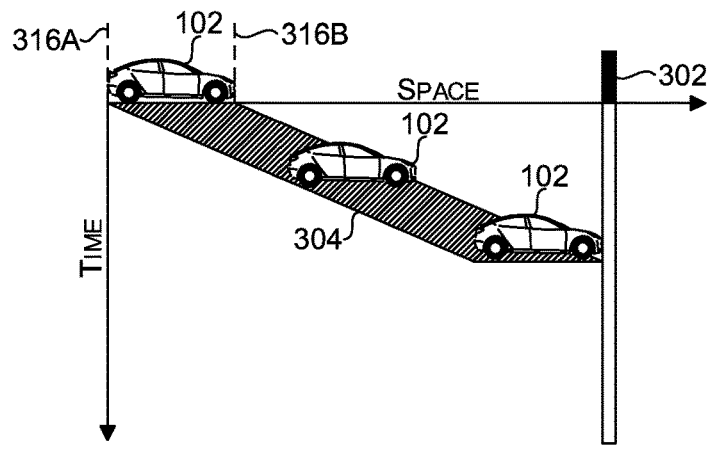
FIG. 3A is an illustration of a space-time plot of a vehicle, in accordance with some embodiments of the present disclosure.

As a simplified example of claimed sets, the vehicle 102 may be driving toward a static object 302 (where the driving direction is represented in one dimension in the space-time plot of FIG. 3A). The vehicle 102, when not executing a safety procedure, may have an occupied trajectory 304 that results in the vehicle 102 colliding with the static object 302 (e.g., the vehicle 102 does not implement a safety procedure, but rather continues driving along the same path at the same speed until colliding with the object). The static object 302 is fixed along the space dimension in the space-time plot because the static object 302 does not move. In this example, a bounding polygon may be used to represent the size of the vehicle 102 (e.g., a bounding polygon extending from the front to the back of the vehicle 102, between bounding lines 316A and 316B).

Figure 3B:
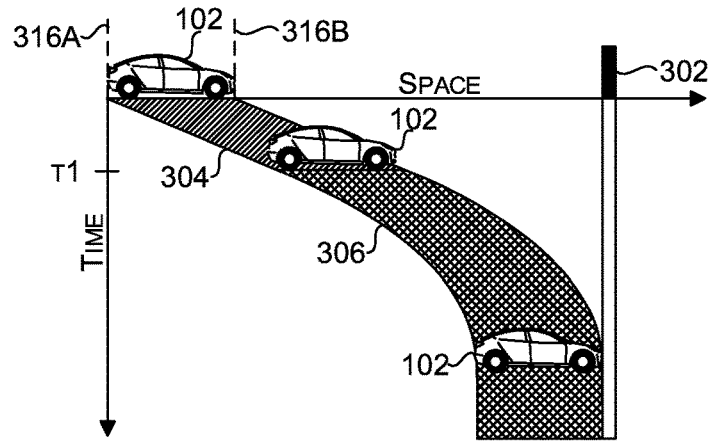
FIG. 3B is an example illustration of another space-time plot of a vehicle, in accordance with some embodiments of the present disclosure.

To account for the situation of FIG. 3A, a safety procedure may be implemented, such as to brake until the vehicle 102 comes to a complete stop prior to colliding with the static object 302. For example, and with respect to FIG. 3B, the trajectory generator 138 may generate the trajectory 306, represented by a corresponding claimed set as determined by the claimed set determiner 136, corresponding to the safety procedure, and the vehicle 102 may implement the safety procedure at time, TI, such that the vehicle 102 stops just prior to colliding with the static object 302. The trajectory generator 138 may persistently project the trajectory 306 (e.g., representing the claimed set of the trajectory of the safety procedure) into space until the trajectory 306 is determined to almost intersect the static object 302 (e.g., at time, TI), and then the vehicle 102 may implement the safety procedure by actuating the brakes at an intensity that corresponds to the safety procedure (e.g., an intensity that will stop the vehicle 102 prior to colliding with the static object 302, with some margin for error, depending on the embodiment). In some examples, the trajectory 306 may correspond to a second braking profile (e.g., defined minimum or lower bounded braking profile).

Figure 3C:
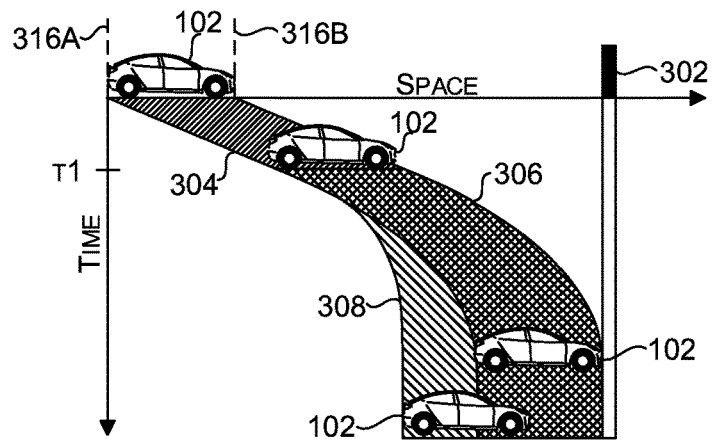
FIG. 3C is an example illustration of another space-time plot of a vehicle, in accordance with some embodiments of the present disclosure.

As another example, and with respect to FIG. 3C, the trajectory generator 138 may generate the trajectories 306 and 308, represented by the corresponding claimed set as determined by the claimed set determiner 136, that correspond to a safety procedure implemented using two different braking profiles (e.g., the claimed set may include each of the points in space-time occupied by the vehicle 102 if the vehicle 102 were to implement both the first trajectory 306, the second trajectory 308, and/or any trajectory in-between). For example, the trajectory 306 may include a first braking profile (e.g., a defined minimum or lower bounded braking profile) and the trajectory 308 may include a second braking profile (e.g., a defined maximum or upper bounded braking profile). In this example, the vehicle 102 may implement the safety procedure just prior to the trajectory 306 colliding with the static object 302 (e.g., at time, TI). Thus, the trajectory generator 138 may persistently project the trajectory 306 and/or 308 (as represented by the corresponding claimed set) into space-time until the trajectory 306 (or 308, in some examples) is determined to almost intersect the static object 302, and then the vehicle 102 may implement the safety procedure by actuating the brakes at an intensity that corresponds to the chosen braking profile for the safety procedure.

A property of the claimed set may be that the claimed set does not grow over time when applying the safety procedure. As such, for a safety procedure, the minimum (or safety) braking profile and the maximum braking profile may be defined such that the claimed set is not increasing (although the claimed set may decrease). As such, at each time step or stage of implementing the safety procedure, the claimed set may not increase. As a result, when the safety procedure is first implemented, and at the conclusions of the safety procedure (e.g., when at a complete stop), the claimed set should be unchanged.

Figure 3D:
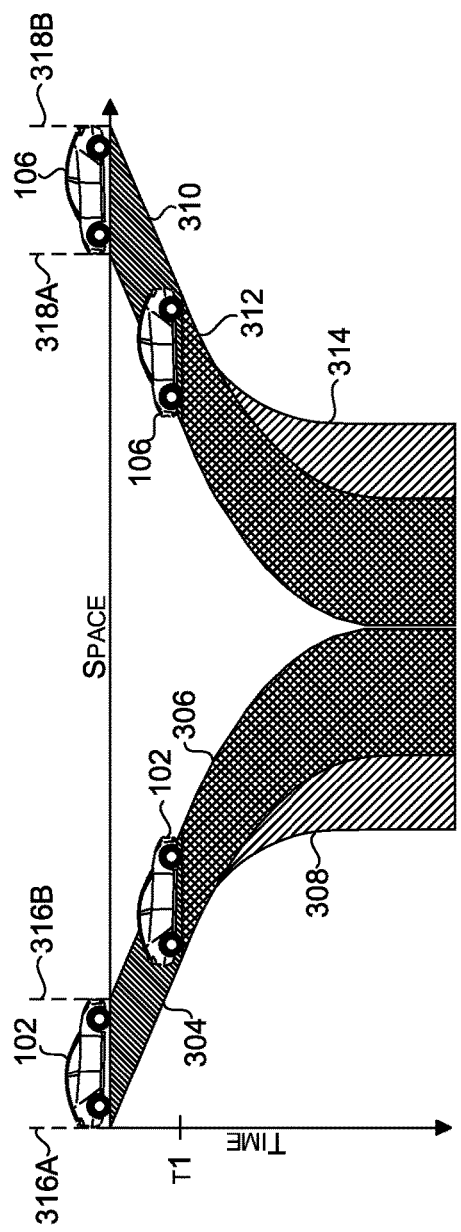
FIG. 3D is an example illustration of another space-time plot of a vehicle, in accordance with some embodiments of the present disclosure.

With reference to two or more actors, and with respect to FIG. 3D, the trajectory generator 138 may generate the trajectories 306 and 308 for the vehicle 102, and may generate the trajectories 312 and 314 for the object 106 (which may be another vehicle, in this example). The trajectories 312 and 314 for the object 106 may be based on a bounding polygon, similar to that of the vehicle 102, with a size extending between bounding lines 318A and 318B. The trajectory 312 may include a braking profile corresponding to a safety procedure (e.g., similar to the trajectory 306 for the vehicle 102) determined for the object 106 (e.g., based on a state, a control model, a control policy, a type, a size, and/or other information of the object 106 as perceived and/or determined by the vehicle 102). The trajectory 314 may include a maximum braking profile corresponding to a more aggressive braking profile for the safety procedure, similar to that of the trajectory 308 of the vehicle 102. In any example, the points in space-time occupied by the projection of the trajectories 306 and 308 may include the claimed set of the vehicle 102, and the points in space-time occupied by the projection of the trajectories 312 and 314 may include the claimed set of the object 106.

As a result of the object 106 moving, in the example of FIG. 3D, toward the vehicle 102, as the vehicle 102 follows the trajectory 304 (e.g., a driving trajectory prior to intersection or near-intersection of the trajectories 306 and 312) and the object 106 follows the trajectory 310 (e.g., a driving trajectory prior to the intersection or near intersection of the trajectories 306 and 312), the vehicle 102 and the object 106 are approaching one another. As a result, once the trajectories 306 and 312 (and/or 308 and 314) are determined to intersect, or are determined to be within a threshold distance to intersecting (e.g., using a bump function, as described herein), the vehicle 102 may implement the safety procedure corresponding to the trajectory 306, the trajectory 308, and/or another trajectory in between the two. In such an example, the goal may be that the object 106 also implements its safety procedure according to the trajectory 312, the trajectory 314, and/or another trajectory between the two, at the same time or within an amount of time that allows the object 106 to stop prior to collision with the vehicle 102. As described in greater detail herein, if a collision occurs in this example, and the vehicle 102 had implemented the safety procedure, the fault may be attributed to the object 106 because the vehicle 102, at least, did not contribute to the likelihood or imminence of collision.

Figure 3E:
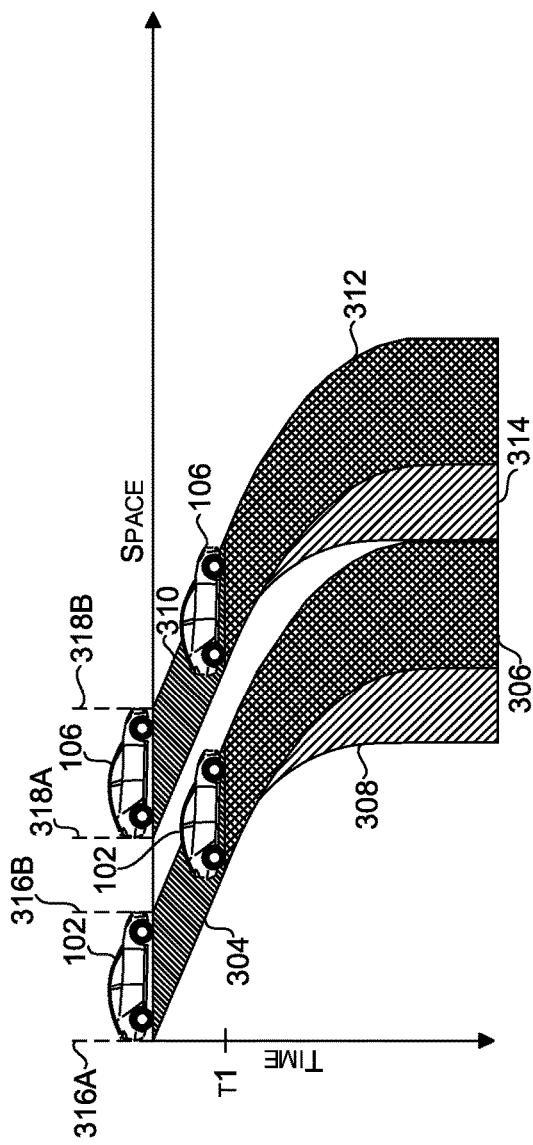
FIG. 3E is an example illustration of another space-time plot of a vehicle, in accordance with some embodiments of the present disclosure.

As another example, and with respect to FIG. 3E, as the vehicle 102 follows the trajectory 304 (e.g., a driving trajectory prior to intersection or near-intersection of the trajectories 306 and 314 and/or 312) and the object 106 follows the trajectory 310 (e.g., a driving trajectory prior to the intersection or near intersection of the trajectories 306 and 314 and/or 312), the vehicle 102 and the object 106 may be moving in a similar direction. As a result, once the trajectories 306 and 314 (and/or 306 and 312) are determined to intersect, or are determined to be within a threshold distance to intersecting, the vehicle 102 may implement the safety procedure corresponding to the trajectory 306, the trajectory 308, and/or another trajectory in between the two. In such an example, the goal may be that the object 106 also implements its safety procedure according to the trajectory 312, the trajectory 314, and/or another trajectory between the two, at the same time or within an amount of time that allows the object 106 to stop prior to collision with the vehicle 102.

Figure 3F:
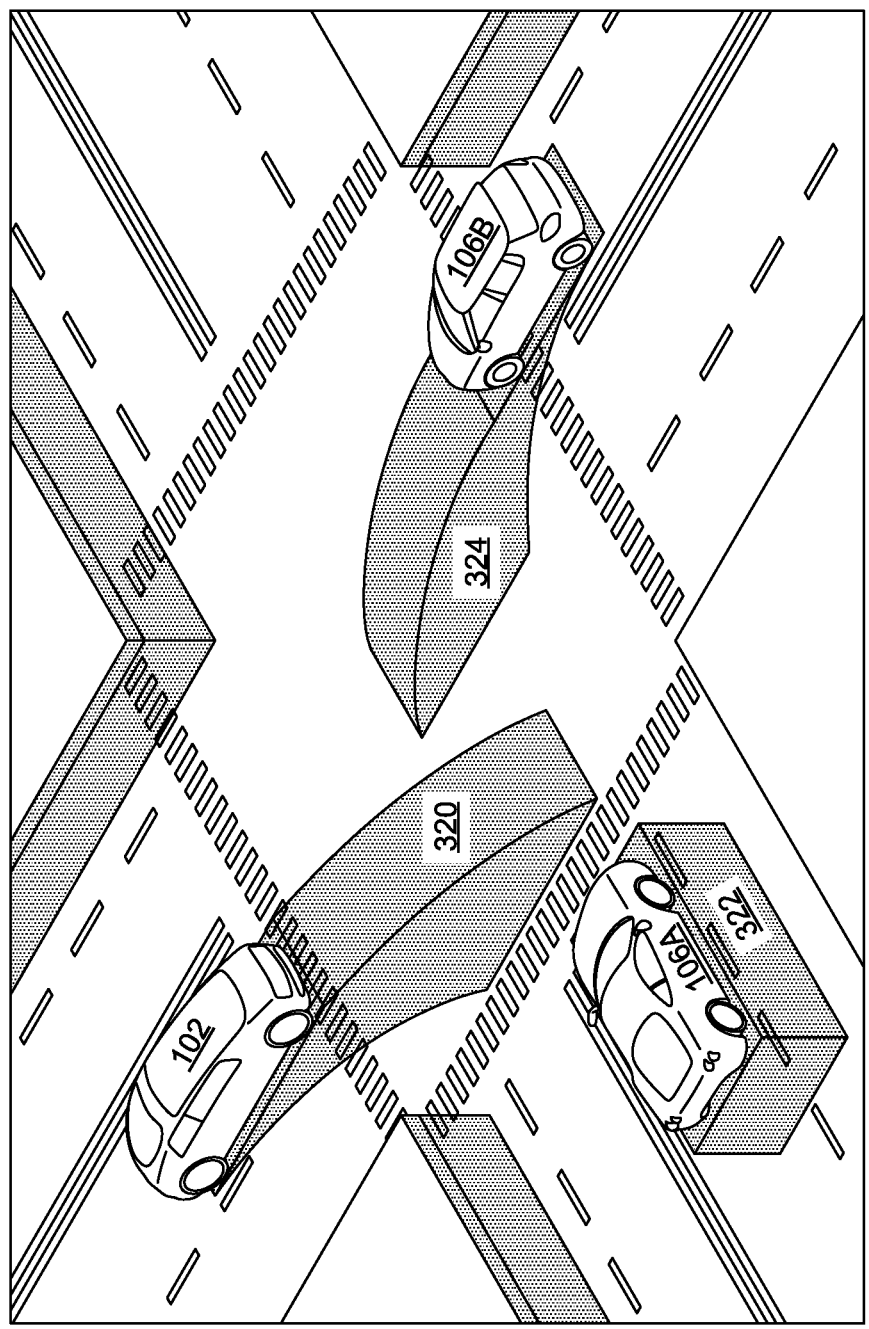
FIG. 3F is an example of a three-dimensional illustration of safety procedures for a plurality of vehicles, in accordance with some embodiments of the present disclosure.

Yet another example, and with respect to FIG. 3F, includes the vehicle 102, a first object 106A (e.g., a vehicle, in this example), and a second object 106B (e.g., a vehicle, in this example) in an environment 326. In this example, the trajectories may occupy a three-dimensional space (e.g., a volume) in space-time within the environment 326. As such, the trajectories may include a longitudinal distance (e.g., a braking or stopping distance), a lateral change (e.g., a steering change), and/or a vertical space (e.g., from the ground plane to a top of a bounding polygon or other shape representative of the occupied set of the actor) occupied by the actors (e.g., the vehicle 102, the first object 106A, and the second object 106B) if the actors were to implement their respective safety procedures. As such, the trajectories may be analyzed as solid volumes with lengths that increase with velocity (e.g., the faster the actor is moving, the longer the trajectory(ies) and the corresponding points in space-time included in the occupied sets), and the actors may be characterized as driving around with these volumes attached to them (e.g., protruding from them) while performing collision analysis for the volumes (e.g., the trajectories) instead of performing collision analysis on their actual shape. As a result, by guaranteeing no collision in space-time volumes, a guarantee of no collisions in actual space may be induced. This may provide a benefit because avoiding collisions between actual physical objects in actual space requires foresight since actors have inertia, and once a physical overlap takes place, it may already be too late. However, in space-time, the volumes or trajectories may be thought of as frozen once an intersection, overlap, or near intersection or overlap is determined between the volumes in space-time and, because there are both lateral and longitudinal dimensions, and shared geometry between the vehicle 102 and the object(s) 106 may not be allowed, the vehicle 102 may be free from collisions (or at least may not contribute to a likelihood of a collision, because other actors actions are outside of the control of the vehicle 102).

In such an example, the trajectory generator 138 of the vehicle 102 may generate the vehicle-occupied trajectory(ies) 320 representative of the safety procedure for the vehicle 102 (applied over a range of profiles, in some examples), the object-occupied trajectory(ies) 322 representative of the safety procedure for the first object 106A, and the object-occupied trajectory(ies) 324 representative of the safety procedure for the second object 106B. In the illustration of FIG. 3F, there is no overlap or intersection, or near overlap or intersection, between any of the trajectories 320, 322, and 324. As such, at the point in time illustrated in FIG. 3F, neither the vehicle 102, the first object 106A, nor the second object 106B may implement their safety procedures. However, were one of the trajectories 320, 322, or 324 to overlap or nearly overlap with another of the trajectories 320, 322, or 324, the actors involved in the overlap or near overlap would be expected to implement their safety procedures (e.g., the vehicle 102 would implement the safety procedure if involved, and would expect the other actor to implement their respective safety procedure, in order to avoid a collision).

With respect to FIG. 3F, the points in space-time occupied by the projection of the trajectory(ies) 320 may include the claimed set of the vehicle 102 when implementing the safety procedure. Similar to described herein with respect to FIGS. 2C-2E, the vehicle-occupied trajectory(ies) 320 may include a first braking profile, a second braking profile, a braking profile of another threshold, and/or a combination thereof. Similarly, the points in space-time occupied by the projection of the object-occupied trajectory(ies) 322 may include the claimed set of the first object 106A, and the points in space-time occupied by the projection of the object-occupied trajectory 324 may include the claimed set of the second object 106B.

With respect to FIGS. 4A-4F, FIGS. 4A-4F illustrate various different safety procedures that may be implemented by various actors and the actor-occupied trajectories associated with those safety procedures (e.g., the trajectories representing the claimed sets of the actors if the actors were to implement their safety procedures). In any example, an end of an actor-occupied trajectory(ies) (e.g., a vehicle-occupied trajectory and/or an object-occupied trajectory) may indicate the point in space-time where the actor comes to a complete stop (e.g., as indicated by a portion 420 of the vehicle-occupied trajectory 402 in FIG. 4C).

With respect to FIG. 4A, if the vehicle 102 is following an object 106, the vehicle 102 may determine that it is following at an unsafe distance (e.g., because the vehicle-occupied trajectory(ies) 402 of the vehicle 102 overlaps the object-occupied trajectory(ies) 404 of the object 106). In such a scenario, the vehicle 102 may implement its safety procedure and begin to slow down to avoid a collision with the object 106. In some examples, as the vehicle 102 slows down, the length of the vehicle-occupied trajectory(ies) 402 may decrease (e.g., because the speed is less, the time to stop—and thus execute the safety procedure—would also be less), and because the vehicle 102 would be moving further away from the object 106 by slowing down, the vehicle-occupied trajectory(ies) 402 would eventually not overlap with or intersect with the object-occupied trajectory(ies) 404. If the vehicle 102 is not yet at a complete stop at the time there is no longer an intersection, the vehicle 102 may abort the safety procedure and hand off control back to the planning layer or the control layer of the autonomous driving software stack, for example. Thus, the vehicle 102 may implement the safety procedure only when and for as long as danger exists, and then may abort the safety procedure.

With respect to FIG. 4B, if the vehicle 102 is changing lanes into a lane including the object 106, the vehicle 102 may determine that the lane change is unsafe (e.g., because the vehicle-occupied trajectory(ies) 402 of the vehicle 102 overlaps the object-occupied trajectory(ies) 404 of the object 106). In such a scenario, the vehicle 102 may implement its safety procedure and begin to slow down and/or line up with the road (e.g., abort the lane change, similar to the example of FIG. 2B) to avoid a collision with the object 106.

With respect to FIG. 4C, if the vehicle 102 is in a more complicated scenario, such as where a first object 106A is coming toward the vehicle 102 and a second object 106B is coming toward the vehicle from the side, the vehicle 102 may determine (e.g., at the time illustrated in FIG. 4C, where intersection is near, or at a later time, when intersection is even more near) that the current path is unsafe. In such a scenario, the vehicle 102 may implement its safety procedure and begin to slow down to avoid a collision with the objects 106A and/or 106B. In some examples, there may be no way to fully avoid the collision, and the vehicle 102 may instead implement the safety procedure, or another action, that may cause the least amount of harm (e.g., reduce the safety potential) to the passengers of the vehicle 102 and the objects 106A and 106B, as described herein.

With respect to FIG. 4D, and another benefit of the present disclosure, if the vehicle 102 is attempting to change lanes into slow traffic between a first object 106A and a second object 106B (e.g., where the vehicle 102 cannot actually fit between the objects 106A and 106B), the vehicle may be allowed to do so. For example, because the vehicle 102 may be able to move into the lane at a slow speed (e.g., as indicated by the short trajectories 402, 404A, and 404B) without the vehicle-occupied trajectory(ies) 402 overlapping any of the trajectories 404A and 404B of the objects 106, the vehicle 102 may proceed with the lane change as long as no overlap is determined. In such an example, the first object 106A may slow down to allow the vehicle 102 into the lane, the second object 106B may speed up, and/or a combination thereof. However, if at any time during the lane change the object 106A speeds up, the object 106B slows down, and/or a combination thereof, thereby causing an overlap between the vehicle-occupied trajectory(ies) 402 and the object-occupied trajectory(ies) 404A and/or 404B, the vehicle 102 may implement the safety procedure and abort the lane change.

In contrast to conventional systems that analyze a path of the vehicle laterally separate from longitudinally (e.g., that would not allow this type of lane change, because the first object 106A may be determined to be laterally in the path of the vehicle 102), the current system 100 may allow for these types of maneuvers (e.g., maneuvers where a complete space for the vehicle 102, such as between the first object 106A and the second object 106B, is not present at all times). As such, because the autonomous vehicle system 100, by monitoring the trajectories 402, 404A, and 404B, may have determined that worst case, the vehicle 102 and the objects 106A and 106B are capable of implementing their safety procedures prior to a collision, the vehicle 102 may be allowed by the autonomous vehicle system 100 to perform the lane change as illustrated in FIG. 4D.

Figure 4E:
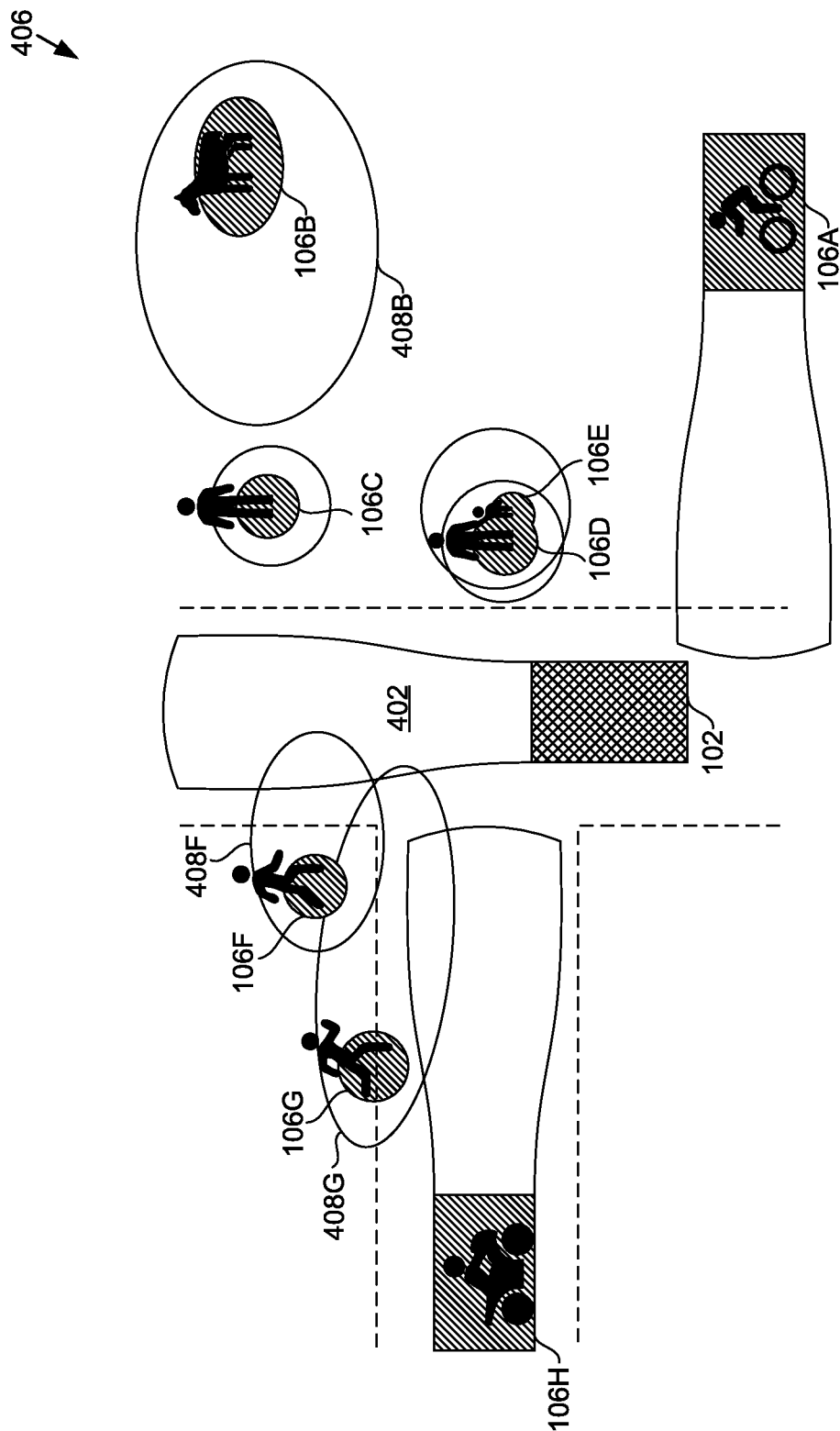
FIG. 4E is an example of two-dimensional projections of safety procedures for a plurality of objects, in accordance with some embodiments of the present disclosure.

With respect to FIG. 4E, FIG. 4E illustrates examples where the objects 106 may be pedestrians, children, animals, motorcycles, bicyclists, vehicles, and/or other types of objects 106. For different object types, there may be different safety procedures. For example, children (e.g., the object 106E), adults (e.g., the objects 106G, 106F, 106C, 106D), running adults (e.g., the object 106G), walking adults (e.g., the object 106F), animals (e.g., the object 106B), motorcycles (e.g., the object 106H), bicyclists (e.g., the object 106A), and/or other types of objects may have different corresponding safety procedures. As such, the safety procedure determiner 134 may determine the appropriate safety procedure for each of the objects 106 perceived and/or determined to be in the environment 406. For example, because movement of people and animals may be erratic (e.g., they can move any direction and/or change direction quickly), the safety procedures may extend longer along the direction of movement of the person or animal, but also extend to each side and behind the people or animals (e.g., such as illustrated in the object-occupied trajectories 408B, 408F, and 408G). As a result, the safety procedure for a pedestrian and/or animal may account for the pedestrian and/or animal running in any direction as fast as they are capable (e.g., a non-vigilant pedestrian). Even with this approach, the vehicle 102 may behave conservatively, with safety stemming from the reasonable limits on how fast a pedestrian and/or animal is capable of moving.

In the example of FIG. 4E, the vehicle-occupied trajectory(ies) 402 of the vehicle 102 may overlap with the object-occupied trajectories 408F and 408G of the pedestrians. In such an example, the vehicle 102 may execute its safety procedure, and the pedestrians (e.g., the objects 106G and 106F) may be expected to execute their safety procedures (e.g., to slow down, or stop). As such, the vehicle 102 may begin slowing down (and may possibly turn to the right, as a modification to the safety procedure, to avoid the pedestrians, as will be described in more detail herein). Ultimately, as the vehicle 102 slows down, and the objects 106G and 106F slow down, the vehicle-occupied trajectory(ies) 402 and the object-occupied trajectories 408G and/or 408F may no longer overlap or intersect, at which time the vehicle 102 may abort the safety procedure and continue along the path the vehicle 102 was traveling prior to implementing the safety procedure.

Figure 4F:
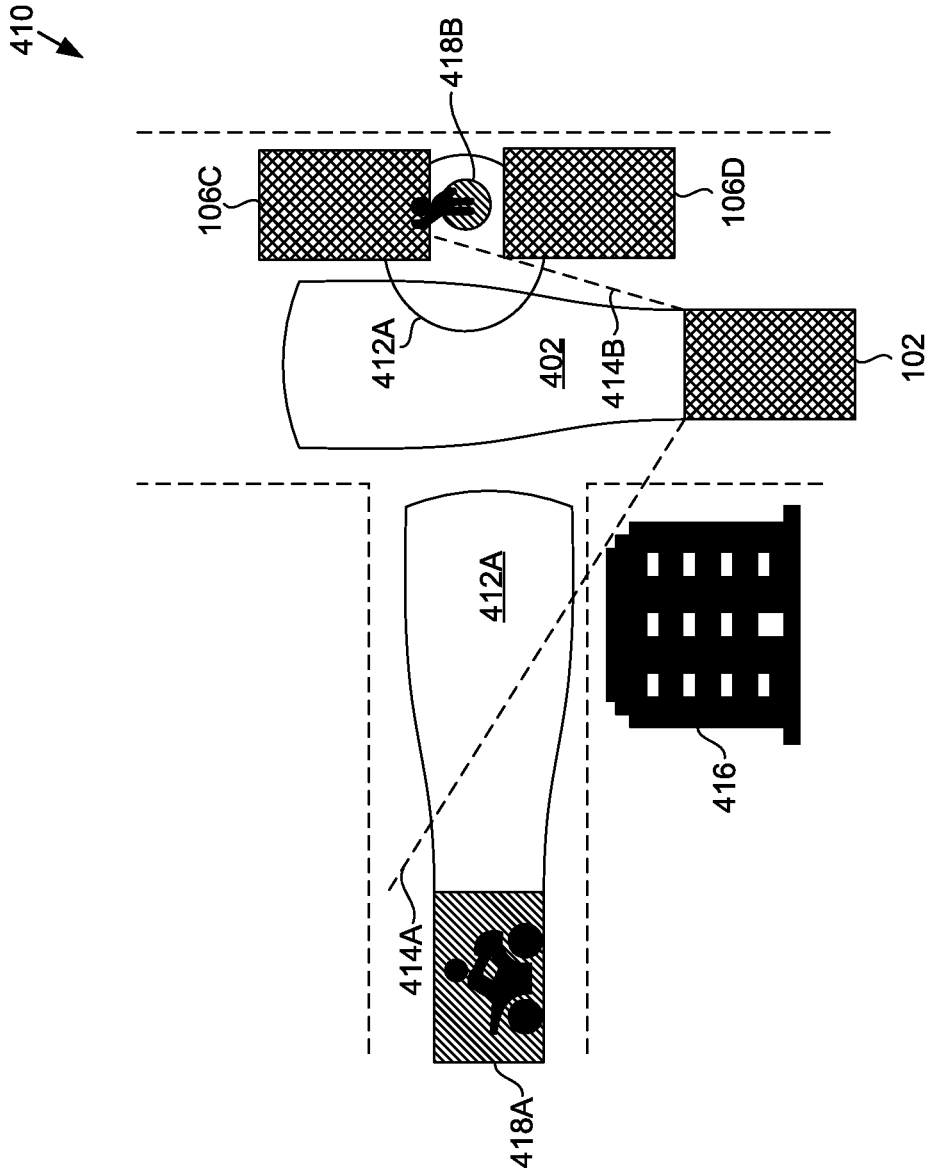
FIG. 4F is an example of two-dimensional projections of safety procedures for a plurality of perceived and unperceived objects, in accordance with some embodiments of the present disclosure.

With respect to FIG. 4F, FIG. 4F illustrates examples where portions of the environment 410 may be occluded from the fields of view of the sensors of the vehicle 102. As a result, the vehicle 102 may not be able to accurately perceive all the objects (e.g., some objects may be occluded), and thus may not be able to determine the respective safety procedures of occluded objects. For example, the vehicle 102 may only be able to perceive the environment 410 within the field of views of the sensors, as illustrated by the area between the lines of sight 414A and 414B in FIG. 4F. In such examples, the vehicle 102 may determine invisible actors 418A and 418B (alternatively referred to herein as unperceived actors).

The invisible actors 418A and 418B may be determined based on rules or logic of certain circumstances and/or variables in the environment 410. For example, in some examples, the vehicle 102 may handle visibility limitations by assuming the worst. However, this may be impractical for the vehicle 102, such as by causing the vehicle 102 to behave too conservatively (e.g., constant braking or driving at excessively low speeds) for practical use. As a result, in some examples, a reasonableness standard is used. For example, a speed cap may be put into place, such as two times the speed limit, such that the vehicle 102 may determine that actors going above two times the speed limit may be present, they are unreasonable, and thus may discount them when determining whether or not to implement the safety procedure, but acknowledges them when assessing fault. Determining these reasonable invisible actors may be part of a control policy, as described in more detail herein.

For example, with respect to the invisible actor 418A, that may exist behind the building 416, the vehicle 102 may determine that it is reasonable that the invisible actor 418A may be there because there may be a three-way intersection with stop-signs, or with a stop light, and the light for the vehicle 102 may be yellow (e.g., indicating that another vehicle, the invisible actor 418A, could be entering the intersection from behind the building 416). However, in the same scenario, were the light to be green for the vehicle 102, it may not be reasonable to assume an invisible actor 418A, or at least an invisible actor with a trajectory(ies) 412A that extends so far, because any actor coming from behind the building 416 would have a red light and would be stopping (or would be breaking traffic laws).

As another example, with respect to the invisible actor 418B, that may exist behind the object 106D (e.g., a parked vehicle) and in front of the object 106C (e.g., another parked vehicle), the vehicle 102 may determine that it is reasonable that the invisible actor 418B may be there because the invisible actor 418B (e.g., a person, based on reasonable object types that may be between two parked cars) may be attempting to cross the street, or to enter one of the vehicles (e.g., the objects 106C or 106D). As a result, and because the object-occupied trajectory(ies) 412A of the invisible actor 418B intersects or overlaps with the vehicle-occupied trajectory(ies) 402 of the vehicle 102, the vehicle 102 may begin to execute its safety procedure by slowing down, at least until the space between the objects 106C and 106D is no longer occluded, and the existence of an actual object 106 has been confirmed or denied.

In some examples, latency, discretization, and/or reaction time may be at least a few of the practical limitations of the autonomous vehicle system 100 and actors that may be modeled. The autonomous vehicle system 100 may deal with a limitation in perception, or more precisely perception and action, in the sense that when an actor takes action, it is inevitably based on perception that is not completely current (e.g., with a time delay). As a result, when the actor takes action, it may be based on perception of the world at some earlier point in time. For example, an actor (e.g., a human actor, such a manually driven vehicle, or a pedestrian), may have some reaction time (e.g., based on lack of attentiveness due to looking at a phone, or reaching for something, etc.) before noticing that a potential collision may occur. In such an example, the autonomous vehicle system 100 may account for this reaction time. In other examples, an actor, such as a vehicle, may include a latency or lag between when a command is received and when the actuation actually occurs. The latency or lag may be known (e.g., after identifying a vehicle type, for example), or may be perceived (e.g., using one or more neural networks). In such examples, the autonomous vehicle system 100 may account for this latency or lag. In any example, the shape (e.g., length, width, height, etc.) of the trajectory(ies) of the claimed sets for the actors (e.g., the vehicle 102 and/or the objects 106) may be adjusted (e.g., lengthened, widened, etc.) to account for latency, lag, or reaction time.

In some examples, it may be assumed that the amount of latency is $\Delta t$. In order to account for $\Delta t$, in some examples, a form of worst-case forward prediction may be used, such that a forwarded set, $\Phi_A(x_A, \Delta t)$, of actor A by a time interval, $\Delta t$, is the set of all states that actor A could possibly get to at the time interval $\Delta t$ after being in state, $x_A$. The forwarded set of a collection, $\Theta$, of actors by a time interval, $\Delta t$, may be the union of the forwarded sets of all actors in $\Theta$, as represented by equation (11), below:

$$\Phi(\Theta, \Delta t) = U_{A \in \Theta} \Phi_A(x_A, \Delta t) \tag{11}$$

An actor may typically have a better ability to predict its own state than that of other actors. In particular, in the control system (e.g., the control component(s) 126) of the vehicle 102, the actual command sequence that was previously sent may be known, providing an ability to predict where the actor itself will be when the actuation command (e.g., delivered to the actuation component(s) 130) that is deliberated now is actually issued. For practical purposes, this may allow the forwarded set to include only one point, effectively resulting in deterministic forwarding, and further resulting in a single actor state. In general, the forwarding mechanism may be non-deterministic forwarding, and may result in a set of states. While in some examples non-deterministic forwarding of the actor itself may be used, and may require that the control policy is safe for all the possible states the actor, in other examples, in order to reduce complexity, deterministic forwarding of the actor itself may be assumed.

A result may be a control policy for the forwarded actor, assuming implicitly that the state parameterization is updated with prediction based on all the actuation commands in the queue up to the actuation command currently deliberated. With these assumptions, the control command may apply to the actor state considered, and the only delay may be the information regarding other actors (e.g., the objects 106 other than the vehicle 102).

A forwarded control policy may be safe at the current time with respect to wherever the perceived collection of actors moved, despite the latency limitations between perception and action. This again may be a direct consequence of the worst-case assumption and the definition of a safe control policy. Since all constraints (e.g., from wherever in the environment other actors may reach at the time the control of the vehicle 102 is executed) that may be present are assumed to be present, the autonomous vehicle system 100 may thus be obeying all relevant constraints.

In addition, the autonomous vehicle system 100 of the present invention may combine latency awareness with visibility awareness, and may use this information to avoid entering unreasonable states. For example, consider the set, $\Phi(V, \Delta t) \cup (\Phi(A, \Delta t) \cap \Psi)$ where V, $\Lambda$, $\Psi$ are the sets of visible, invisible, reasonable actors respectively. First, visibility may be taken into account to provide a complete collection representing all the actors (visible and invisible, as described herein) in the world that may be desirable to consider at one point in time. Then, latency may be taken into account on this complete world representation by forwarding the set of actors. Finally, unreasonable actors may be excluded from the forwarded set of invisible actors. In some examples, unreasonable actors may be excluded prior to the forwarding; however, this would not allow accounting for unreasonable actors who make it into reasonable states during forwarding. In addition, although unreasonable invisible actors may be excluded, unreasonable visible actors may not be excluded in some examples, because removing actually perceived actors may not result in an accurate world state.

The safety potential calculator 140 may determine a safety potential between two or more actors in an environment. For example, for two actors, actor A and actor B, the combined state space $\Omega_A \times \Omega_B$ (e.g., the state space of actor A and the state space of actor B) may be compared, and an unsafe set may be determined (e.g., the set of points in the combined state space of the two actors that intersect). As such, the unsafe set may be the points from the claimed set of actor A, $C_A$, that intersect with the points from the claimed set of actor B, $C_B$. In some examples, the unsafe set, $U_{AB}$, may be determined according to equation (12), below:

$$U_{AB} \subseteq \Omega_A \times \Omega_B \tag{12}$$

The safety potential calculator may then determine a safety potential function on the combined state space of the actors (e.g., actor A and actor B). For example, the safety potential may be a real-valued differentiable function on the combined state space that may be strictly positive on the unsafe set and non-negative elsewhere. The safety potential, when all actors apply any members in their safety procedures, may not increase. In some examples, the safety potential, $\rho_{AB}$, may be determined according to equation (13), below:

$$\rho_{AB}: \Omega_A \times \Omega_B \to \mathbb{R} \tag{13}$$

The safety potential may be exactly zero at some small (e.g., threshold) distance away from the unsafe set (e.g., right before the trajectories representing the claimed sets of the actors combine). A contribution of each actor to a change in safety potential may be expressed using the chain rule, in some examples. For example, the change of safety potential, $\rho_{AB}$, based on contributions of both actors, with respect to time, may be determined according to equation (14), below:

$$\frac{d\rho_{AB}}{dt} = \frac{\partial \rho_{AB}}{\partial x_A} \frac{dx_A}{dt} + \frac{\partial \rho_{AB}}{\partial x_B} \frac{dx_B}{dt} \tag{14}$$

In some examples, the autonomous vehicle system 100 may impose a stricter requirement, such as that the contribution of each of the individual safety procedures to the change in safety potential is to be less than or equal to zero. In such examples, the following equation (15) may represent a real-value infinitely differentiable function for the safety potential, $\rho_{AB}$:

$$\rho_{AB}: \Omega_A \times \Omega_B \to \mathbb{R} \tag{15}$$

In such an example, the safety potential on the combined state space may be strictly positive on the unsafe set and non-negative elsewhere, and for which the following relationships, as represented by equations (16) and (17), apply:

$$\frac{\partial \rho_{AB}}{\partial x_A} s_A \leq 0 \text{ for any } s_A \in S_A \tag{16}$$

$$\frac{\partial \rho_{AB}}{\partial x_B} s_B \leq 0 \text{ for any } s_B \in S_B \tag{17}$$

In some examples, being differentiable everywhere may not be a necessary assumption for a safety potential. In such examples, the safety potential may be almost everywhere differentiable, without departing from the scope of the present disclosure.

A local change to the safety potential from each actor may be the dot product between the control policy and the gradient of the safety potential (e.g., with respect to the state of the actor). The control policy may be the negative gradient of the safety potential, subject to limits. The safety force field may be the gradient of the safety potential with respect to the state (e.g., the derivative of the safety potential with respect to state change). For example, with respect to an actor A and an actor B, the negative gradient, Fas, of the safety potential, pas, as represented below in equation (18), may be referred to as the safety force field on actor A from actor B.

$$F_{AB} = -\frac{\partial \rho_{AB}}{\partial x_A} \qquad (18)$$

As described herein, the vehicle 102 should behave in a way that maintains at least the same level of safety as its safety procedure with respect to each actor. A safe control policy for actor A (e.g., the vehicle 102) with respect to each actor B of a set of actors in the environment is a control policy represented by the relationship of equation (19), below:

$$F_{AB} \frac{dx_A}{dt} \geq \min_{s_A \in S_A} F_{AB} s_A \qquad (19)$$

We can make some reasonable assumption on the safety procedure set so that the minimum in equation (19) is always attained, say, the set is compact. Expressed in words, the relationship of equation (19) indicates that a safe control policy for the vehicle 102, when mapped into the full state derivative, may have a dot product against the safety force field from each other actor that is at least as large as that of some member of the safety procedure of the vehicle 102. In some examples, the control policy may be additive relative to the safety procedure, and the addition may have a dot product that is at least zero against the safety force field from each other actor.

Two actors, actor A and actor B, with safe control policies with respect to one another should not collide with each other. For example, as the two actors move along their trajectories with respect to time, the local change in safety potential can be split into the two contributions from the two actors. When both actors have safe control policies, the two contributions should be no larger than if the optimal or desired members of safety procedures of both actors (in algebra, assuming $s_A^* \in S_A$ and $s_B^* \in S_B$ are the trajectories that attain the minima:

$$F_{AB} s_A^* = \min_{s_A \in S_A} F_{AB} s_A \text{ and } F_{BA} s_B^* = \min_{s_B \in S_B} F_{BA} s_B$$

were to be applied at that point (e.g., their contributions should be no larger than zero), as expressed by equation (20) below:

$$\frac{\partial \rho_{AB}}{\partial t} = \frac{\partial \rho_{AB}}{\partial x_A} \frac{dx_A}{dt} + \frac{\partial \rho_{AB}}{\partial x_B} \frac{dx_B}{dt} \leq \frac{\partial \rho_{AB}}{\partial x_A} s_A^* + \frac{\partial \rho_{AB}}{\partial x_B} s_B^* \leq 0 \qquad (20)$$

In equation (20), the first equality relies on the chain rule, the first inequality relies on the definition of a safe control policy, and the final inequality relies on the definition of a safety potential. Because the safety potential may be non-negative and the change in safety potential may be smaller than or equal to zero everywhere along the combined trajectories of actor A and actor B, the safety potential may never leave zero, which means the two trajectories should never form an unsafe set, and thus actor A and actor B should not collide.

In some instances, there may be an overlap between safety procedures of different actors. For example, with reference to FIGS. 5A-5C, an overlap between safety procedures (e.g., actor-occupied trajectories representing claimed sets of actors when executing the safety procedures) of different actors may occur in a variety of different ways. When an overlap occurs, this may indicate that more than one actor is claiming the same portion of space-time, and thus, even if all actors execute their safety procedures, there may still be an issue. The safety force field may be thought of as the contention that occurs between different actors if they attempt to claim the same portions of space-time. Once an overlap or intersection occurs, a constraint may be imposed on the actors. The constraint may be that all actors should contribute to reducing the overlap (and thus the safety potential) at least as much as their safety procedure would. As such, the safety procedure may always be an option, and any other action taken by the actors should only contribute to a net-decrease in the safety potential as compared to the safety procedure. In some examples, with reference to FIGS. 5A-5C, the constraints 506 may thought of as representing the safety force fields of the vehicle 102 and the objects 106 repelling one another.

In some examples, and with reference to FIG. 5A, the intersection between the actor-occupied trajectories (e.g., the trajectories representing the claimed sets of the actors)—such as vehicle-occupied trajectory(ies) 502 of the vehicle 102 and object-occupied trajectory(ies) 504 of the object 106—may cause a constraint 506A on the object 106 and a constraint 506B on the vehicle 102. For example, the constraints 506 may represent the safety force field as the vehicle 102 and the object 106 repel one another. As indicated in FIG. 5A, the constraints 506 may be worked back to a constraint on the controls of the vehicle 102 and/or the object 106. For example, arrow 508A may indicate the controls for the object 106 as a result of the constraint 506A. The controls may be to brake and/or to not turn right, and turning left may be acceptable. Similarly, the arrow 508B may indicate the controls for the vehicle 102 as a result of the constraint 506B. The controls may be to not steer left, and turning to the right may be acceptable.

As another example, and with reference to FIG. 5B, the intersection between the actor-occupied trajectories (e.g., the trajectories representing the claimed sets of the actors), such as the vehicle-occupied trajectory(ies) 502 of the vehicle 102, the object-occupied trajectory(ies) 504A of the object 106A, and the object-occupied trajectory(ies) 504B of the object 106B, may cause a constraint 506C between the object 106B and the object 106A, a constraint 506D between the object 106A and the object 106B, a constraint 506E between the object 106A and the vehicle 102, and/or a constraint 506F between the vehicle 102 and the object 106A. As indicated in FIG. 5B, the constraints 506 may be worked back to a constraint on the controls of the vehicle 102 and/or the objects 106. For example, arrow 508C may indicate the controls for the object 106B as a result of the constraint 506C. The controls may be to not turn right, and turning left and/or braking may be acceptable. Similarly, the arrow 508E may indicate the controls for the object 106A as a result of the constraint 506D, and the arrow 508D may indicate the controls for the object 106A as a result of the constraint 506E. The controls for the object 106A, as a result of both the vehicle 102 and the object 106B, may be to brake, and to follow the path of the road (e.g., the steering control from the arrow 506D and 506E may offset, such that the remainder is no steering control, and just braking). The arrow 508F may indicate the controls for the vehicle 102 as a result of the constraint 506F. The controls may be to not turn left, and turning right may be acceptable.

As another example, and with reference to FIG. 5C, the intersection between the actor-occupied trajectories (e.g., the trajectories representing the claimed sets of the actors), such as vehicle-occupied trajectory(ies) 502 of the vehicle 102, the object-occupied trajectory(ies) 504C of the object 106C, the object-occupied trajectory(ies) 504D of the object 106D, and the object-occupied trajectory(ies) 504E of the object 106E, may cause a constraint 506H between the object 106D and the vehicle 102, a constraint 506I between the vehicle 102 and the object 106D, a constraint 406J between the object 106E and the vehicle 102, a constraint 506K between the vehicle 102 and the object 106E, a constraint 506L between the object 106C and the vehicle 102, a constraint 506M between the vehicle and the object 106C and the object 106B, and/or a constraint 506E between the object 106A and the vehicle 102. As indicated in FIG. 5C, the constraint 506 may be worked back to a constraint on the controls of the vehicle 102 and/or the objects 106. For example, arrow 508G may indicate the controls for the object 106C as a result of the constraint 506L. The controls may be to not turn right or left, and to brake. Similarly, the arrow 508H may indicate the controls for the object 106D as a result of the constraint 506H. The controls may be to not turn right or left, and to brake. The arrow 508I may indicate the controls for the object 106E as a result of the constraint 506J. The controls for the object 106E may be to not turn left or turn right, and to brake. The arrows 508J, 508K, and 508L may indicate the controls for the vehicle 102 as a result of the constraints 506M, 506K, and 506I. The controls for the vehicle 102 may be to brake and not turn right, although turning to the left may be acceptable.

When determining the constraints 506, an earliest point of intersection between a vehicle-occupied trajectory(ies) (e.g., of actor A) and an object-occupied trajectory(ies) (e.g., of object B) may be determined. This may be determined, in some examples, by searching through space-time (e.g., $\mathbb{R}^n \times T$) for an earliest intersection point, p (e.g., between circles, bounding boxes, or another shape(s) used for the trajectory(ies) (e.g., representing a projection of the claimed set of the safety procedure into space-time)), and then performing a differential analysis on the intersection point, p. In such examples, the safety potential, pAB, may be represented according to the below equation (21):

$$\rho_{AB} = \|(t_{A_{stop}} - p_t, t_{B_{stop}} - p_t)\|_k \tag{21}$$

where $p_t$ is the time coordinate for the intersection point, p, and $t_{A_{stop}}$ and $t_{B_{stop}}$ are the stopping times for actor A and B respectively, when they apply their safety procedure, assuming their safety procedure sets are singletons. Notice that the k-norm in this definition of safety potential can be replaced by any norm where k≥1, including max-norm. In addition, the derivative (e.g., the derivative of p with respect to the state of the vehicle) may also be calculated.

The safety procedure viewed as a trajectory(ies) of the state of the actor may be represented by points y(t) of the actor in the world, and rotations R(t) from the actor to world, on the occupied set definition of the actor. For example, suppose a point, z, in the actor coordinate system moves to a world point, w(t) (e.g., a point in the world space), as a function of time as the safety procedure plays out, as represented by the following equation (22):

$$w(t) = \begin{bmatrix} y(t) + R(t)z \\ t \end{bmatrix} \tag{22}$$

Differential analysis of the world points, w, with respect to the change in the state of the actor, $X_A$, may yield an understanding of how the surface of the trajectory(ies) moves in space-time due to a change in the state of the actor. To first order, the shape of the surface in space-time does not change, because the shape of the surface may depend on second derivatives. As a result, if the local shape of the space-time surface of the trajectory(ies) (e.g., representing the safety procedure) for an actor is known (e.g., either a surface normal or a vertex curve tangent), and the derivate of the world points, w, with respect to the change in the state of the actor, $X_A$, that is all the information that may be needed to perform a differential analysis of how the surface behaves. As a result, this information may be used to determine the change in the intersection point. For example, a change in the world point, w(t), with respect to the change in state of the actor, $X_A$, may be represented according to equations (23) and (24) below, where equation (24) may represent a concretized version of the equation (23), if y(t) and R(t) are defined using equations (25)-(29):

$$\frac{\partial w}{\partial x_A} = \frac{\partial y}{\partial x_A} + \frac{\partial R}{\partial x_A} z \tag{23}$$

$$\frac{\partial w}{\partial x_A} = \begin{bmatrix} I & s(t)I + [z \ z_\perp] & td \\ 0 & 0 & 0 \end{bmatrix} \tag{24}$$

$$x_A = \begin{bmatrix} y \\ d \\ v \end{bmatrix} \text{ with } y \in \mathbb{R}^2, d \in \mathbb{R}^2, v \in \mathbb{R} \tag{25}$$

$$S_A = \left\{ \begin{bmatrix} vd \\ 0 \\ a_{min} \end{bmatrix} \right\} \tag{26}$$

$$s(t) = vt + \frac{a_{min} t^2}{2} \tag{27}$$

$$y(t) = y + s(t)d \tag{28}$$

$$R(t) = [d \ d_\perp] \tag{29}$$

The earliest intersection may be an intersection between two smooth surfaces, between a vertex of the trajectory(ies) of actor A and a smooth surface of the trajectory(ies) of actor B, or between a vertex of the trajectory(ies) of actor B and a smooth surface of the trajectory(ies) of actor A. In an example where the earliest intersection point, p, happens between two smooth surfaces (e.g., the surfaces swept out by two circles moving over time), the local surface at that intersection point may be approximated to the first order by a plane (e.g., in space-time). The plane may be found by computing the derivative of the change in the world points, w, with respect to time, t, at the intersection point, p, and taking the cross product with a direction vector for a tangent vector to the smooth or polygonal shape at the same point (which for a polygon can be found by transforming its end points by y(t), R(t), and subtracting them). Assume the presence of such vectors to the local plane of both surfaces, related to both actors. Further, assume that the vectors have been normalized to unit magnitude, such that the result is $A_\perp$, $B_\perp$. Then it may be observed that local motion of the A-surface is measured by the derivative of the change in the world points, w, with respect the change in the state of the actor, $x_A$. A correction of the A-surface to get back to the B-surface may then be some multiple, q, of $(I-A_\perp A_\perp^T)B_\perp$. The sum of the two may result in the vector of equation (30), below:

$$\frac{\partial p}{\partial x_A} = (I - A_\perp A_\perp^\top)B_\perp q + \frac{\partial w}{\partial x_A} \qquad (30)$$

Using the following constraint, of equation (31), below:

$$B_\perp^\top \frac{\partial p}{\partial x_A} = 0 \qquad (31)$$

may allow solving for q, as in equation (32), below:

$$q = -\frac{B_\perp^\top \frac{\partial w}{\partial x_A}}{1 - (A_\perp^\top B_\perp)^2} \qquad (32)$$

which may then yield:

$$\frac{\partial p}{\partial x_A} = \frac{\partial w}{\partial x_A} + \frac{((A_\perp^\top B_\perp)A_\perp B_\perp)}{1 - (A_\perp^\top B_\perp)^2}\left(B_\perp^\top \frac{\partial w}{\partial x_A}\right) \qquad (33)$$

In an example where the earliest intersection point, p, happens between a curve swept out by a vertex of the A-surface and a smooth part of the B-surface, a tangent vector $A_T$ (represented in equation (34) below) to the curve and a normal vector to the space-time B-surface can be assumed.

$$A_\tau = \frac{dw_A}{dt} \bigg/ \left|\frac{dw_A}{dt}\right| \qquad (34)$$

It may also be assumed that the vectors are normalized to unit magnitude. A similar calculation may be performed as with respect to the smooth to smooth case, described herein. The local motion of the A-curve may be measured by the derivative of the change in the world points, w, with respect to the change in the state of the actor, $X_A$. The correction along the A-curve to get back to the B-surface may then be some multiple, q, of $A_T$. The sum of the two may be the vector, as represented in equation (35), below:

$$\frac{\partial p}{\partial x_A} = A_\tau q + \frac{\partial w}{\partial x_A} \qquad (35)$$

Using the following constraint, of equation (36), below:

$$B_\perp^\top \frac{\partial p}{\partial x_A} = 0 \qquad (36)$$

may allow solving for q, as in equation (37), below:

$$q = -\frac{B_\perp^\top \frac{\partial w}{\partial x_A}}{A_\tau^\top B_\perp} \qquad (37)$$

which may then yield:

$$\frac{\partial p}{\partial x_A} = \frac{\partial w}{\partial x_A} - \frac{A_\tau}{A_\tau^\top B_\perp}\left(B_\perp^\top \frac{\partial w}{\partial x_A}\right) \qquad (38)$$

In an example where the earliest intersection point, p, happens between a smooth part of the A-surface and the curve swept out by a vertex of the B-surface, it may be assumed that the is a normal vector to the space-time A-surface and a tangent vector, $B_T$ (represented in equation (39) below) to the curve.

$$B_\tau = \frac{dw_B}{dt} \bigg/ \left|\frac{dw_B}{dt}\right| \qquad (39)$$

It may also be assumed that the vectors are normalized to unit magnitude. The local motion of the A-surface may be measured by the derivative of the change in the world points, w, with respect to the change in the state of the actor, $X_A$. The movement of the intersection point, p, along the B-curve may be represented by the following equation (40), below:

$$\frac{\delta p}{\delta x_A} = B_\tau q \qquad (40)$$

Which may be some multiple, q, of $B_T$. The subtraction of those two may be in the plane of the A-surface and hence perpendicular to $A_\perp$, which may yield equations (41) and (42), below:

$$A_\perp^\top\left(B_\tau q - \frac{\partial w}{\partial x_A}\right) = 0 \qquad (41)$$

$$q = \frac{A_\perp^\top \frac{\partial w}{\partial x_A}}{A_\perp^\top B_\tau} \qquad (42)$$

which may then yield:

$$\frac{\partial p}{\partial x_A} = \frac{B_\tau}{A_\perp^\top B_\tau}\left(A_\perp^\top \frac{\partial w}{\partial x_A}\right) \qquad (43)$$

In some examples, to determine which of the different control options to take (e.g., the control options that contribute to decreasing the safety potential), the control analyzer 142 may analyze control options (or control actions) to determine the control option to implement. For example, the control component(s) 126 may output a control(s) to the obstacle avoidance component(s) 128, and the safety potential calculator 140 may determine that the control(s) do not fall within the control policy (e.g., the control(s) do not contribute to the safety potential by decreasing the safety potential with respect to the safety procedure). In such examples, the control analyzer 142 may analyze the control(s) from the control component(s) 126 and determine a different control(s) that is within an allowed control(s) (e.g., controls that decrease the safety potential with respect to the safety procedure or at least are not a net-increase in safety potential). In some examples, the control analyzer 142 may select the control(s) that are closest to the controls from the control component(s) 126 (e.g., the desired controls) that also satisfy the requirement that the control(s) contribute to the decrease or equilibrium of the safety potential.

In order to accomplish this, the control analyzer 142 may perform a perturbation analysis. The perturbation analysis may use the current state of the actors and consider different controls in view of the current state, and how the different controls may contribute to changing the safety potential. For example, in view of the constraints 506, as illustrated in FIGS. 5A-5C, the control analyzer may determine controls that are suitable for the vehicle 102 (and/or the objects 106) that decrease the safety potential of the vehicle 102 (and/or the objects 106). For example, and with reference to FIG. 6A, the vehicle 102 may perform a perturbation analysis when it is determined that the object-occupied trajectory(ies) 604A intersects with or overlaps the vehicle-occupied trajectory(ies) 602B (e.g., corresponding to the safety procedure). The vehicle 102 may analyze any number of possible controls that may be different than the controls for the safety procedure. For example, although only a limited number of controls and resulting vehicle-occupied trajectories are described and/or illustrated herein, this is not intended to be limiting. For example, the perturbation analysis may take into account any number of possible controls and resulting vehicle-occupied trajectories when determining desired and/or acceptable controls.

As an example, the vehicle 102 may analyze the controls associated with a vehicle-occupied trajectory(ies) 602A. The vehicle-occupied trajectory(ies) 602A may be allowed because it includes turning to the left (e.g., away from the object 106) and includes slowing down (e.g., as indicated by the shorter length of the vehicle-occupied trajectory(ies) 602A with respect to the vehicle-occupied trajectory(ies) 602B). The vehicle 102 may further analyze controls associated with the vehicle-occupied trajectory(ies) 602C. The vehicle-occupied trajectory(ies) 602C may not be allowed because it includes turning to the right (e.g., toward the object 106), which may increase the safety potential with respect to the safety procedure.

As another example, and with reference to FIG. 6B, the vehicle 102 may perform a perturbation analysis when it is determined that the object-occupied trajectory(ies) 604B intersects with or overlaps the vehicle-occupied trajectory(ies) 602E (e.g., corresponding to the safety procedure). The vehicle 102 may analyze any number of possible controls that may be different than the controls for the safety procedure. For example, the vehicle 102 may analyze the controls associated with a vehicle-occupied trajectory(ies) 602D. The vehicle-occupied trajectory(ies) 602D may be allowed because it includes turning to the left (e.g., away from the object 106) and includes slowing down (e.g., as indicated by the shorter length of the vehicle-occupied trajectory(ies) 602D with respect to the vehicle-occupied trajectory(ies) 602E). The vehicle 102 may further analyze controls associated with the vehicle-occupied trajectory(ies) 602F. The vehicle-occupied trajectory(ies) 602F may not be allowed because it includes turning to the right (e.g., toward the object 106), which may increase the safety potential with respect to the safety procedure.

In some examples, in order to construct the safety potentials, variants of non-negative measures of intersection between the safety procedures of two actors (e.g., actor A and actor B) may be relied upon. As both the safety procedures are applied, the trajectories of the two actors may play out, meaning that an intersection measure works on the same claimed sets, or whatever is left of them, as the actors progress through the claimed sets. As what is left of the claimed sets decreases, typical intersection measures may not increase. Thus, if the autonomous vehicle system 100 is able to get smooth measures of the intersection, the autonomous vehicle system 100 may calculate a safety potential.

In some examples, the autonomous vehicle system 100 may cover sets with a smooth function, and may smooth functions that are not infinitely differentiable. For example, covering functions may be generated with bump functions that are infinitely differentiable with compact support according to any of a variety of techniques. In such an example, a function may be smoothed by convolving it with such a bump function according to any of a variety of techniques, and the function may then be called a mollifier.

In examples, the following relationship may hold true, for any $\epsilon > 0$ and any ball in $\mathbb{R}^N$ for any N, there may be an infinitely differentiable scalar function that is strictly positive inside the ball, zero on the boundary of the ball, and zero outside of the ball. For example, equation (44) below may represent a function, h(x), for a ball centered at p:

$$h(x) = \begin{cases} e^{-\frac{1}{1-|(x-p)/\epsilon|^2}}, & |(x-p)/\epsilon| < 1 \\ 0, & \text{otherwise} \end{cases} \tag{44}$$

where equation (44) may be a shifting and scaling of the function, h(x), of equation (45), below:

$$h(x) = \begin{cases} e^{-\frac{1}{1-|x|^2}}, & |x| < 1 \\ 0, & \text{otherwise} \end{cases} \tag{45}$$

which is a well-known bump function. The function may be shifted and scaled to center on any point in space and have any radius.

In some examples, the following relationship may also hold true, for any $\epsilon > 0$ and any set in $\mathbb{R}^N$ for any N, there may be an infinitely differentiable scalar function that covers the set (e.g., the claimed set) and evaluates to zero for any point further than $\epsilon$ from all points in the set. For a bounded set, it may be easy to construct such a function by using bump functions of a diameter smaller than $\epsilon$. For example, a bounding sphere may first be determined for the set, then a finite cover of that bounding sphere may be determined by bump functions of a fixed diameter smaller than $\epsilon$. Then the addition of each bump function may be made that includes at least one point in the set. This function may clearly cover the set, and may also be infinitely differentiable since the function is a finite sum of infinitely differentiable functions. The function may also be zero since otherwise a ball function would include both a point in the set and a point E or further from the set, which would be a contradiction. For an unbounded set, the definition of the function may be extended by an expanding sequence of spheres where new bump functions may be added to cover the additional set between one bounding sphere and the next. This may carry with it a sequence of bump functions, and the function may be defined as the (now infinite sequence) sum of bump functions. The function may still be well defined and infinitely differentiable at any point since for an E-neighborhood of a point there may only be a finite set of bump functions from the sequence that affect it. In addition, the function may also cover any point in the set and evaluate to zero E away from the set as a result of the analysis for any point falling back to the finite case.

In some examples, the time interval between the first time that there is an intersection between just slightly dilated occupied sets (e.g., in time-slices of the claimed set) and the first time that both actors are fully stopped, which may be zero when there is no intersection, may be used. This function may be bounded, non-negative, and strictly positive on the unsafe set. The function may also stay constantly zero when there is no intersection, may stay constant until the intersection when there is one, and may decrease after the intersection when there is one. Hence, the smoothness of the function may be the only thing left to ensure, which may already be the case when there is an intersection and when there is not. In the transition just when the intersection appears, this may be handled by using a monotonic function of the time interval that flattens space near zero like a bump function does at its boundaries.

In other examples, the dot product between two smooth functions (e.g., that may be calculated according to the bump functions and/or mollifiers, as described herein) covering the claimed sets of the actors may be used. For example, when the initial covering functions are near constant on the claimed sets, this may result in a smoothed version of volume of overlap between the covering functions. Smooth covering schemes (e.g., $h_A(C_A(x_A))$, $h_B(C_B(x_B))$) for each of the claimed sets may then be determined. The output (e.g., the safety potential with respect to the two actors) may then be expressed according to equation (41), below:

$$\rho_{AB}(x_A, x_B) = \int_{\Omega_A \times \Omega_B \times T} h_A(C_A(x_A)) h_B(C_B(x_B)) dx_A dx_B dt \qquad (46)$$

where the integration may be assumed to take place from the current time to the first time that both actors are fully stopped. The resulting function may thus be smooth, bounded, non-negative, and strictly positive on the unsafe set.

Figure 7A:
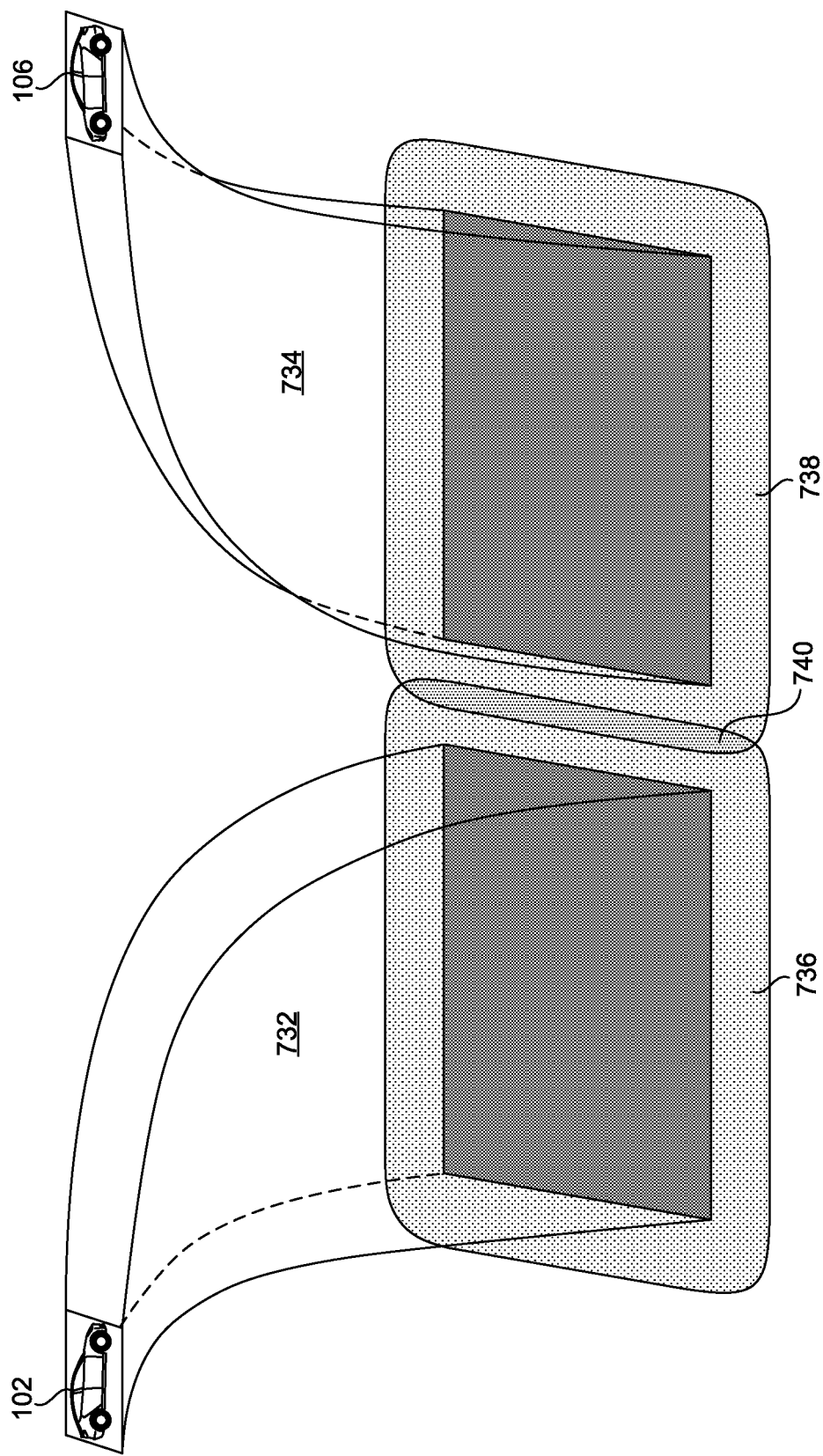
FIG. 7A is an example illustration of a control chart corresponding to a perturbation analysis for a vehicle, in accordance with some embodiments of the present disclosure.

For example, and with reference to FIG. 7A, the safety potential may be made smooth in order to ensure that the safety potential rejects intersections before the intersections occur. This may be done by using a smooth but tight bump function (e.g., using techniques described herein) that may rise (as represented by a bump) before overlap occurs between two trajectories. For example, the vehicle 102 may have a vehicle-occupied trajectory(ies) 732 that represents a projection of the claimed set (e.g., the safety force field) of the vehicle 102 in space-time. The object 106 may have an object-occupied trajectory(ies) 734 that represents a projection of the claimed set (e.g., the safety force field) of the object 106 in space-time. The vehicle 102 and the object 106 may be approaching each other (e.g., similar to that of FIG. 3D, described herein). A bump function(s) may be used for the vehicle 102 and/or for the object 106 to generate a raised region 736 (or bump) for the vehicle-occupied trajectory(ies) of the vehicle 102 and a raised region 738 (or bump) for the object-occupied trajectory(ies) of the object 106. As a result, the raised regions 736 and 738 may be used to reject intersections prior to intersections occurring (e.g., because the raised regions 736 and 738 may serve as a buffer for the trajectories 732 and 734, respectively). The overlap region 740, in FIG. 7A, may represent the safety potential in the scenario of FIG. 7A (e.g., where the vehicle 102 and the object 106 are approaching each other and their trajectories 732 and 734 are about to overlap). In such a situation, once the raised regions 736 and 738 begin to overlap, which may be prior to overlap of the trajectories 732 and 734, the safety procedure and/or another control option(s), as described in more detail herein, may be executed. As a result, in some examples, the bump functions may be used to reject (e.g., repel) intersections of the trajectories 732 and 734 even before the intersections occur.

When looking at how different controls affect the change in the safety potential (e.g., via the states of the actors), the safety potential for each different control option may be determined. The chain rule, as described herein, illustrates how the safety potential cannot increase so long as both the vehicle 102 and the other actor(s) always does as well as their respective safety procedures at decreasing the safety potential. For a vehicle where the controls include lateral change (e.g., steering left or right) or longitudinal change (e.g., accelerating or decelerating), a control image may be used to visualize acceptable control options as a result of a safe driving policy (e.g., one where the safety potential is never increased with respect to the safety potential of the safety procedure).

Figure 7B:
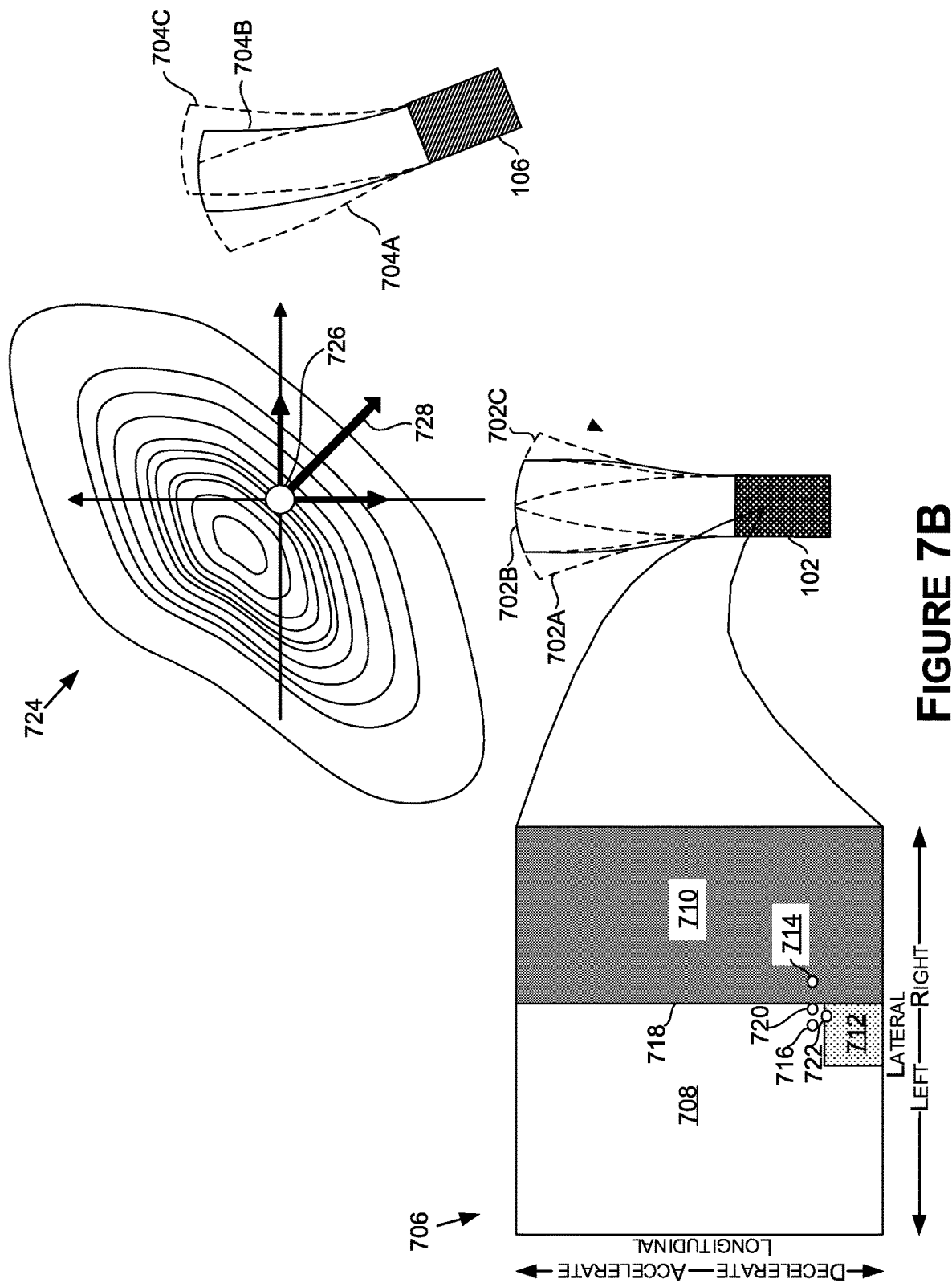
FIG. 7B is an example illustration of using a safety potential for obstacle avoidance, in accordance with some embodiments of the present disclosure.

For example, and with reference to FIG. 7B, a control image 706 (or control constraint image 706) may be representative of acceptable control options 708, unacceptable control options 710, and/or safety procedure control options 712 that are associated with the safety procedure (that may be included within the acceptable control option 708, as described herein). The control image 706 may be a binary image such that pixels associated with the acceptable control options 708 are represented by a first color, pixels associated with the unacceptable control options 710 are represented by a second color and, in some examples, pixels associated with the safety procedure control options 712 may be represented as a third color (although in other examples, the safety procedure control options 712 may be represented as the acceptable control options 708 in the first color). The x-axis of the control image 706 may correspond to lateral control of the vehicle (e.g., turning to the left, driving straight, or turning to the right), and may be represented by a steering angle. The y-axis of the control image 706 may correspond to longitudinal control (e.g., braking, decelerating, or accelerating).

In some examples, such as where a single profile (e.g., braking profile, steering profile, etc., as described herein) defines the safety procedure and thus the claimed set, the safety procedure control options 712 may be represented by a single pixel at any point in time. However, in other examples, such as the example illustrated in FIG. 7B, where multiple profiles (e.g., braking profiles, steering profiles, etc., as described herein) define the safety procedure and thus the claimed set, the safety procedure control options 712 may be represented by any number of pixels at any point in time.

The vehicle 102 and the object 106 in FIG. 7B may be similar to that of the vehicle 102 and the object 106 in FIG. 6B (e.g., the object 106 may be merging into the vehicle 102 such that at least a portion of their respective trajectories overlap). The control image 706 of FIG. 7B may be representative of the control options for the vehicle 102 as a result of the object 106 turning into, or merging into, the vehicle 102 such that at least one of the vehicle-occupied trajectories 702 of the vehicle 102 intersects with at least one of the object-occupied trajectories 704 of the object 106 (e.g., as illustrated in FIG. 6B). The vehicle-occupied trajectories 702A, 702B, and 702C may be the result of different controls determined by a perturbation analysis, and the acceptable control options 708, the unacceptable control options 710, and the safety procedure control options 712 of the control image 706 may be updated based on the perturbation analysis. The object-occupied trajectories 704A, 704B, and 704C may be the result of different control determined by a perturbation analysis by the object 106, and the object 106 may, in some examples, generate and/or use its own control image.

In any example, the acceptable control options 708 may be control options that have an equal or lesser safety potential as the safety procedure control options 712. For example, the vehicle 102 may implement the safety procedure control options 712 and/or may implement control options (e.g., the acceptable control options 708) that have an equal or lesser safety potential as the safety procedure control options 712. For example, if the safety potential associated with the safety procedure is zero (e.g., indicating that no collision will occur), then each of the acceptable control options 708 and/or the safety procedure control options 712 may have an associated safety potential of zero. As another example, if the safety potential associated with the safety procedure is greater than zero (e.g., indicating that a collision may occur), then each of the acceptable control options 708 and/or the safety procedure control options 712 may have an associated safety potential that is equal to or less than the safety potential associated with the safety procedure (e.g., acceptable control options 708 may include control options where the safety potential is greater than zero, such as where unavoidable).

However, as illustrated in FIG. 7B, even where a safety potential is greater than zero (e.g., indicating that a collision may occur), a perturbation analysis (e.g., using the chain rule) may be used by the vehicle 102 to determine the acceptable control options 708. As described herein, the chain rule may link the control of the vehicle 102 to the change in the state of the vehicle 102 over time, and in turn, the change in the state of the vehicle 102 may be linked to the change in the safety potential.

In some examples, such as where a desired control for the vehicle 102 (e.g., from the control component(s) 126 of the vehicle 102) may result in a safety potential of greater than zero, a perturbation analysis may be performed to update the control image 706 to determine an acceptable control option 718 (e.g., a control option where the safety potential is zero) that is as close to the desired control option as possible (e.g., within reasonable limits, such as factoring in a margin of safety). For example, assuming that the desired control option, with respect to FIG. 7B, was to turn right and slow down (e.g., as represented by the unacceptable control option 710 at point or pixel 714 of the control image 706), the control option determined based on the perturbation analysis and/or based on one or more rules for finding acceptable control options 708 that are within a threshold relation (e.g., proximity on the control image 706) to the desired control options, may be to stay straight and slow down (e.g., as represented by the acceptable control option 708 at point or pixel 716 of the control image 706).

The threshold relation may, in some examples, be the actual closest acceptable control option 708 to the desired control option (e.g., where the point or pixel 716 would be on or nearly on the boundary 718 between the acceptable control options 708 and the unacceptable control options 710, such as point or pixel 720). In other examples, such as illustrated in FIG. 7B, the threshold relation may be a closest acceptable control option 708 to the desired control option factoring in one or more additional criteria. For example, a margin of safety may be used, such that the point or pixel representing the acceptable control option 708 that is closest to the desired control option includes at least some additional distance within the control image 706 (e.g., with respect to FIG. 7B, this may include additional turning to the left, or additional braking). As another example, the safety procedure control options 712 may be factored in, such that the acceptable control option 708 selected may be weighted toward the safety procedure control options 712 (e.g., as illustrated by the point or pixel 722 of FIG. 7B).

In any example, and as described herein, each of the actors (e.g., the vehicle 102 and the object 106 of FIG. 7B) may be expected to contribute to decreasing the safety potential when the safety potential is greater than zero (e.g., indicating that a collision may be likely and/or imminent). Within this principle is the idea that each actor should do at least as well as their respective safety procedure. Cost function 724 of FIG. 7B illustrates the contribution of the vehicle 102 and the object 106 to decreasing safety potential 726 (e.g., bringing the safety potential downhill, as illustrated by arrow 728) with respect to the cost function 724). The arrow 728 may represent the contribution of the vehicle 102 to decreasing the safety potential 726 as the vehicle 102 implements controls (e.g., acceptable control options 708) in addition to the contribution of the object 106 to decreasing the safety potential 726 as the object 106 implements respective controls (now shown) that are preferably also acceptable control options (although other actors are outside of the control of the vehicle 102 and may thus be unpredictable).

As described herein, a quantification of whether and how much each actor contributes to raising or lowering the safety potential with respect to one another may be determined (e.g., to determine fault). As a result, when a collision occurs, fault may be attributed to one or more actors. As a general rule, one actor may be determined to have behaved poorly with respect to another actor when the actor contributes to raising the safety potential with respect to another actor. As such, for two actors to collide, at least one of the actors must have contributed to raising the safety potential above zero. This may be clearly visualized, as the trajectories of the actors (e.g., representing the claimed sets of the actors) may intersect, at least partially, thereby generating an unsafe set. A fault interval, as used herein, may be the uninterrupted time interval before a collision between actor A and actor B where the safety potential, $\rho_{AB}$, is strictly positive. Using the fault interval, fault may be attributed to, for example, actor A, when actor A was in an unreasonable state (e.g., $x_A \in \overline{\Psi}$) at any time in the fault interval. Actor A may also be at fault when actor A behaved poorly with respect to actor B at any time in the fault interval when actor B was in a reasonable state. An actor executing a safe control policy, as described herein, may not be at fault for a collision because an actor with a safe control policy may not be in an unreasonable state so long as they are operating within the safe control policy.

Another consideration of the present system 100 is yielding and right of way. Yielding and right of way may be handled by another layer separate from (e.g., above) the obstacle avoidance layer. The autonomous vehicle system 100 may operate under the belief that right of way is given, not taken. If the safety force field (e.g., the trajectories representing the claimed sets of two or more actors) indicates that there is a constraint due to basic obstacle avoidance, each of the actors must act on it, with no exceptions or caveats. If another actor has failed to give way, the vehicle 102 cannot try and take the right of way.

This arises both from common sense and from the desire to have separation in layers of safety. For example, with respect to common sense, if you are about to crash into someone who has already obviously failed to yield, you would rather brake very hard to minimize damage than insist on your right to priority. As another example, with respect to separation of layers of safety, it may be preferable not to have primal obstacle avoidance safety in a critical situation to be at the risk of being invalidated based on complex decisions regarding things such as priority, traffic rules, the existence of a solid dividing line and its implication in different jurisdictions, a traffic sign with "no U-turns on Thursdays between 4-6 PM," and/or even the state of a traffic light. A collision risk is a collision risk no matter who is right, and it may thus be desirable to have a separately validated system to handle basic obstacle avoidance. This line of thinking may be similar to the desire to not have an emergency braking system depend on traffic sign, light perception, and/or a map.

An example scenario may be when an intersection is so congested that the vehicles or other objects that entered the intersection while the light was green may end up stuck in the intersection, leaving them in the path of crossing traffic that now has a green light. While this may be something that they should have anticipated, avoiding this scenario may not always be easy or followed in practice. In such examples, the vehicles or other objects may not proceed straight at the vehicles stuck in the intersection. This type of situation may also arise for many other reasons, such as a broken down vehicle, a prior collision, road work, or a drunk driver, for example.

The safety force field alone may not force actors to yield appropriately. For example, it may be possible to obey the safety force field and still fail to yield correctly according to the rules and conventions of the road. In such an example, a vehicle may enter an intersection and stop, after which the vehicle may obey the constraints of the safety force field (e.g., since sitting still is always allowed). However, this may not prevent the vehicle from delaying or otherwise inconveniencing crossing traffic and/or violating traffic rules. This example is a necessary result of wanting to separate the core obstacle avoidance from the long tail of traffic rules. For example, if all of the traffic rules were required to be followed by the core obstacle avoidance layer, the rules would all get pulled into the obstacle avoidance layer, which may be very undesirable, as described herein.

A vehicle that fails to yield may not cause a safety force field constraint that is experienced by cross traffic in a case where the vehicle should not yield due to the rules of the road. This leads to an example definition of yielding. Yielding, in a sense, may be giving way, since other actors cannot take the right of way. Yielding to another actor may be to behave in such a way as to not induce a constraint on that actor, and to make it clear to that actor, by giving sufficient margin, that the vehicle will not induce a constraint.

For example, a vehicle may traverse an intersection with crossing traffic or perform an unprotected left turn, provided that the vehicle has cleared, such as with a large margin, from inducing a safety force field constraint on another actor. However, if the vehicle does not have a large enough margin when going first, the vehicle may have to stay back and wait until a clear enough margin has formed such that the vehicle does not make crossing or oncoming traffic worried that the vehicle may not yield.

Right of way may be the determination of who should yield. The determination of right of way may require, in some examples, the full extent of wait perception (traffic lights, traffic signs, stop lines, yield lines), such as by the wait perceiver 114. Right of way may include analyzing who stopped first at a multi-way stop, who is approaching from the right, understanding rules that vary by country and region, and/or detecting situations where the rules apply. Map information may also be used, in some examples, in addition to, or alternatively from, training data that may provide such rules and allow the vehicle to understand the local rules and conventions as keenly as a local.

Yielding may be more difficult to navigate as precisely as obstacle avoidance. For example, when turning left into a T-crossing with crossing traffic, if the vehicle is to yield, the vehicle should not put a constraint on the crossing traffic. However, after turning, the vehicle may face a stopped vehicle and thus cause the chasing traffic to eventually experience a constraint from the vehicle being there. At some point in this process, the responsibility of the vehicle to yield turns into the common sense that, if the vehicle is ahead, it is the responsibility of the other traffic to slow down. The safety force field may clearly constrain the vehicle 102 from performing a dangerous maneuver (e.g., cutting into traffic when there is another vehicle or object present), but yielding within the scope of the present disclosure may go a step beyond that, and even avoid inducing the constraint on the other traffic.

The autonomous vehicle system 100 may include some uncertainty and errors in some situations. In order to handle uncertainty, confidence intervals may be provided for all metrics needed to calculate the constraints of the safety force field (e.g., the trajectory(ies) representing the claimed set), such as shape, position (including distance), velocity, and/or acceleration. These calculations may be performed at the edge of the confidence intervals (such as after dilation of shape and distance to the closest point and velocity to the highest towards the vehicle 102). Errors (e.g., false detections, failures to detect, cases outside the confidence intervals, or misclassification of actor type), on the other hand, may be handled by redundant perception systems. For example, the very latest form of fusion may be to compute the safety force field constraints for each of two or more redundant perception systems (e.g., three redundant perception systems), and to allow execution of the control options that were accepted by the majority of the perception systems.

Figure 8:
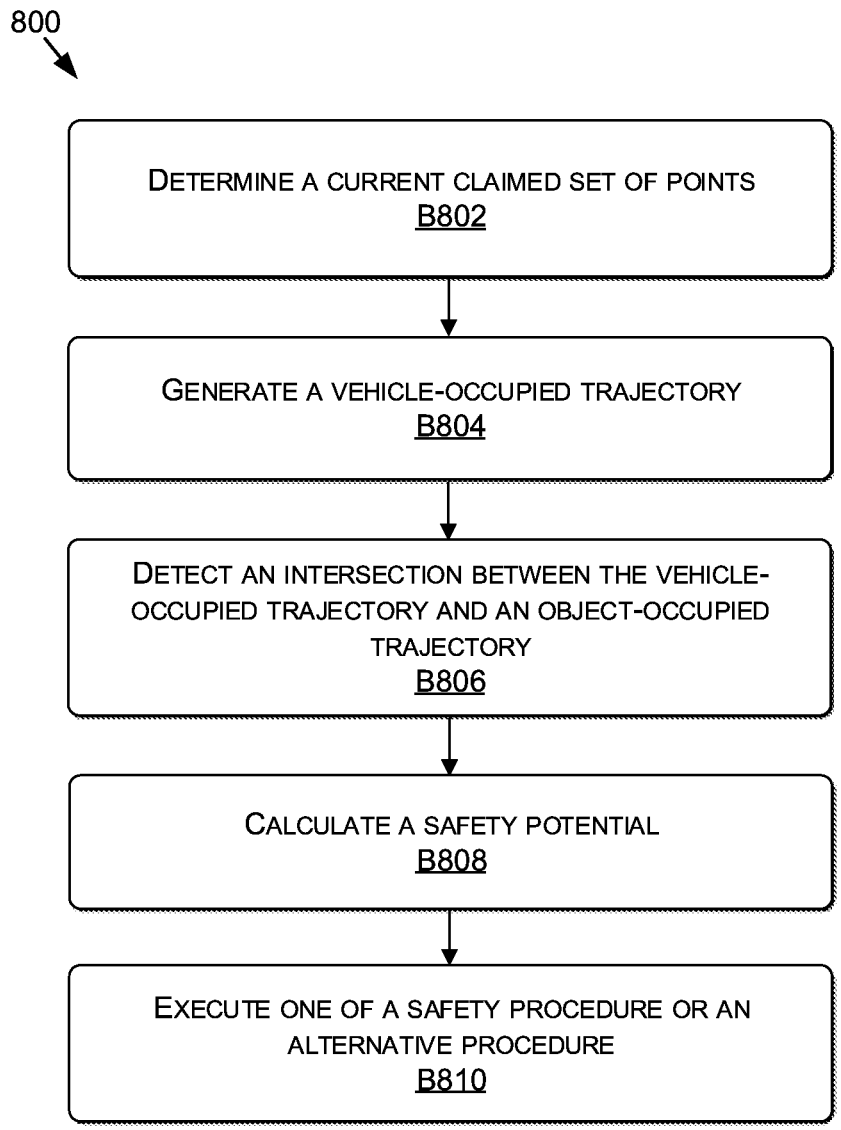
FIG. 8 is a flow diagram showing a method for obstacle avoidance, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 800 is described, by way of example, with respect to the autonomous vehicle system 100 of FIG. 1. However, these methods may additionally or alternatively be executed by any one system, or any combination of systems, including, but not limited to, those described herein.

FIG. 8 is a flow diagram showing a method 800 for obstacle avoidance, in accordance with some embodiments of the present disclosure. The method 800, at block B802, includes determining a current claimed set of points. For example, the claimed set determiner 136 may determine a current claimed set of points occupied by the vehicle 102. To determine the current claimed set of points, a state of the vehicle 102 may be determined by the state determiner 132.

The method 800, at block B804, includes generating one or more vehicle-occupied trajectory(ies). For example, trajectory generator 138 may generate a vehicle-occupied trajectory(ies). To generate the vehicle-occupied trajectory(ies), a safety procedure may be determined by the safety procedure determiner 134 (e.g., in view of the current environment, speed, objects 106, etc.).

The method 800, at block B806, includes detecting an intersection between the vehicle-occupied trajectory(ies) and an object-occupied trajectory(ies). For example, the safety potential calculator 140 may determine an intersection between the vehicle-occupied trajectory(ies) and an object-occupied trajectory(ies) of an object 106 in the environment.

The method 800, at block B808, includes calculating a safety potential. For example, the safety potential calculator 140 may calculate the safety potential that represents the intersection.

The method 800, at block B810, includes executing one of a safety procedure or an alternative procedure. For example, the vehicle 102 may implement the safety procedure or an alternative procedure. As described herein, in some examples, the safety procedure may always be an allowable option (e.g., within the acceptable control options). However, in some examples (e.g., based on a perturbation analysis), a safety potential associated with a different procedure than the safety procedure may be representative of a lower computed likelihood of collision between the vehicle and the object. In such examples, the control analyzer 142 may analyze control options associated with alternative procedures and determine to allow execution of the controls associated with the alternative procedure(s).

Visualization

In order to visualize the vehicle-occupied trajectory and the object-occupied trajectories, the trajectories may be rendered in relation to one another on a display. However, viewing the trajectories on a 2D screen in this way, without any adjustments or transformations, may make it difficult to understand the possible intersections of the object-occupied trajectories with the vehicle trajectory (e.g., the trajectories may begin to appear to merge and overlap even when an actual overlap in 3D space-time indicative of a collision is not present).

In order to account for this, the current disclosure includes visualization techniques that produce graphical representations that may be easier to understand and to visualize the object-occupied trajectories (e.g., the movement of the objects in space-time) with respect to the vehicle-occupied trajectory. In order to do this, the system may determine, for each time slice (e.g., for each segment of time used by the system, or each discrete time step), a change in location and orientation of the vehicle with respect to a first time slice (e.g., the current time). The system may then apply a transformation (e.g., an affine transformation), as a function of the change in location and orientation, to the vehicle-occupied trajectory for each time slice after the first time slice in order to visually cancel out (at least along the axis[es] of movement) the change in the vehicle-occupied trajectory over time. The system may also apply the same transformation, based on the change in location and orientation of the vehicle, to the object-occupied trajectories for each time slice after the first time slice in order to render the object-occupied trajectories in relation to the now (substantially) static vehicle-occupied trajectory.

As a result, the vehicle may appear stationary while the objects may appear to move with respect to the vehicle. In one example, when the vehicle is approaching a slower object in front of it, the object may appear to be moving towards the vehicle in the visualization. As a result, the object would appear to be moving backwards (even though it is in reality moving forwards), because the object's speed is slower than the speed of the vehicle. As another example, when the vehicle is turning to the left toward an object driving straight (e.g., not turning), the object may appear to be moving toward the vehicle in the visualization (even though the vehicle is actually moving toward the object). Using these processes, intersections between the vehicle-occupied trajectory and the object-occupied trajectories may be more clearly visualized (e.g., future space around the vehicle may be more clearly visualized), thereby generating a more useful visualization for accuracy checking, system evaluations, and/or the like. In some examples, the visualization may be projected into images or video captured by one or more camera(s) of the vehicle (e.g., projected within the image(s)).

Figure 9A:
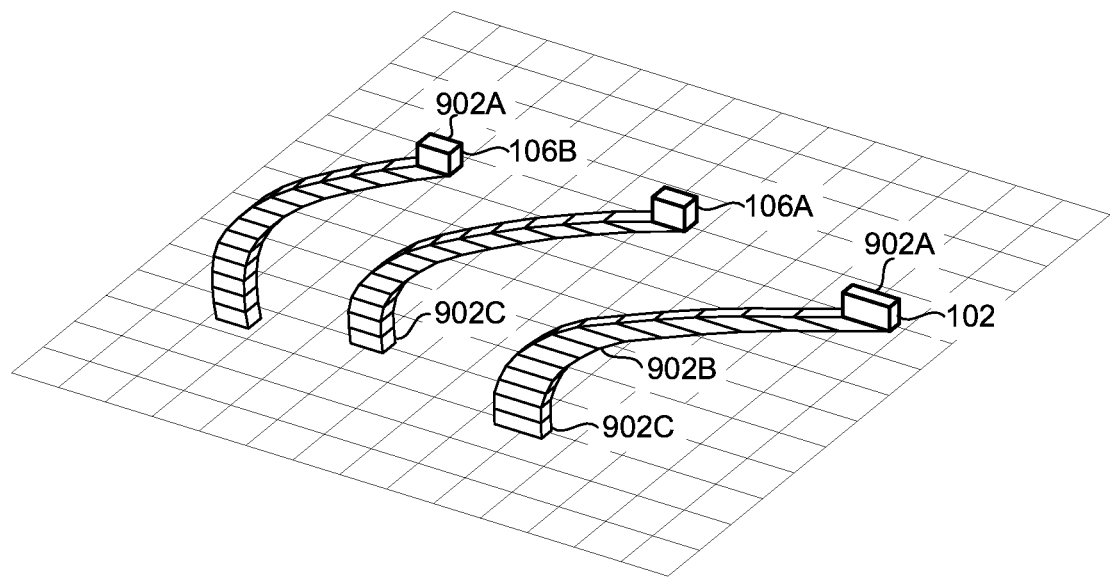
FIG. 9A is an example visualization of safety procedures, in accordance with some embodiments of the present disclosure.

Now referring to FIG. 9A, FIG. 9A illustrates representations of the vehicle 102 (e.g., as polygons, or a collection of line segments) and two objects, object 106A and object 106B (e.g., as polygons, or a collection of line segments), as the vehicle 102 and the objects 106A and 106B implement their respective safety procedures over each of a plurality of time slices 902. As such, the representations may be of the claimed sets of the vehicle 102, the object 106A, and the object 106B as the actors implement their respective safety procedures (e.g., visualizations of the vehicle-occupied trajectory and the object-occupied trajectories). For example, time slice 902A may correspond to a current time, time slice 902B may correspond to a time somewhere along the safety procedure, and time slice 902C may correspond to an end time for at least one of the safety procedures corresponding to the vehicle 102, the object 10BA, or the object 106B (e.g., where the vehicle 102, the object 102A, and/or the object 102B come to a complete stop, complete their respective safety procedure, and/or reach their actor state objective, as described herein). In other examples, the time slice 902C may not represent an end time, but may instead represent the last time slice 902 in a defined or predetermined number of time slices 902 that are to be rendered in the visualization.

Although the illustration of FIG. 9A includes only three actors, this is not intended to be limiting and is for clarity only. However, in a real-world environment, such as on a highway, there may be any number of actors. As more actors are added to the environment, the visualization of FIG. 9A may become overcrowded, and it may become increasingly difficult, if not unrealistic, to visualize the vehicle-occupied trajectory clearly with respect to the object-occupied trajectories. For example, even when no intersection or overlap may occur between the vehicle-occupied trajectory and the object-occupied trajectories, it may appear is if an intersection or overlap exists. However, the goal of the visualizations may be to determine possible future collisions of actors by determining whether their claimed sets overlap, so perceived overlaps when they are not existent may not be ideal. The visualization in FIG. 9A may be referred to an absolute view of the trajectories and, although may be used in some examples, may not be as preferable as a relative view (described in more detail herein) in certain environment.

Figure 9B:
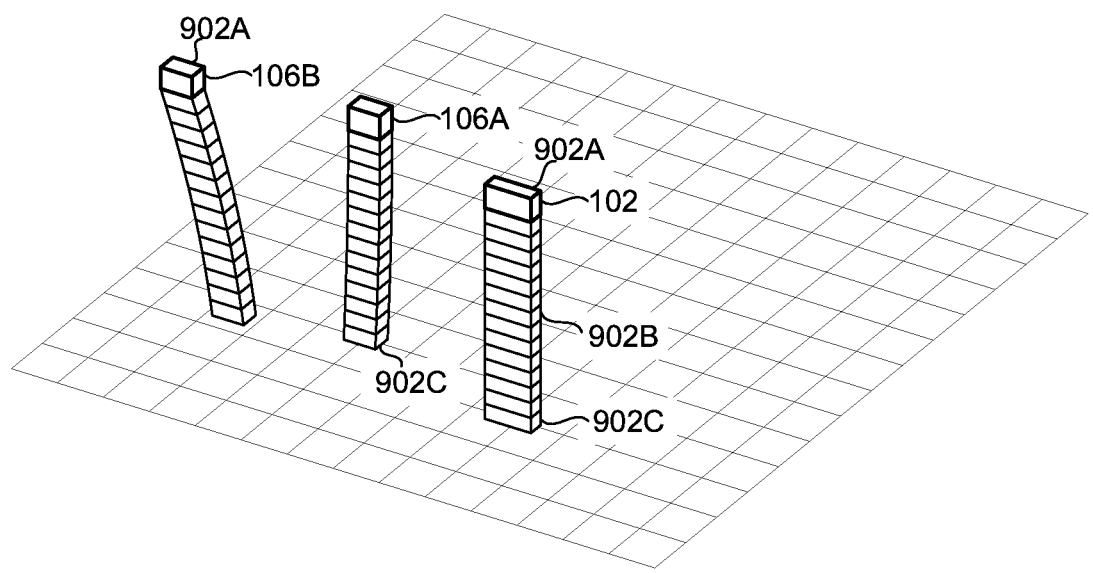
FIG. 9B is another example visualization of safety procedures of first vehicles relative to a second vehicle, in accordance with some embodiments of the present disclosure.

With reference to FIG. 9B, FIG. 9B illustrates representations of the vehicle 102 (e.g., as polygons, or a collection of line segments) and two objects, object 106A and object 106B (e.g., as polygons, or a collection of line segments), as the vehicle 102 and the objects 106A and 106B implement their respective safety procedures over each of a plurality of time slices 902. However, the vehicle 102, at each time slice 902, may have a transformation applied to shift the vehicle 102 back to its original position and/or orientation (e.g., back to its original position at time slice 902A). As such, for each time slice 902, a different transformation may be applied because the vehicle 102 may have moved to a new location and/or be in a new orientation at each time slice 902 within the time slices 902. As a result, at time slice 902B, a transformation may be applied such that the location and/or orientation of the vehicle 102 at time slice 902B are the same as the location and/or orientation of the vehicle 102 at time slice 902A. However, a different transformation may be applied such that the location and/or orientation of the vehicle at time slice 902C are the same as the location and/or orientation of the vehicle 102 at time slice 902A (e.g., different values for location and/or orientation may be necessary to bring the vehicle 102 back from its location and/or orientation at time slice 902C (to the location and/or orientation at time slice 902A) as compared to bringing the vehicle back from its location and/or orientation at time slice 902B).

Once the transformations are determined for the vehicle 102 at each time slice 902, the same transformations may be applied to each of the objects 106 in the environment (e.g., the object 106A and the object 106B in FIG. 9B) in order to create a visualization of how each of the objects 106 moves in the environment with respect to the vehicle 102 (e.g., because the vehicle 102 may be stationary as a result of the transformations). For example, the transformation determined for time slice 902B for the vehicle 102 may be applied to the object 106A and the object 106B at the time slice 902B. This process may continue for each of the time slices 902 and for each of the actors in the environment. By applying the transformation determined for the vehicle 102 to the other actors, the visualization may provide a more clear depiction of overlap between the vehicle-occupied trajectory and the object-occupied trajectories in the environment.

In some examples, the transformation may be an affine transformation. In such an example, an affine transformation may be applied as a function of time (e.g., on the entire scene or environment) to bring the vehicle 102 back to its starting location and/or orientation (e.g., at time slice 902A) and to transform, adjust, or warp the other actors based on the transformation to the vehicle 102. The affine transformation may, in some examples, be represented by equation (42), below:

$$f_t: \mathbb{R}^2 \to \mathbb{R}^2 \text{ given by } f_t(x)=A_t x+b_t \text{ where } A_t \in \mathbb{R}^{2\times 2}$$
$$\text{and } b_t \in \mathbb{R}^2 \quad (42)$$

As a result of applying the transformation to the vehicle 102, the object 106A, and the object 106B, the objects 106A and 106B may appear to move relative to the vehicle 102. Thus, the visualization of FIG. 9B may be referred to as a relative view. As an example, the object 106B may be moving toward and/or in the same direction as the vehicle 102. As a result, in the absolute view of FIG. 9A, the object 106B is represented as moving in the same direction and/or toward the vehicle 102. However, in the relative view of FIG. 9B, the object 106B looks as if it is moving away from the vehicle 102. This may be because although the object 106B is moving in the same or similar direction as the vehicle 102, the object 106B is traveling slower than the vehicle 102, and thus is moving toward the vehicle 102, but at a slower speed as the vehicle 102, thereby increasing the space between the vehicle 102 and the object 106B. As another example, the object 106A may be moving in a similar direction and at a similar speed as the vehicle 102, and thus in the relative view of FIG. 9B, may appear to be stationary with respect to the vehicle 102. The relative view of FIG. 9B thus presents a clearer visualization of the vehicle-occupied trajectory and the object-occupied trajectories, and makes visually identifying intersections or overlaps between them easier.

The visualization of FIG. 9B includes a three-dimensional visualization of the time slices 902 for each of the actors (e.g., with time as a separate axis). However, this is not intended to be limiting. For example, instead of including each time slice 902 as a separate shape, the trajectories may be one single shape (e.g., a polygon that extends through all time slices 902 without any breaks or delineation), or may be broken up by multiple time slices 902, and/or based on other criteria. In addition, the visualization may alternatively be in two-dimensions rather than three. In some examples, the different trajectories may be different colors, or may be represented by different shapes, or each time slice 902 or other segment of individual trajectories may be different colors or different shades or resolutions (e.g., the trajectories and/or the different segments of the trajectories may fade out further into the future, or vice versa).

Figure 9C:
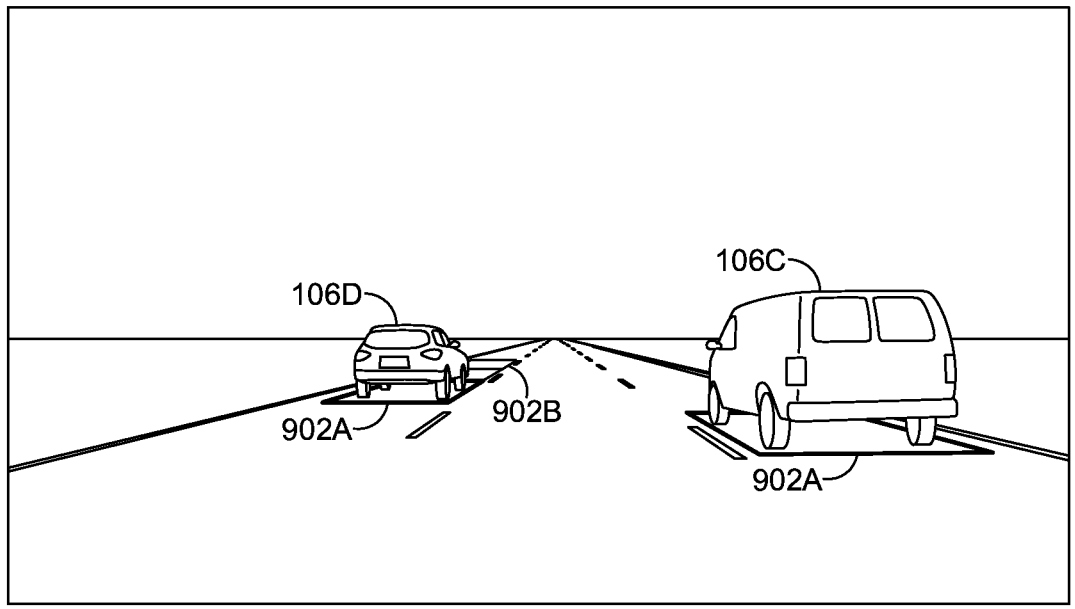
FIG. 9C is another example visualization of projections of safety procedures of first vehicles relative to a second vehicle, in accordance with some embodiments of the present disclosure.
Figure 9D:
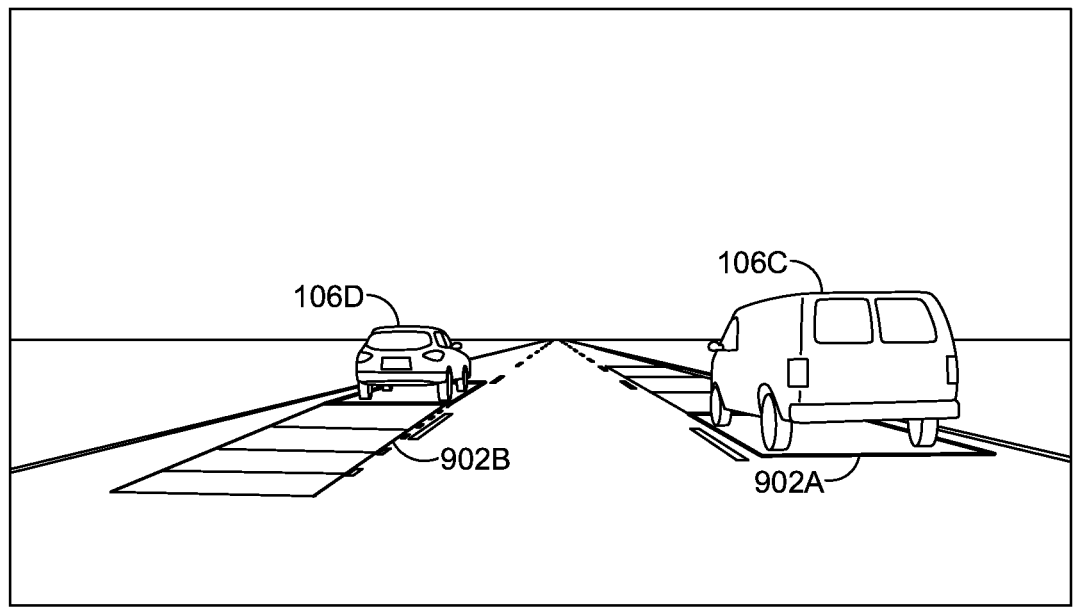
FIG. 9D is another example visualization of projections of safety procedures of first vehicles relative to a second vehicle, in accordance with some embodiments of the present disclosure.

In some examples, such as with respect to the visualizations of FIGS. 9C and 9D, the trajectories and/or time slices 902 may be projected back into an image plane of the image(s) generated by the vehicle 102. In such an example, the vehicle-occupied trajectory of the vehicle 102 may not be rendered in the image(s) because the vehicle 102 is stationary, so the vehicle 102 boundary may not move or obstruct anything. The trajectories may be projected in two-dimensions or three-dimensions.

For example, in FIG. 9C, an object 106C and an object 106D, that may be in front of the vehicle 102 (and not illustrated in the visualization of FIGS. 9A and 9B), may have their respective object-occupied trajectories rendered within the image of FIG. 9C. The object-occupied trajectories, because they may have resulted from the transformations described above, are moving relative to the vehicle 102, thus allowing for an easier visualization of the object-occupied trajectories with respect to the vehicle. For example, the object-occupied trajectory of the object 106C may indicate that the object 106C is moving at substantially the same speed as the vehicle 102, and the object-occupied trajectory for the object 106D may indicate that the object 106C is moving at a faster speed than the vehicle. The image may have been captured by a front facing sensor on the vehicle 102.

As another example, in FIG. 9D, the object 106C and the object 106D may be in front of the vehicle 102, similar to FIG. 9C, described above, but the object 106D may be slowing down relative to the vehicle 102 (or the vehicle 102 may be speeding up relative to the object 106D). As a result, the object 106D may include an object-occupied trajectory that extends toward the vehicle 102, even though the object 106D may be traveling in the same direction as the vehicle 102.

Figure 9E:
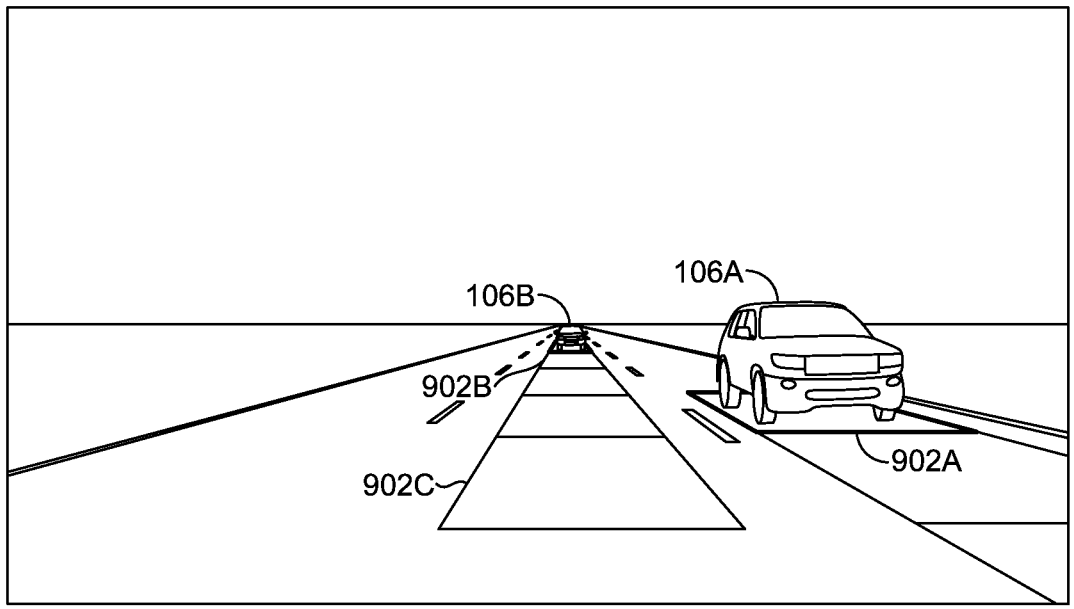
FIG. 9E is another example visualization of projections of safety procedures of first vehicles relative to a second vehicle, in accordance with some embodiments of the present disclosure.

As another example, in FIG. 9E, the object 106A and the object 106B, that may be behind the vehicle 102, may have their respective object-occupied trajectories rendered within the image of FIG. 9E. The object-occupied trajectories, because they may have resulted from the transformations described above, are moving relative to the vehicle 102, thus allowing for an easier visualization of the object-occupied trajectories with respect to the vehicle. The image may have been captured by a rear facing sensor of the vehicle 102.

Although a front view and a rear view are illustrated in FIGS. 9C, 9D, and 9E, respectively, this is not intended to be limiting. For example, similar images may be generated for any of the sensors of the vehicle 102 (e.g., the cameras that are front facing, rear facing, side facing, etc.). In some examples, the visualization of FIGS. 9A-9E may be accompanied by a control image, such as the control image 706 of FIG. 7B. In such examples, the control image may illustrate acceptable control options that may be better understood with the visualizations of the FIGS. 9A-9E as reference.

In some examples, such as where latency, safety margins, reaction time, and/or other factors are considered when generating vehicle-occupied trajectories and/or object-occupied trajectories (e.g., as described herein), multiple potential future trajectories may be considered. For example, because of noise or delays in perception, there may be a time gap between when the vehicle 102 predicts a collision and actual implements a command. In addition, at high speeds, some additional space may be desired between actors. Further, object(s) 106 may be allotted a reaction time to implement their own respective procedures (e.g., safety procedures). As a result, and because any of the actors may have more than a single path or trajectory they could take, the system may analyze more than one possible trajectory (e.g., all of them), and include this in the visualization. In such an example, all of the claimed sets from each of the one or more possible trajectories may be included within an approximation that spans around all them (e.g., a convex hull or a direction computation of the surrounding boundary that may expand over time, such as due to a safety margin). In examples where a convex hull is computed, the convex hull may be approximated, such as by computing and interpolating between extreme choices of control options for the safety procedure (e.g., controls associated with maximum and minimum steering and/or braking). As such, the extreme choices of the control options may be computed, and the remaining control options may be interpolated using the extreme choices.

As another example, perceived motion may be insufficient in some scenarios to predict future collisions. At high speeds or at intersections, an actor may be likely to follow a particular path (e.g., a U-turn, a turning path, follow direction of lanes of freeway, etc.). This information may be learned over time (e.g., using one or more machine learning models, such as neural networks). To account for this, in some examples, actors may be assumed to line themselves up with and then move parallel to a lane structure (e.g., based on map information and/or perception of lane boundaries or a set of known trajectories). Without these assumptions, at high speeds, or with an additional lane joining into the current lane, small perception errors may propagate into many wrong collision detections. By using the lane structure as an implicit agreement that cars travel with the direction of the road structure, this may allow for the safety force field to enable reasonable operation of the vehicle 102 in these various scenarios. For example, even in situations such as where an oncoming vehicle is merging lanes and thus their safety force field projects into the safety force field of the vehicle 102 during the merge, the lane structure (e.g., indicating that the oncoming vehicle will likely merge with the other lane and proceed according to the lane structure) may allow for the vehicle 102 to continue unimpeded (e.g., without implementing the safety procedure to account for the oncoming vehicle).

Figure 10:
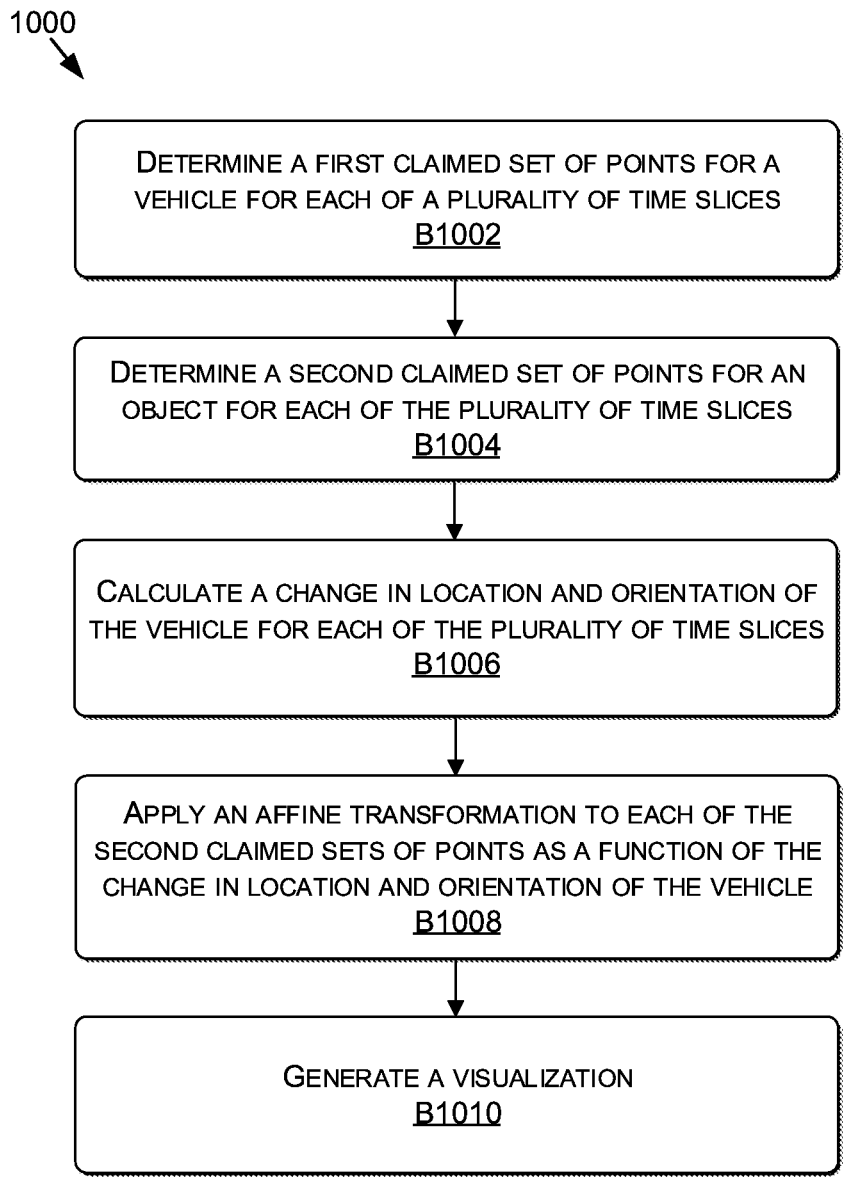
FIG. 10 is a flow diagram showing a method for trajectory visualization techniques, in accordance with some embodiments of the present disclosure.

Now referring to FIG. 10, each block of method 1000, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 1000 is described, by way of example, with respect to the autonomous vehicle system 100 of FIG. 1. However, these methods may additionally or alternatively be executed by any one system, or any combination of systems, including, but not limited to, those described herein.

FIG. 10 is a flow diagram showing a method 1000 for trajectory visualization techniques, in accordance with some embodiments of the present disclosure. The method 1000, at block B1002, includes determining a first claimed set of points for a vehicle for each of a plurality of time slices. For example, the claimed set determiner 136 may determine a first claimed set of points for the vehicle 102 (e.g., representative of the execution of a safety procedure of the vehicle) for each time slice (e.g., the time slices 902). The determination of the first claimed at may be based on a location, a speed, an orientation, and/or other state information of the vehicle at a current time. In some examples, as described herein, the first claimed set may include multiple possible implementations of the safety procedure (e.g., different braking profiles, steering profiles, etc.).

The method 1000, at block B1004, includes determining a second claimed set of points for an object for each of the plurality of time slices. For example, the claimed set determiner 136 may determine a second claimed set of points for the object 106 (e.g., representative of the execution of a safety procedure of the object) for each time slice (e.g., the time slices 902). The determination of the second claimed at may be based on a location, a speed, an orientation, and/or other state information of the object at a current time. In some examples, as described herein, the second claimed set may include multiple possible implementations of the safety procedure (e.g., different braking profiles, steering profiles, etc.).

The method 1000, at block B1006, includes calculating a change in location and orientation of the vehicle for each of the plurality of time slices. For example, a transformation may be applied to the location and/or orientation of the vehicle 102 at each time slice. The transformation (e.g., affine transformation) may be applied to get a location and/or orientation associated with each future time slice back to the location and/or orientation of the original or current time slice.

The method 1000, at block B1008, includes applying an affine transformation to each of the second claimed sets of points as a function of the change in location and orientation of the vehicle. For example, the same transformation applied to the vehicle 102 in block B1008 may be applied to each of the claimed sets of points of the objects. As a result, the determination of the change in location and/or orientation of the vehicle 102 at each time slice may be applied to the objects 106 at each time slice.

The method 1000, at block B1010, includes generating a visualization. For example, a visualization may be generated that may include representations of the object-occupied trajectories in view of the vehicle-occupied trajectories. In some examples, such as the visualizations of FIGS. 9A-9B, the vehicle-occupied trajectory may also be included in the visualization. In other examples, such as in the visualizations of FIGS. 9C-9D, the vehicle-occupied trajectory may not be included in the visualization.

Although the visualization techniques herein are described with respect to the vehicle 102 and objects 106 in the environment (or more generally, described with respect to driving), this is not intended to be limiting. For example, these techniques may be used for any scene or scenario where there are moving and/or static objects and at least one of the objects is to be distinguished from at least one other. For example, these visualization techniques may be used in computer games, robotics, virtual reality, physical simulations, and/or other technology areas.

Example Autonomous Vehicle

Figure 11A:
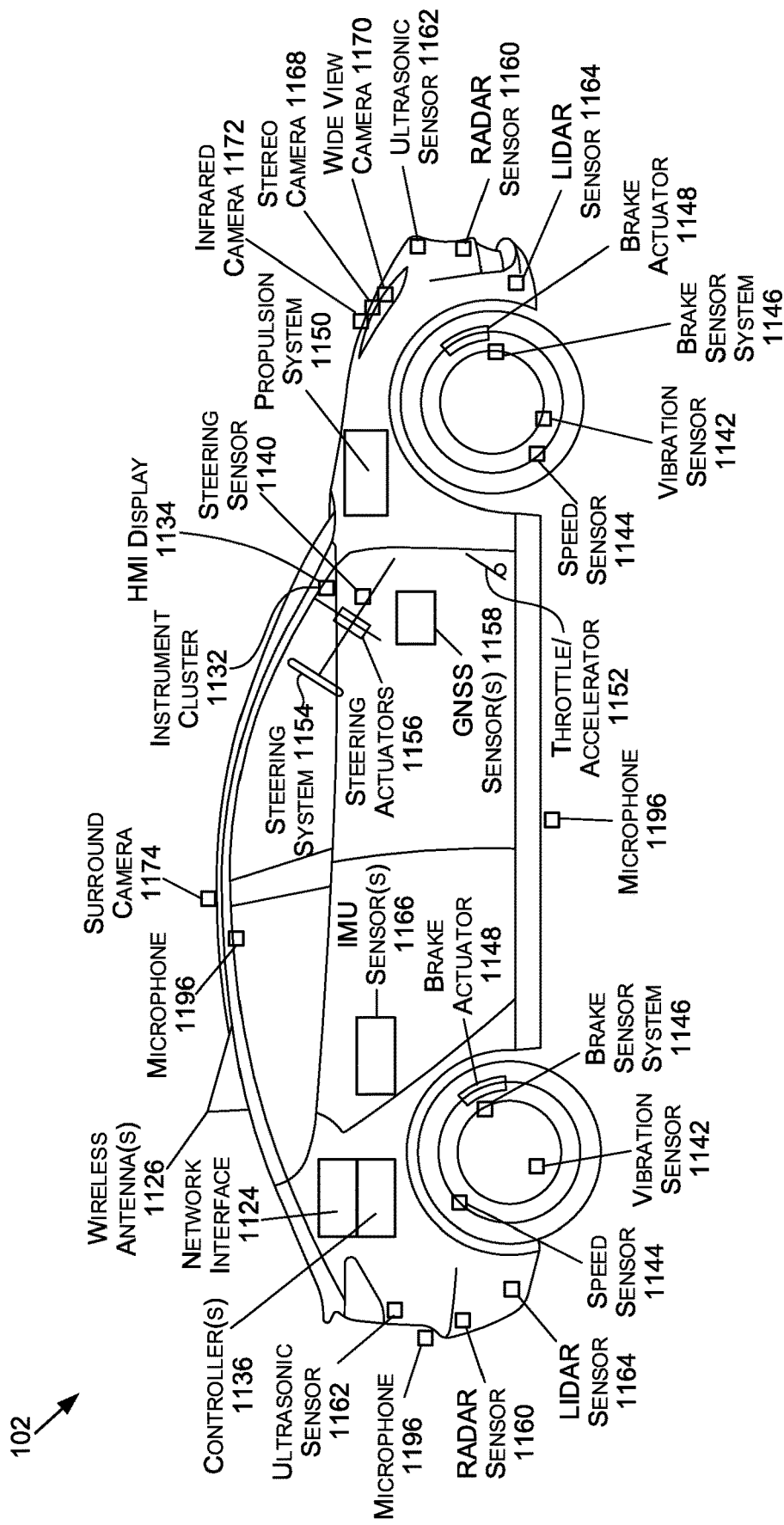
FIG. 11A is an illustration of an example autonomous vehicle, in accordance with some embodiments of the present disclosure.

FIG. 11A is an illustration of an example autonomous vehicle 102, in accordance with some embodiments of the present disclosure. The autonomous vehicle 102 (alternatively referred to herein as the "vehicle 102") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 102 may be capable of functionality in accordance with one or more of Level 3-Level 5 of the autonomous driving levels. For example, the vehicle 102 may be capable of conditional automation (Level 3), high automation (Level 4), and/or full automation (Level 5), depending on the embodiment.

The vehicle 102 may include components such as a chassis, a vehicle body, wheels (e.g., 2, 4, 6, 8, 18, etc.), tires, axles, and other components of a vehicle. The vehicle 102 may include a propulsion system 1150, such as an internal combustion engine, hybrid electric power plant, an all-electric engine, and/or another propulsion system type. The propulsion system 1150 may be connected to a drive train of the vehicle 102, which may include a transmission, to enable the propulsion of the vehicle 102. The propulsion system 1150 may be controlled in response to receiving signals from the throttle/accelerator 1152.

A steering system 1154, which may include a steering wheel, may be used to steer the vehicle 102 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 102. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 102. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 102 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 102), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 102 and provide outputs (e.g., represented by output data, display data, etc.) via a human-machine interface (HMI) display 1134, an audible annunciator, a loudspeaker, and/or via other components of the vehicle 102. The outputs may include information such as vehicle velocity, speed, time, map data (e.g., the HD map 1122 of FIG. 11C), location data (e.g., the vehicle's 102 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 102 further includes a network interface 1124 which may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 11B:
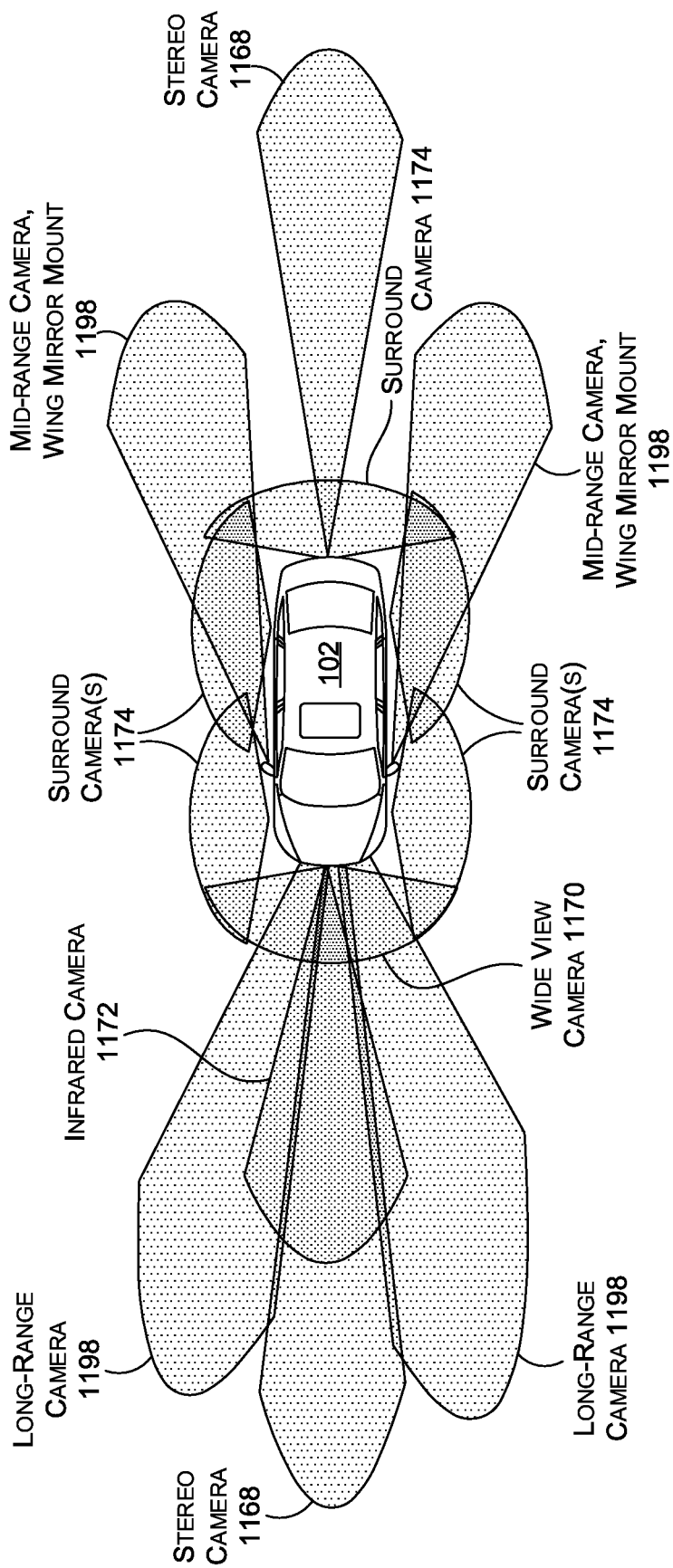
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 102 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 102.

The camera types for the cameras may include, but are not limited to, digital cameras that may be adapted for use with the components and/or systems of the vehicle 102. The camera(s) may operate at automotive safety integrity level (ASIL) B and/or at another ASIL. The camera types may be capable of any image capture rate, such as 60 frames per second (fps), 1120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 102 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and obstacle avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may any number of wide-view cameras 1170 on the vehicle 102. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 102 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 102. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 102 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
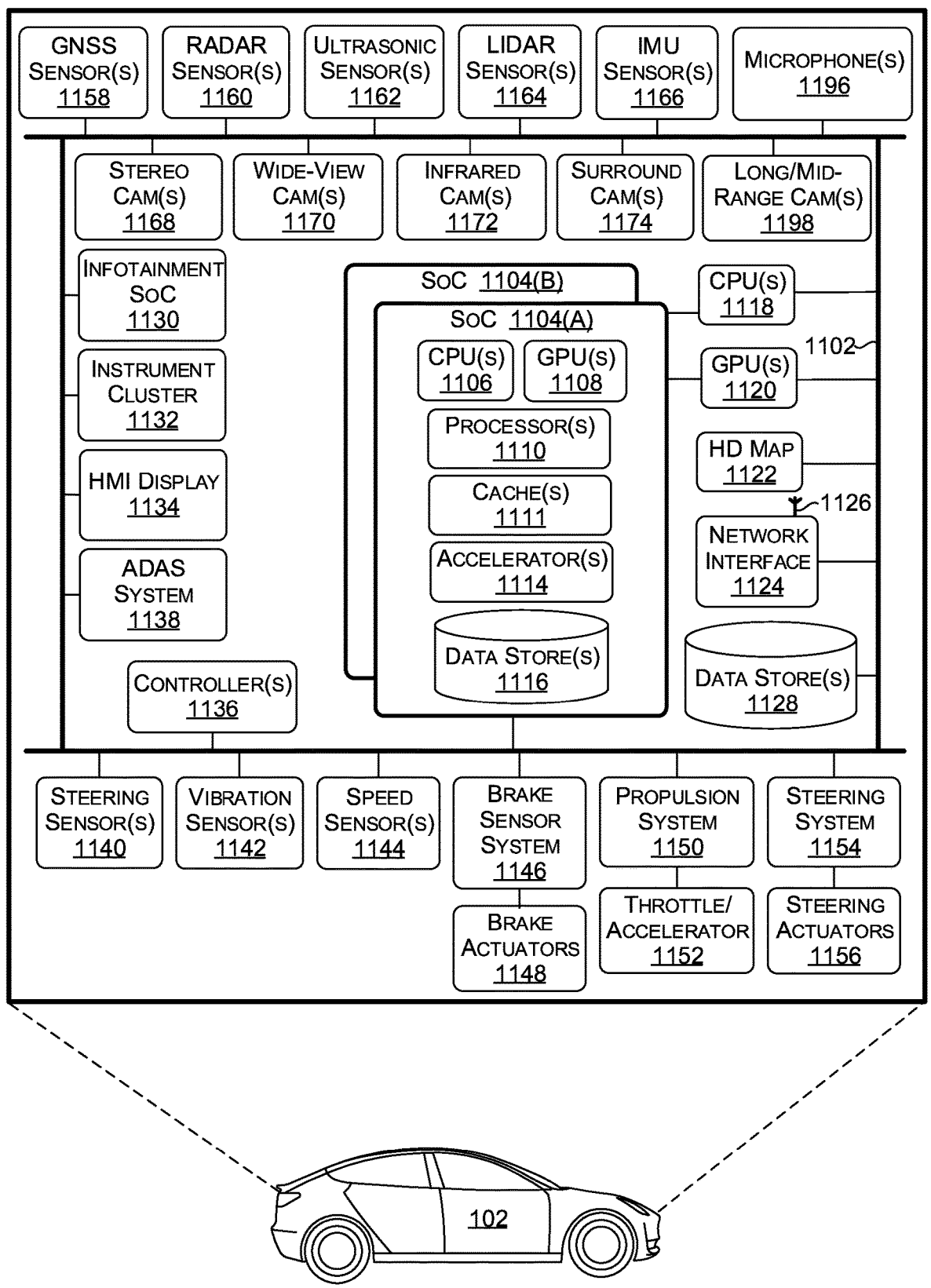
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 102 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 102 in FIG. 11C are illustrated as being connected via bus 1102. The bus 1102 may include a Controller Area Network (CAN) data interface (alternatively referred to herein as a "CAN bus"). A CAN may be a network inside the vehicle 102 used to aid in control of various features and functionality of the vehicle 102, such as actuation of brakes, acceleration, braking, steering, windshield wipers, etc. A CAN bus may be configured to have dozens or even hundreds of nodes, each with its own unique identifier (e.g., a CAN ID). The CAN bus can be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for obstacle avoidance functionality and a second bus 1102 may be used for actuation control. In any example, each bus 1102 may communicate with any of the components of the vehicle 102, and two or more busses 1102 may communicate with the same components. In some examples, each SoC 1104, each controller 1136, and/or each computer within the vehicle may have access to the same input data (e.g., inputs from sensors of the vehicle 102), and may be connected to a common bus, such the CAN bus.

The vehicle 102 may include one or more controller(s) 1136, such as those described herein with respect to FIG. 11A. The controller(s) 1136 may be used for a variety of functions. The controller(s) 1136 may be coupled to any of the various other components and systems of the vehicle 102, and may be used for control of the vehicle 102, artificial intelligence of the vehicle 102, infotainment for the vehicle 102, and/or the like.

The vehicle 102 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 102 in a variety of platforms and systems. For example, the SoC(s) 1104 may be combined in a system (e.g., the system of the vehicle 102) with an HD map 1122 which may obtain map refreshes and/or updates via a network interface 1124 from one or more servers (e.g., server(s) 104 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power, each core clock may be gated when the core is not actively executing instructions due to execution of WFI/WFE instructions; each core may be independently power-gated; each core cluster can be independently clock-gated when all cores are clock-gated or power-gated; and/or each core cluster can be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that can keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1114 (e.g., the hardware accelerator cluster) have a wide array of uses for autonomous driving. The PVA may be a programmable vision accelerator that can be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system can set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA can run a neural network for regressing the confidence value. The neural network can take as its input at least some subset of parameters, such as bounding box dimensions, ground plane estimate obtained (e.g. from another subsystem), inertial measurement unit (IMU) sensor 1166 output that correlates with the vehicle 102 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 102 into a chauffeur to safe stop mode (e.g., bring the vehicle 102 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 102, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms can be executed on CPUs, which can be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 102. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN can also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 102 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 102.

The vehicle 102 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 104 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 102 information about vehicles in proximity to the vehicle 102 (e.g., vehicles in front of, on the side of, and/or behind the vehicle 102). This functionality may be part of a cooperative adaptive cruise control functionality of the vehicle 102.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 102 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that can store at least one bit of data.

The vehicle 102 may further include GNSS sensor(s) 1158. The GNSS sensor(s) 1158 (e.g., GPS and/or assisted GPS sensors), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 102 may further include RADAR sensor(s) 1160. The RADAR sensor(s) 1160 may be used by the vehicle 102 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 102 surroundings at higher speeds with minimal interference from traffic in adjacent lanes. The other two antennae may expand the field of view, making it possible to quickly detect vehicles entering or leaving the vehicle's 102 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 102 may further include ultrasonic sensor(s) 1162. The ultrasonic sensor(s) 1162, which may be positioned at the front, back, and/or the sides of the vehicle 102, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 102 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 102 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 102 m, with an accuracy of 2 cm-3 cm, and with support for a 102 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 102. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 102. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 102, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 102 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 102. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 102. The types of cameras used depends on the embodiments and requirements for the vehicle 102, and any combination of camera types may be used to provide the necessary coverage around the vehicle 102. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 102 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 102 may include an ADAS system 1138. The ADAS system 1138 may include a SoC, in some examples. The ADAS system 1138 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 102 and automatically adjust the vehicle speed to maintain a safe distance from vehicles ahead. Lateral ACC performs distance keeping, and advises the vehicle 102 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 102), while the I2V communication concept provides information about traffic further ahead. CACC systems can include either or both I2V and V2V information sources. Given the information of the vehicles ahead of the vehicle 102, CACC can be more reliable and it has potential to improve traffic flow smoothness and reduce congestion on the road.

FCW systems are designed to alert the driver to a hazard, so that the driver can take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 102 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 102 if the vehicle 102 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 102 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 102, the vehicle 102 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 102 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 102. For example, the infotainment SoC 1130 may radios, disk players, navigation systems, video players, USB and Bluetooth connectivity, carputers, in-car entertainment, WiFi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 102. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 102) fail. In such an example, the infotainment SoC 1130 may put the vehicle 102 into a chauffeur to safe stop mode, as described herein.

The vehicle 102 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
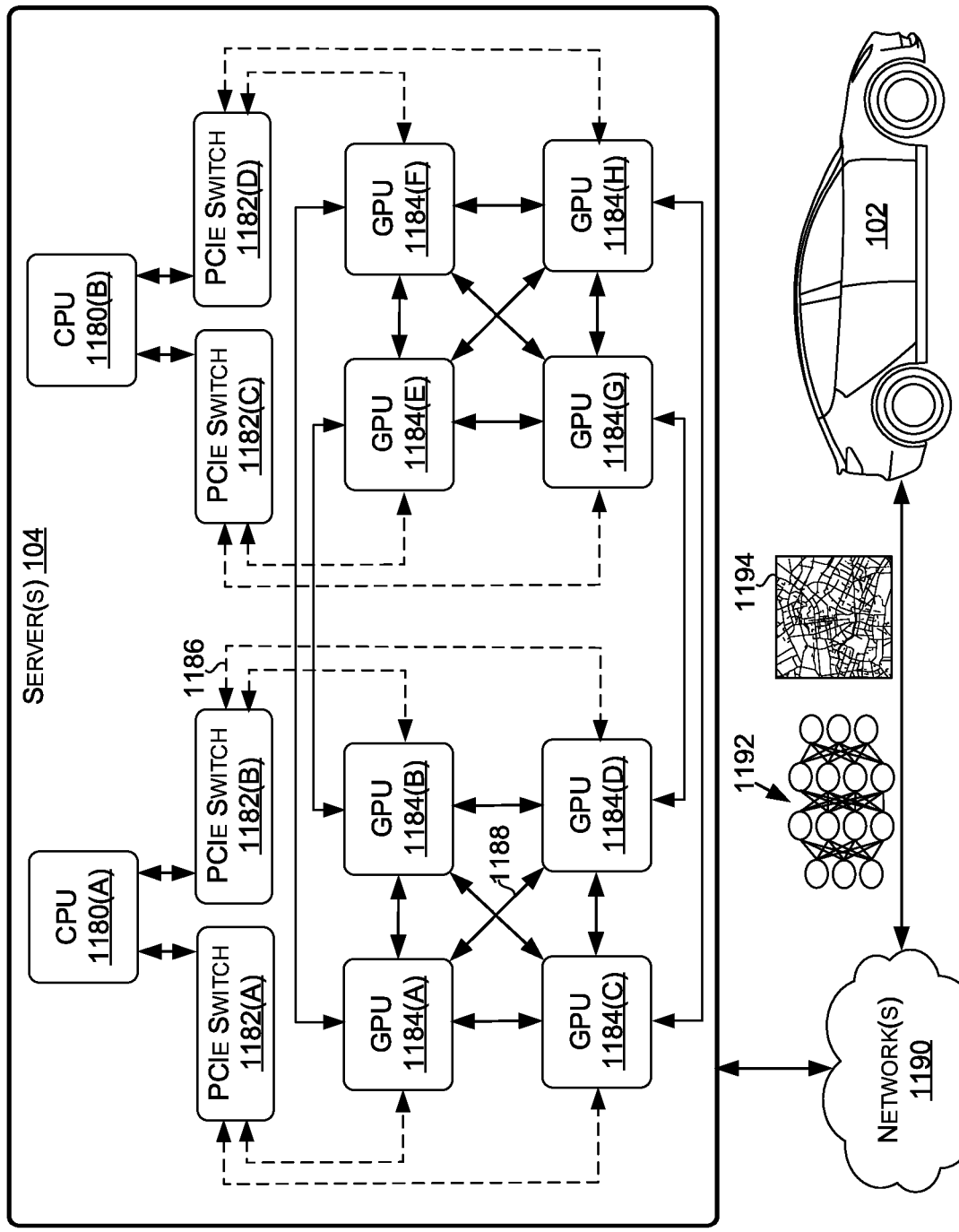
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 102 of FIG. 11A, in accordance with some embodiments of the present disclosure. The autonomous vehicle system 100 may include server(s) 104, network(s) 1190, and vehicles, including the vehicle 102. The server(s) 104 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 104 may include any number of GPUs 1184, CPUs 1180, and/or PCIe switches. For example, the server(s) 104 may each include eight, sixteen, thirty-two, and/or more GPUs 1184.

The server(s) 104 may receive, over the network(s) 1190 and from the vehicles, image data representative of images showing unexpected or changed road conditions, such as recently commenced road-work. The server(s) 104 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 104 and/or other servers).

The server(s) 104 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1190, and/or the machine learning models may be used by the server(s) 104 to remotely monitor the vehicles.

In some examples, the server(s) 104 may receive data from the vehicles and apply the data to up-to-date real-time neural networks for real-time intelligent inferencing. The server(s) 104 may include deep-learning supercomputers and/or dedicated AI computers powered by GPU(s) 1184, such as a DGX and DGX Station machines developed by NVIDIA. However, in some examples, the server(s) 104 may include deep learning infrastructure that use only CPU-powered datacenters.

The deep-learning infrastructure of the server(s) 104 may be capable of fast, real-time inferencing, and may use that capability to evaluate and verify the health of the processors, software, and/or associated hardware in the vehicle 102. For example, the deep-learning infrastructure may receive periodic updates from the vehicle 102, such as a sequence of images and/or objects that the vehicle 102 has located in that sequence of images (e.g., via computer vision and/or other machine learning object classification techniques). The deep-learning infrastructure may run its own neural network to identify the objects and compare them with the objects identified by the vehicle 102 and, if the results do not match and the infrastructure concludes that the AI in the vehicle 102 is malfunctioning, the server(s) 104 may transmit a signal to the vehicle 102 instructing a fail-safe computer of the vehicle 102 to assume control, notify the passengers, and complete a safe parking maneuver.

For inferencing, the server(s) 104 may include the GPU(s) 1184 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
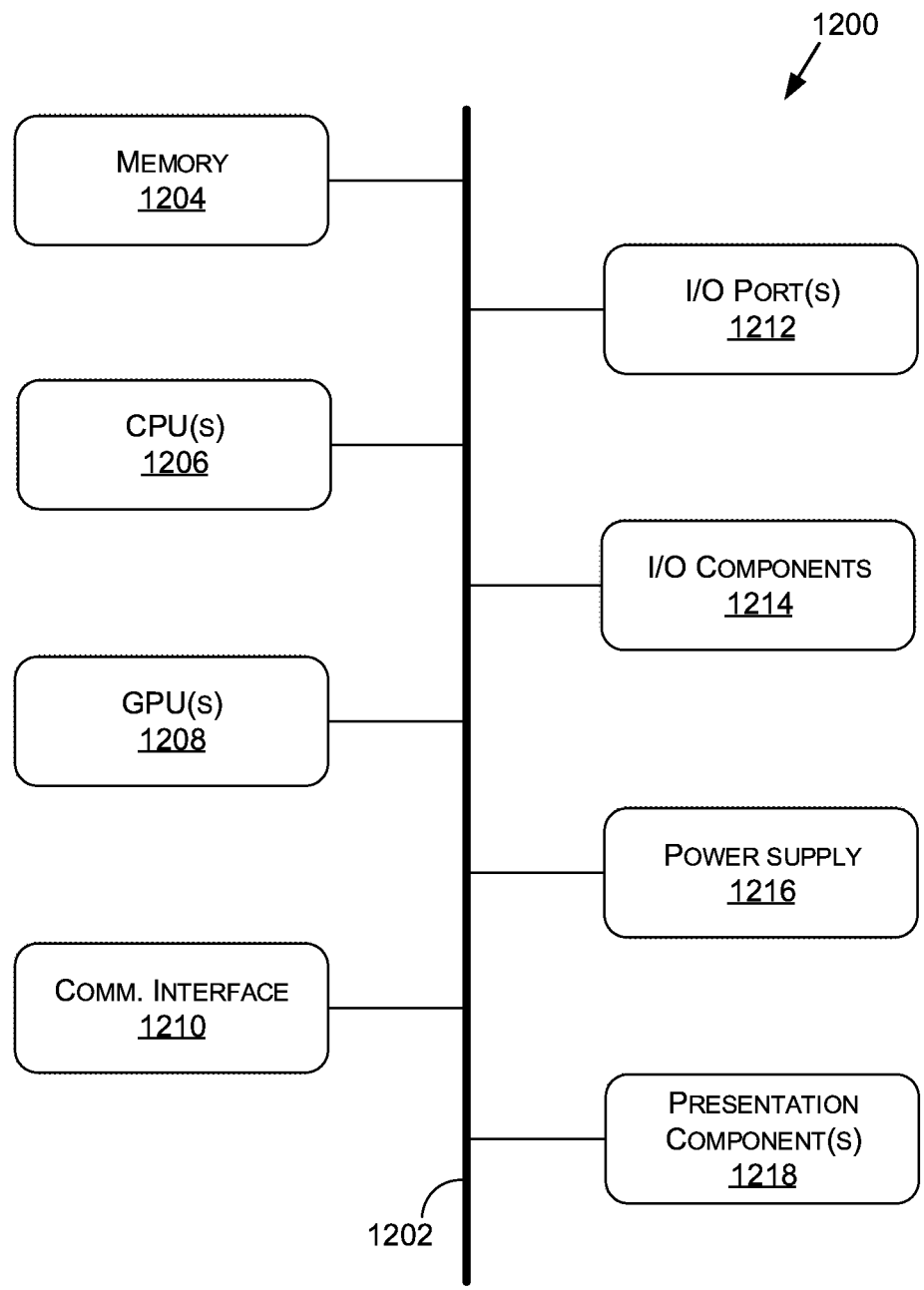
FIG. 12 is a block diagram of an example computing device suitable for use in implementing some embodiments of the present disclosure.

FIG. 12 is a block diagram of an example computing device 1200 suitable for use in implementing some embodiments of the present disclosure. Computing device 1200 may include a bus 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, and one or more presentation components 1218 (e.g., display(s)).

Although the various blocks of FIG. 12 are shown as connected via the bus 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The bus 1202 may represent one or more busses, such as an address bus, a data bus, a control bus, or a combination thereof. The bus 1202 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1204 may include any of a variety of computer-readable media. The computer-readable media may be any available media that can be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an ARM processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

The GPU(s) 1208 may be used by the computing device 1200 to render graphics (e.g., 3D graphics). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data. The display memory may be included as part of the memory 1204. The GPU(s) 1208 may include two or more GPUs operating in parallel (e.g., via a link). When combined together, each GPU 1208 can generate pixel data for different portions of an output image or for different output images (e.g., a first GPU for a first image and a second GPU for a second image). Each GPU can include its own memory, or can share memory with other GPUs.

In examples where the computing device 1200 does not include the GPU(s) 1208, the CPU(s) 1206 may be used to render graphics.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising processing circuitry to:
   determine a current claimed set of points representative of a volume in an environment occupied by a vehicle at a time based at least in part on a size, location, and orientation of the vehicle;
   based at least in part on one or more velocities of the vehicle at the time and a first safety procedure for the vehicle, generate one or more vehicle-occupied trajectories representative of first future claimed sets of points of the vehicle in the environment if the vehicle were to implement the first safety procedure at the time;

detect an intersection between the one or more vehicle-occupied trajectories and one or more object-occupied trajectories based at least in part on determining whether one or more first vertices of any of the one or more vehicle-occupied trajectories intersects with one or more first edges of any of the one or more object-occupied trajectories or determining whether one or more second vertices of any of the one or more object-occupied trajectories intersects with one or more second edges of any of the one or more vehicle-occupied trajectories, the one or more object-occupied trajectories representative of second future claimed sets of an object in the environment if the object were to implement a second safety procedure associated with the object at the time;

calculate a first safety potential associated with the vehicle implementing the first safety procedure and the object implementing the second safety procedure, the first safety potential representative of the intersection; and based at least in part on the intersection, execute one of the first safety procedure or an alternative procedure that, when implemented by the vehicle when the object implements the second safety procedure, is determined to have a second safety potential computed to have a lesser likelihood of incurring a collision between the vehicle and the object than the first safety potential.

2. The processor of claim 1, wherein the processing circuitry is further to determine the one or more velocities, the orientation, and the location of the vehicle based at least in part on sensor data received from one or more sensors of the vehicle, the one or more sensors including one or more of:
 a global navigation satellite system (GNSS) sensor;
 a camera;
 an accelerometer;
 an inertial sensor;
 a gyrosensor;
 a compass;
 a tire vibration sensor;
 a microphone;
 a steering sensor; or
 a speed sensor.

3. The processor of claim 1, wherein the processing circuitry is further to determine a set of functions corresponding to a control policy representative of the first safety procedure for the vehicle by:
 determining control parameters for steering, braking, and accelerating the vehicle;
 identifying a vehicle state objective of the first safety procedure;
 analyzing sensor data received from one or more sensors of the vehicle to determine at least one of locations, orientations, and velocities of one or more objects in the environment; and
 based at least in part on the control parameters and at least one of the locations, the orientations, and the velocities of the one or more objects, determining the set of functions to guide the vehicle to the vehicle state objective.

4. The processor of claim 1, wherein the processing circuitry is further to determine the size of the vehicle by:

identifying an estimated size of the vehicle; and
fitting a predefined shape around the vehicle based at least in part on at least one of the estimated size or a vehicle type of the vehicle,
wherein the size of the vehicle corresponds to a size of the predefined shape.

5. The processor of claim 4, wherein the determining the size of the vehicle further comprises identifying a safety margin, and wherein the predefined shape includes the safety margin.

6. The method processor of claim 1, wherein the processing circuitry is further to determine the one or more object-occupied trajectories for the object by determining at least one of an object velocity, an object orientation, and at least one of an object location, an object size, or an object shape of the object in the environment based at least in part on sensor data received from one or more sensors of the vehicle, the one or more sensors including one or more of:
 a global navigation satellite system (GNSS) sensor;
 a long-range camera;
 a stereo camera;
 an infrared camera;
 a surround camera;
 a wide view camera;
 a mid-range camera;
 a LIDAR sensor;
 an ultrasonic sensor;
 an infrared sensor;
 a radar sensor; or
 a wireless antenna.

7. The processor of claim 1, wherein each first future claimed set of the one or more first future claimed sets is representative of a respective volume in the environment that would be occupied by the vehicle at a respective future time.

8. A method comprising:
 determining a current claimed set of points representative of an area in an environment occupied by a vehicle at a time based at least in part on a state of the vehicle, the state including at least a location and a speed of the vehicle;
 based at least in part on the state and a safety procedure for the vehicle, generating a vehicle-occupied trajectory representative of future claimed sets of the vehicle in the environment if the vehicle were to implement the safety procedure at the time;
 comparing the vehicle-occupied trajectory to one or more object-occupied trajectories associated with one or more objects in the environment to detect whether any virtual intersections between the vehicle-occupied trajectory and at least one of the one or more object-occupied trajectories occur, the comparing including at least one of determining whether one or more first vertices of the vehicle-occupied trajectory intersects with one or more first edges of any of the one or more object-occupied trajectories or determining whether one or more second vertices of any of the one or more object-occupied trajectories intersects with one or more second edges of the vehicle-occupied trajectory; and
 upon detecting a virtual intersection, implementing a first set of controls defined by the safety procedure or a second set of controls defined by an alternative procedure determined to have a lesser likelihood, compared to the safety procedure, of incurring a real-world intersection between the vehicle and at least one of the one or more objects associated with the virtual intersection.

9. The method of claim 8, wherein the implementing the first set of controls or the second set of controls comprises:

calculating a first safety potential representative of a first likelihood of the real-world intersection based at least in part on the first set of controls representative of the safety procedure;

calculating a second safety potential representative of a second likelihood of the real-world intersection based at least in part on the second set of controls representative of the alternative procedure;

comparing the first safety potential to the second safety potential; and based at least in part on the comparing:
upon determining that the second likelihood is greater than the first likelihood, implementing the first set of controls; or
upon determining that the second likelihood is equal to or less than the first likelihood, implementing the first set of controls or the second set of controls.

10. The method of claim 8, wherein the time is a current time plus an estimated latency, the estimated latency being predefined or determined based at least in part on historical data associated with the vehicle.

11. The method of claim 8, further comprising generating the one or more object-occupied trajectories by:
based at least in part on sensor data received from one or more sensors of the vehicle, determining object states for each of the one or more objects in the environment at the time, each object state representative of a respective location, orientation, and speed of a respective object;
identifying object safety procedures for each of the one or more objects; and
based at least in part on the object states and the object safety procedures, generating the one or more object-occupied trajectories.

12. The method of claim 8, further comprising determining the one or more objects in the environment by:
analyzing the sensor data to identify one or more perceived objects based at least in part on sensor data generated by one or more sensors of the vehicle;
analyzing at least one of the sensor data and map data to determine variables in the environment, the variables including at least one of an intersection, an occluded object, or a traffic signal; and
identifying one or more unperceived objects based at least in part on the variables,
wherein the one or more perceived objects and the one or more unperceived objects are the one or more objects.

13. The method of claim 8, further comprising:
determining, during the implementing of the first set of controls or the second set of controls, that an updated vehicle-occupied trajectory no longer intersects an updated object-occupied trajectory; and
ceasing the implementing of the first set of controls or the second set of controls.

14. The method of claim 8, wherein the vehicle-occupied trajectory is representative of the future claimed sets of the vehicle in the environment if the vehicle were to implement the safety procedure at the time over a range of braking profiles of the safety procedure, the range of braking profiles including a first braking profile and a second braking profile different from the first braking profile.

15. The method of claim 8, wherein the comparing the vehicle-occupied trajectory to the one or more object-occupied trajectories associated with the one or more objects in the environment further includes determining whether any of the second edges corresponding to the vehicle-occupied trajectory intersect any of the first edges corresponding to the one or more object-occupied trajectories.

16. The method of claim 8, wherein the one or more object-occupied trajectories are representative of future claimed sets of the one or more objects in the environment if the one or more objects were to implement respective safety procedures at the time.

17. The method of claim 8, wherein the state further includes at least one of a size, a shape, or a type of the vehicle.

18. A system comprising:
one or more processing units; and
one or more memory units storing instructions thereon that, when executed using the one or more processing units, cause the one or more processing units to execute operations comprising:
based at least in part on a vehicle state of a vehicle at a time and a first safety procedure for the vehicle, generating a first vehicle-occupied trajectory representative of first points in an environment occupied by the vehicle if the vehicle were to implement the first safety procedure at the time;
based at least in part on an object state of an object at the time and a second safety procedure for the object, generating an object-occupied trajectory representative of second points in the environment occupied by the object if the object were to implement the second safety procedure at the time;
based at least in part on comparing the first points to the second points, calculating a first safety potential associated with the vehicle implementing the first safety procedure and the object implementing the second safety procedure;
based at least in part on the vehicle state of the vehicle at the time and a third safety procedure for the vehicle, generating a second vehicle-occupied trajectory representative of third points in the environment occupied by the vehicle if the vehicle were to implement the third safety procedure at the time;
based at least in part on comparing the third points to the second points, calculating a second safety potential associated with the vehicle implementing the third safety procedure at the time and the object implementing the second safety procedure; and
executing the third safety procedure based at least in part on a determination that the second safety potential is associated with a lesser likelihood of incurring a collision between the vehicle and the object than the first safety potential.

19. The system of claim 18, wherein the calculating the second safety potential comprises performing a perturbation analysis to determine safety potentials associated with a plurality of safety procedures for the vehicle, including the third safety procedure.

20. The system of claim 18, further comprising one or more sensors, wherein the vehicle state is determined using the one or more sensors, the one or more sensors including one or more of:
a global navigation satellite system (GNSS) sensor;
a camera;
an accelerometer;
an inertial sensor;
a gyrosensor;
a compass;
a tire vibration sensor;
a microphone;
a steering sensor; or
a speed sensor.

* * * * *